United States Patent [19]
Alferness et al.

[11] Patent Number: 6,029,205
[45] Date of Patent: Feb. 22, 2000

[54] SYSTEM ARCHITECTURE FOR IMPROVED MESSAGE PASSING AND PROCESS SYNCHRONIZATION BETWEEN CONCURRENTLY EXECUTING PROCESSES

[75] Inventors: Merwin H. Alferness, New Brighton; Mark D. Aubel, Woodbury; Charles R. Caldarale, Minneapolis; James W. Douglas, Forest Lake; David C. Johnson, Roseville; David R. Johnson, Oakdale; Joseph P. Kerzman, New Brighton; James R. McBreen, Shoreview; Hans C. Mikkelsen, Afton; Donna J. Plunkett, Sunfish Lake; Richard M. Shelton, Roseville; Francis A. Stephens, Oakdale; Wayne D. Ward, New Brighton, all of Minn.

[73] Assignee: Unisys Corporation, Blue Bell, Pa.

[21] Appl. No.: 08/800,344

[22] Filed: Feb. 14, 1997

Related U.S. Application Data

[63] Continuation of application No. 08/362,632, Dec. 22, 1994, abandoned.

[51] Int. Cl.[7] .................................................. G06F 15/163
[52] U.S. Cl. .......................................... 709/300; 709/103
[58] Field of Search .................................... 709/100, 102, 709/103, 106, 107, 300

[56] References Cited

U.S. PATENT DOCUMENTS

| 4,084,228 | 4/1978 | Dufond et al. | 364/200 |
| 4,394,725 | 7/1983 | Bienvenu et al. | 364/200 |
| 4,649,473 | 3/1987 | Hammer et al. | 364/200 |
| 4,694,396 | 9/1987 | Weisshaar et al. | 364/300 |

(List continued on next page.)

OTHER PUBLICATIONS

Gregory T. Byrd and Bruce A. Delagi, "Support for Fine–Grained Message Passing in Shared Memory Multiprocessors" Mar. 1989, Knowledge Systems Laboratory, Report No. KSL–89–15, pp. 1–20.

F.J. Burkowski, G.V. Cormack, G.D.P. Dueck, "Architectural Support for Synchronous Task Communication" Sigarch Computer Architecture News, vol. 17, No. 2, Apr. 1989, pp. 40–53.

Brian N. Bershad, Thomase E. Anderson, "User–Level Interprocess Communication for Shared Memory Multiprocessors" ACM Transactions on Computer Systems, vol. 9, No. 2, May 1991, pp. 175–198.

Joseph Pasquale, Eric Anderson, P. Keith Muller, "Container Shipping Operating System Support for I/O Intensive Applications" IEEE Computer Mar. 1994, pp. 84–93.

Gary J. Nutt, "Centralized and Distributed Operating Systems" Prentice–Hall, Inc., 1992, pp. 31–37, 109–117.

*Primary Examiner*—Majid A. Banankhah
*Attorney, Agent, or Firm*—Beth L. McMahon; Charles A. Johnson; Mark T. Starr

[57] ABSTRACT

A system and method for interprocess communication between concurrently executing, cooperating sequential processes in a digital computer system uses a shared memory queue as a mechanism for message passing and process synchronization. Data to be transferred from a sending process to a receiving process is stored in a queue entry which is visible in the virtual address space of the first process. The queue entry is added to a queue by the sending process directing the processor to execute an enqueue instruction. The receiving process removes the queue entry from the queue by directing the processor to execute a dequeue instruction. The receiving process then has direct access and visibility to the contents of the queue entry without having to copy the data into its virtual address space. Instead of sending data in a queue entry, a sending process may send an event indicator and no data. The receiving process may then wait on an empty queue until an event notification is received in a queue entry enqueued to the queue. Protection is provided by the system to prevent unauthorized access to the queue by other processes active in the system.

48 Claims, 25 Drawing Sheets

U.S. PATENT DOCUMENTS

| | | | |
|---|---|---|---|
| 4,807,111 | 2/1989 | Cohen et al. | 364/200 |
| 4,937,737 | 6/1990 | Schwane et al. | 364/200 |
| 4,975,865 | 12/1990 | Carrette et aL. | 364/513 |
| 5,036,459 | 7/1991 | den Haan et al. | 364/200 |
| 5,073,852 | 12/1991 | Siegel et al. | 395/700 |
| 5,218,713 | 6/1993 | Hammer et al. | 395/800 |
| 5,222,217 | 6/1993 | Blount et al. | 395/325 |
| 5,224,215 | 6/1993 | Disbrow | 395/250 |
| 5,230,051 | 7/1993 | Quan | 395/700 |
| 5,313,638 | 5/1994 | Ogle et al. | 395/725 |
| 5,319,778 | 6/1994 | Catino | 395/600 |

SYSTEM ARCHITECTURE FOR IMPROVED MESSAGE PASSING AND PROCESS SYNCHRONIZATION BETWEEN CONCURRENTLY EXECUTING PROCESSES

This application is a continuation of application Ser. No. 08/362,632 filed on Dec. 22, 1994, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to multiprocessing digital computer systems and particularly to methods and systems for passing large messages between concurrently executing processes and for synchronizing concurrently executing processes.

2. Background Information

Processes are the most widely used unit of computation in computer programming and computer systems. Much of the work of an operating system of a computer is to provide an environment in which application programmers can define processes, execute them, and generally control their behavior. A process is a sequential unit of computation. The action of the unit of computation is described by a set of instructions executed sequentially on a Von Neumann computer, using a set of data associated with the process. The components of a process are the program to be executed, the data on which the program will execute, resources required by the program (for example, memory), and the status of the execution. For the process to execute, it must have a suitable environment including an engine for executing the program, memory for storing the program and data, and status information indicating the progress of the process. In contemporary computer systems, individual application programs may be implemented as a set of processes. These processes usually must be able to share information and/or synchronize their operation. There are a number of design strategies to allow multiple processes to communicate with one another. One possible strategy, called cooperative processing, is to allow the processes to have their own computer systems, requiring that the processes communicate with one another using a message-passing paradigm. For this approach to be effective, the communication mechanism must be very efficient If the processes need to communicate frequently, that is, they are fine-grained computations, then the network will likely be a bottleneck in the overall performance of the system. Another strategy is to allow the processes to share memory yet have their own Central Processing Unit (CPU) and control unit, thereby allowing interprocess communication (IPC) to take place in the common memory. This strategy is called multiprocessing. A third strategy, called multiprogramming, is to allow the processes to share memory and a single processor. In all of these strategies, supporting concurrent processes is difficult due to the need to share information among the processes. Efficiency in sharing information between processes and synchronizing processes is crucial.

Message-based interprocess communication (IPC) mechanisms have been employed in multiprogrammed uniprocessors and shared memory multiprocessors. In these mechanisms, messages are used to synchronize processes and to transmit information among a set of processes. A message contains a block of information formatted by a sending process in such a manner that it is meaningful to the receiving process. The message data may or may not be displayable on a computer display. It may consist of a portion of a file, an entire file, a collection of partial files, a collection of entire files, etc. In some existing systems, messages are kept in an area of memory that is shared by the processes. With this strategy, both the sending process and the receiving process always have access to a message. The shared memory scheme works without the need for copying the message, but the sending process is not prevented from (either accidentally or maliciously) modifying the data while the receiving process is processing the message. In addition, the receiving process can (accidentally or maliciously) modify the data while the sending process is preparing the message. This lack of security protection for the message is a significant limitation on such systems.

In other existing systems, messages are transmitted from one process to another by copying the body of the message from the memory of the sending process into the memory of the receiving process. If the receiving process is not ready to receive a message transmitted to it, some mechanism for temporarily storing the message is needed. In this situation, the operating system often will rely on the receiving process having a mailbox in which messages can be stored prior to the receiving process executing specific instructions to process the message. Thus, the typical path of information flow for passing a message from one process to another is as follows. The message is copied from the sending process's memory into the receiving process's mailbox, and then copied from the mailbox to the receiver's memory when the receiving process calls for the message. In general, two copy operations will need to be performed.

The receiving process's mailbox may be located in the operating system's memory or in the receiving process's memory. If it is located in the operating system memory, then mailboxes are a system resource that must be allocated to processes as required. If the mailbox is located in the receiving process's memory, then the operating system must rely on the receiving process to allocate the appropriate amount of memory, manage access to the mailbox, deallocate memory as required, etc.

An important limitation on message passing systems where the sending and receiving processes are prevented concurrent access to the message is the necessity of one or more iterations of copying the message data from one block of memory to another in order to pass the data between processes. The copying is necessary to ensure that the receiving process obtains an incorruptible message. These message passing systems use additional memory and limit overall system performance because of the time spent copying message data. The negative impact on performance of the message copy is insignificant for small messages. However, the cost of the message copy grows linearly with the size of the message. When the messages passed between processes become very large, such as is the case for large file transfers occurring in file transfer, graphics, and multimedia applications, system throughput suffers. The transfer of such messages, from 10,000 bytes for low resolution monochrome images to 10,000,000 bytes for high resolution E-size graphics, places a severe strain on the computer system's ability to provide output to an end-user in a timely fashion. A new mechanism that eliminates the copying of message data for communication between concurrently executing, cooperating processes yet provides adequate message data security is needed.

SUMMARY OF THE INVENTION

An object of this invention is to improve the performance of a computer system by providing instruction level support for message passing between processes and process synchronization.

Another object of this invention is to eliminate the need for message data copying between communicating processes in a multiprocessing computer system.

Yet another object of the present invention is to provide a system architecture whereby the system overhead for passing very large messages between processes is of the same order of magnitude as for passing small messages between processes.

Still another object of the present invention is to guarantee the integrity of the data in messages passed between concurrently executing, cooperating processes in a computer system.

A further object of this invention is to provide an application programmer with high level language, operating system, and instruction set architecture support for improved message passing and process synchronization capabilities.

Another object of this invention is to provide price/performance improvements for multi-thread, large message, low latency, cooperating processing environments.

Still another object of the present invention is to provide a low overhead mechanism for a process to wait for a message to arrive.

A further object of this invention is to provide a mechanism for transferring messages between processes where the units of storage used for holding the messages are static in absolute storage space and receive no special architectural treatment concerning residency in real storage space.

An additional object is to monitor and collect statistics on the usage of the functions for message passing and process synchronization in the system.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a novel system architecture for providing improved message passing and process synchronization capabilities. Critical enhancements are made to operating system functions to permit processes to pass large messages between them without incurring large performance penalties associated with multiple copy operations on the message data. High level language support is provided to enable an applications programmer to easily use the added functionality of the system. Hardware instruction level support is added to the system architecture to ensure that transfers of message data and synchronization of communicating processes take place at machine speeds, rather than through multiple software layers of process control in the operating system.

In accordance with an aspect of the invention, a method of interprocess communication within a computer operating system comprises the steps of creating a queue residing in shared memory, the queue including a queue header element and zero or more queue entry elements. Data to be transferred between a first process and a second process is placed into a queue entry that is not currently enqueued to the queue. The queue entry is visible to the first process, that is, it is in the first process's virtual space. Alternatively, an event indicator is placed in the queue header. The queue entry is added to the queue by the first process executing an enqueue instruction, which is a novel instruction in the instruction set architecture of the computer system. When the first process enqueues a queue entry, the queue entry is removed from the visibility of the first process. The queue entry is then removed from the queue by the second process executing a dequeue instruction, which is also an addition to the instruction set architecture. The dequeue of the queue entry renders the queue entry visible to the second process, that is, it is now in the virtual address space of the second process, and removes the queue entry from the virtual address space of the first process. Thus, ownership and access to the message data (or event indicator) in the queue entry is passed from the first process to the second process without requiring a copy to be made of the message data. The storage of the message data, and enqueuing and dequeuing of the queue entry are repeated for each group of data to be transferred from the first process to the second process. The queue can be deleted when no more groups of data need be transferred. Controls on access to the queue are provided to ensure that no unauthorized processes in the system can corrupt the message data being transferred, nor can unauthorized processes read the message data. Furthermore, unauthorized processes cannot even enqueue messages to the queue.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DESCRIPTION OF THE PREFERRED EMBODIMENT

Table of Contents

Figure 1:
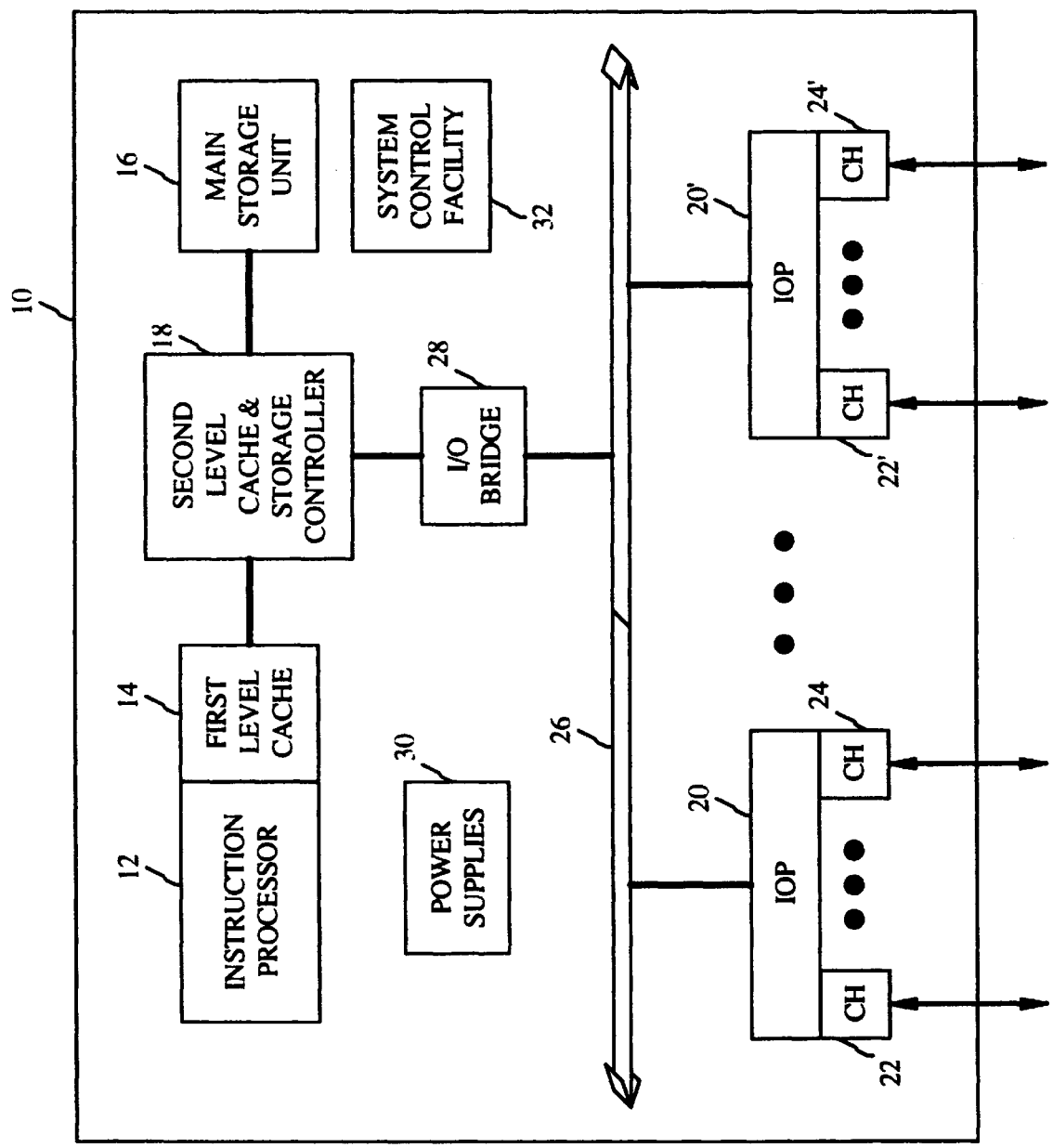
FIG. 1 is a block diagram of a 2200 Series computer system.

I. Functional Overview of the Queuing Architecture
   A. Basic Queue Structure
   B. Hierarchical Queuing
   C. Event Notification
   D. Queue Bank Resizing and Expansion
   E. Queue Count and Queue Bank Class
   F. Enqueuing to the Head of a Queue
   G. The Wait List
   H. Switching Queues
   I. The Inactive Queue Bank Descriptor List
   J. Queue Addressing and Protection
   K. Queue Instrumentation
II. Operating System Support for the Queuing Architecture
   A. Types of Queues
   B. Alias Queue Bank Descriptors
   C. Queue Resource Limits
   D. Queue Bank Absolute Space Allocation
   E. Operating System Services
      1. Create Queue Header
      2. Modify Queue Header
      3. Inspect Queue Header
      4. Delete Queue Header
      5. Create Alias Queue Header
      6. Delete Alias Queue Header
   F. Recirculation of Queue Entries
III. Hardware Support for the Queuing Architecture
   A. Queue Bank Definition
   B. Queue Bank Descriptor Definition
   C. The Enqueue (ENQ)/Enqueue To Front (ENQF) Instructions
   D. The Dequeue (DEQ)/Dequeue Or Wait (DEQW) Instructions
IV. High Level Language Support for the Queuing Architecture
   A. Enqueue
   B. Enqueue To Front
   C. Enqueue Event
   D. Dequeue
   E. Dequeue Or Wait
   F. Sample C Program Using Queuing Architecture Functions
V. Using Queuing Architecture Structures
   A. Initialization and Termination
   B. Queue Bank Circulation
Appendix A
   A. ENQ/ENQF Algorithm
   B. DEQ/DEQW Algorithm
   C. ENQSWQ Algorithm
   D. WAIT ON QUEUE Algorithm
   E. DEQSWQ Algorithm I. Functional Overview of the Queuing Architecture The present invention is known as the "Queuing Architecture." The Queuing Architecture (QA) is implemented in the preferred embodiment as an improvement to the 2200 Series computer systems commercially available from Unisys Corporation. FIG. 1 is a block diagram of a 2200 Series computer system. The Computer System 10 includes one or more Instruction Processors (IPs) 12, each IP having its own First Level Cache 14. The IP executes instructions obtained from the Main Storage Unit 16 by the Second Level Cache and Storage Controller 18. The First Level Cache 14 provides for the acceleration of data and instruction fetches for the IP 12. Although only one Instruction Processor and First Level Cache are shown, multiple Instruction Processors and First Level Caches could be configured. The Main Storage Unit 16 provides the internal mass memory capability for the system. The Second Level Cache and Storage Controller 18 controls access to the Main Storage Unit (MSU) and accelerates the data from the MSU into the Instruction Processors. Other components of the system include one or more Input/Output Processors (IOPs) 20, 20', each IOP having one or more Channel Interfaces (CH) 22, 24, 22', 24', respectively. The Channel Interfaces may be connected to peripheral devices such as magnetic disk drives, magnetic tape drives, printers, other computer systems, etc. The IOPs 20, 20' interface the I/O channels through an I/O Bus 26 to the I/O Bridge 28. The I/O Bridge 28 is coupled to the Second Level Cache and Storage Controller 18. Because of the relative speed differences between the IOP 20, the I/O Bus 26, and the Channel Interfaces 22, 24, one IOP 20 may service multiple Channels, typically eight or sixteen Channels per IOP. Individual Channels contain interface circuitry for each Channel and the connections necessary for Channel cables to peripheral devices (not shown). Power Supplies 30 are provided to supply electrical power to the system. The System Control Facility (SCF) 32 is a maintenance and system control unit for initializing the system and the reporting of fault conditions.

The present invention is embodied in a set of novel hardware queuing instructions (which become a part of the instruction set architecture of the 2200 Series computer system) and related Operating System (OS) Executive (Exec) services to provide an efficient, protected message passing and process synchronization mechanism. It is contemplated that the present invention may also be implemented in the instruction set architectures and operating systems of other computer systems. The present invention supports the efficient passing of large binary objects or any other information shared between processes in a shared memory system. The invention uses queues to eliminate the need for data copying between concurrently executing, communicating processes within the computer system. In existing systems, copying of messages between processes is required in order to provide adequate protection of the messages passed. When the messages passed between communicating processes are small, the overhead for the message copy is insignificant. However, the cost of the message copy grows linearly with the size of the message. When the computer system attempts large file transfers or attempts to send multi-media messages, this overhead penalty becomes critical. The overhead cost to transfer very large messages, which may be used in applications such as digital video transmission, is currently very expensive in terms of the system resources used. In the present invention, ownership of the message is passed, negating the need to copy the message between subsystems or processes. Additionally, there is no need to introduce scrubbing or clearing of residual data.

Processes communicate with each other in the system by using commonly accessible queues to pass ownership of message. Thus, the conceptual model for data transfer is pass by reference, not pass by value. A queue client process places entries or events on a queue. A queue server process receives entries or events. An entry contains a message passed between a client and a server over the queue. The message consists of data or control information. The format of the message is not inherent to the QA. Rather, the message complies with the protocol contracted between clients and servers. An event is an indication that a condition known to both the client and server has occurred, but which contains no message. Thus, an event works as a synchronization mechanism between processes.

One of the advantages of the present invention is that it reduces the system overhead instruction pathlength for the context switching of processes by providing an efficient process synchronization mechanism. Instruction pathlength is the number of instructions (related to processing time) for executing a particular code (or decision) path through a computer program. System overhead instruction pathlength is the pathlength attributable to system overhead, not for direct application program use. The instruction pathlength of a process deactivate/activate sequence using the preferred embodiment of the present invention is 20% or less of the equivalent operation using existing process synchronization mechanisms. These savings are realized because the functions performing the context switch are executed directly in hardware/microcode rather than by interrupting the Exec software for handling, and by eliminating the need to search through a list of active processes potentially waiting on an event. In the existing communications program used by 2200 Series computer systems, message bunching is used to amortize instruction pathlength over several messages. The present invention also eliminates the need for message bunching, thereby improving message latency time. This advantage is important for application program environments where the response time requirements are measured at machine speeds (e.g., a few milliseconds for a file transfer).

Message protection is also provided by the present invention. When a message is enqueued, the message is removed from the visibility of the client process. This prevents the client process from overwriting the message, thereby providing the server process with a secure message. Hardware access checks using a standard lock and key mechanism are employed to prevent unauthorized access to the queues.

The present invention defines four new instructions for hardware support of message passing and process synchronization. By implementing support functions for message passing and process synchronization in hardware, overall system performance is improved significantly, thereby improving the efficiency of applications which perform a lot of interprocess communication, such as multi-media. These instructions encompass the actions of placing an entry or event on the head or tail of a queue, receiving an entry or event from a queue, and forcing a process deactivation to wait for an entry or event. The Enqueue (ENQ) instruction either adds an entry to the tail of a queue, or, if so specified for a queue, adds an entry to the head of a queue, or, if so specified by the programmer, places an event on a queue. The Enqueue To Front (ENQF) instruction either adds an entry to the head of a queue, or, if so specified by the programmer, places an event on a queue. The ENQF instruction completes the addition of a queue entry or an event only if the definition of the queue allows enqueuing to its head. The Dequeue (DEQ) instruction removes an entry from the head of a queue, if one exists. The Dequeue Or Wait (DEQW) instruction either removes the entry from the head of a queue, if one exists, or detects that an event has been placed on the queue, or if the queue is empty (i.e., it has no entries or events), causes the active process executing the instruction to deactivate until an entry or event is placed on the queue.

A. Basic Queue Structure

Figure 2:
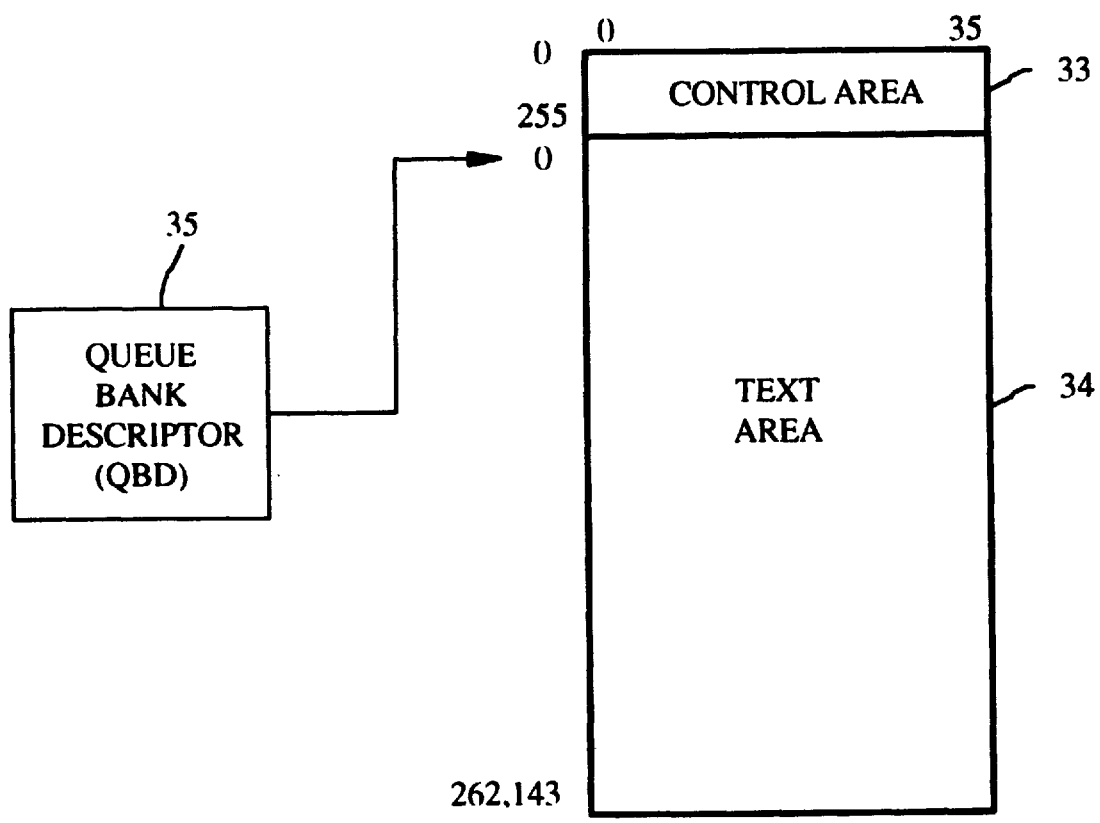
FIG. 2 is a diagram of the format of a Queue Bank.

A Queue is the conceptual model used by the present invention to attain improved message passing and faster process synchronization between processes. A Queue in the preferred embodiment consists of one Queue Header and zero or more Queue Entries. The object making up each element in the Queue is called a Queue Bank. A Queue Bank is a unit of storage visibility in the system. Queue Banks are units of storage visibility used as either Queue Headers, Queue Entries, or both. Queue Banks reside in the Main Storage Unit 16. A Queue Bank is comprised of two parts, a Control Area for control information, and a Text Area for message data. A Queue Bank is referenced and described by a Queue Bank Descriptor (QBD). FIG. 2 is a diagram of the format of a Queue Bank. In the preferred embodiment the Queue Bank contains a protected 256-word Control Area 33, which contains the queue links and various queue controls, and a 1- to 262,144-word Text Area 34, used to hold data specific to the queuing protocol used. The size of these fields could easily be modified in other embodiments of this invention. The number of words in the Text Area used is dependent on the size of the data being passed in the message. This size is specified by the Upper Limit field described below. A Queue Bank Descriptor (QBD) 35 is used to describe a Queue Bank. A Bank Descriptor is the basic storage structure used for managing the addressing environment. Bank Descriptors are referenced by the Bank Descriptor Index (BDI) field of a virtual address (VA). In the preferred embodiment, the VA is a 36-bit word identifying the name of the bank in which the address lies and the position of the address within the bank. The bank name identifies the Bank Descriptor that describes the bank.

Figure 3:
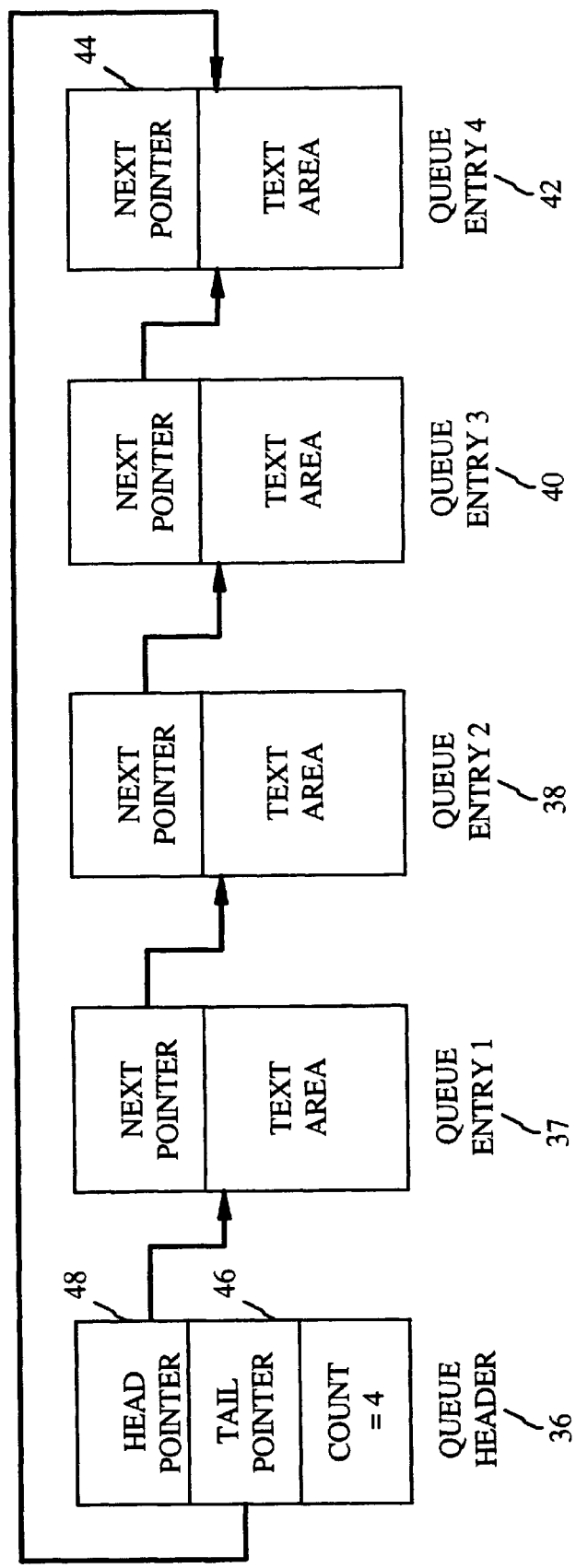
FIG. 3 is a diagram illustrating a sample Queue.

For each queue, one Queue Bank acts as the Queue Header. In the Queue Header, a Head Pointer and a Tail Pointer address the head and tail Queue Entries respectively. A Count is included in the Queue Header which stores the number of Queue Entries currently enqueued. In each Queue Entry, a Next Pointer points to the next Queue Entry in the Queue. In some situations, the contents of the Next Pointer, Head Pointer, Tail Pointer may be architecturally undefined. FIG. 3 is a diagram illustrating a sample Queue. The Queue Header 36 describes a Queue with four Queue Entries labeled 37, 38, 40, and 42, respectively. Execution of an ENQ instruction to this Queue Header 36 will add a Queue Entry to the tail of the Queue (unless a forced enqueue to the head of the queue is indicated in the Queue Header). The new Queue Entry 5 (not shown) will be pointed to by the Next Pointer 44 of Queue Entry 4 42, and by the Tail Pointer 46 of the Queue Header 36. Execution of a DEQ instruction based on this Queue Header 36 will retrieve Queue Entry 1 37, redirecting the Queue Header's Head Pointer 48 to point to Queue Entry 2 36. Execution of another DEQ instruction will retrieve Queue Entry 2 38, and so on.

B. Hierarchical Queuing

Figure 4:
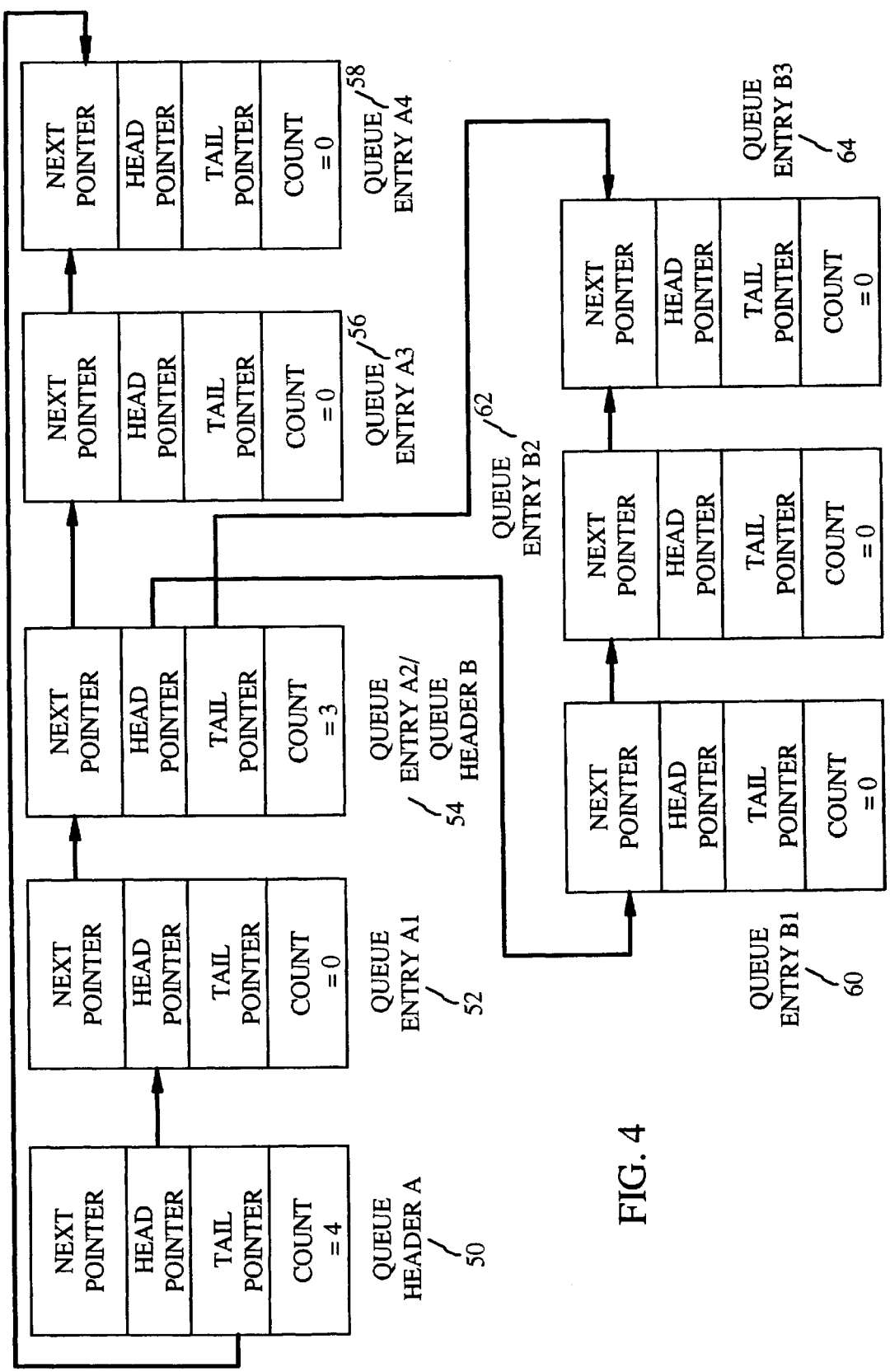
FIG. 4 is a diagram illustrating the concept of hierarchical Queuing.

To accommodate messages larger than can be placed in a single Queue Entry and certain order-critical protocols, the QA supports hierarchical queuing. With hierarchical queuing, one queue can be enqueued and dequeued as a single entity on another queue. To support hierarchical queuing, all fields relevant to both Queue Headers and Queue Entries are included in all Queue Banks. FIG. 4 is a diagram illustrating the concept of hierarchical queuing. In the example shown in FIG. 4, there are two Queues. Queue A, defined by Queue Header A 50, has four enqueued Queue Entries, A1 through A4, labeled 52, 54, 56, and 58, respectively. Queue B, defined by Queue Header B 54, has three enqueued Queue Entries, B1 through B3, labeled 60, 62, and 64, respectively. Queue Header B 54 is also Queue Entry A2 54 on Queue A. Queue B is enqueued to Queue A by executing an ENQ instruction with a Queue Entry of Queue Header B and a Queue Header of Queue Header A.

C. Event Notification

Event notification is provided for situations where the occurrence of an event must be reported to a queue server process, but no data need be passed over the queue. An event is placed on a queue by executing an ENQ or ENQF instruction when no Queue Bank Descriptor (QBD) is specified (i.e., in the preferred embodiment, with the general purpose register "A" having a value of zero). Instead of enqueuing a Queue Entry onto the Queue to hold the event notification in the Text Area, the Control Area of the Queue Header of the Queue is modified to indicate that an event has occurred. Thus, no extraneous enqueuing or dequeuing of Queue Banks containing no data is necessary. Only a single event can be placed on a queue. On a DEQW to a queue with one or more entries and an event, an entry is dequeued. On DEQW to a queue with no entries but an event, the event is dequeued. Events are ignored during the execution of a DEQ instruction.

D. Queue Bank Resizing and Expansion

Queue Bank resizing and expansion are used in situations where a Queue Bank may contain residual data to which the receiving client process is not allowed access. With this capability, the portion of the Text Area in the Queue Bank to which access is allowed is dynamically adjusted by modifying an Upper Limit value associated with a Queue Entry's Text Area. When an entry is enqueued to a Queue Header with a Resize On ENQ flag enabled (the flag being stored in the Queue Header's Control Area), a new Upper Limit value is specified by general purpose register "A" for the new Queue Entry. The new Upper Limit corresponds to the last word to which the dequeuing process will have access. When an entry is dequeued from a Queue Header with an Expand On DEQ flag set (the flag being stored in the Queue Header's Control Area), the Queue Entry's Upper Limit is expanded to give the dequeuing process full visibility into the Text Area of the Queue Entry. When an entry is dequeued, regardless of the Expand on DEQ flag being enabled or disabled, the dequeued Queue Bank's Upper Limit (prior to any expansion) is returned upon instruction completion. This original Upper Limit value is necessary for parameter address validation (i.e., to ensure that the client process did not pass an address beyond its visibility).

E. Queue Count and Queue Bank Class

An indication of the number of entries on the Queue is maintained in the Queue Header and returned upon instruction completion, when entries (not events) are enqueued or dequeued. The returned Count is the Queue's depth prior to the enqueue or dequeue operation. To safeguard against excessive depth, a maximum count for the Queue, called MAXCOUNT, is maintained in the Queue Header's Control Area. When an attempt is made to enqueue an entry and Count is greater than or equal to MAXCOUNT, the instruction terminates with an error.

A Class field is included in a Queue Bank's Control Area for situations where a Queue Header/Queue Entry relationship must be retained. During the execution of an ENQ/ENQF instruction, if the Queue Header's Class does not match the Queue Entry's Class, an addressing exception error is generated.

F. Enqueuing to the Head of a Queue

Queues can have three states in regard to queuing to the head of the Queue. The first state is when enqueuing to the head of the Queue is allowed, but not forced. While the Queue is in this state, the ENQ and ENQF instructions function as their names imply. The second state is when enqueuing to the head of the Queue is not allowed. While the Queue is in this state, execution of the ENQF instruction for this Queue causes an Address Exception fault to be generated. The third state is when enqueuing to the head of the Queue is forced. When the Queue is in this state, the ENQ instruction enqueues to the head of the Queue.

G. The Wait List

The Wait List is a linked list of Activity Save Areas (ASAs). An ASA holds the state information of server processes waiting for an entry to be placed on the Queue. Wait List entries are ASAs in Queue Banks. The length of the Wait List is given by the Wait List Count in the Queue Header Control Area. The head ASA on the Wait List is addressed by the Wait List Head Pointer in the Queue Header Control Area. For each ASA on the Wait List, a Next Pointer field in the ASA addresses the next ASA on the Wait List (or is architecturally undefined for the last entry on the Wait List). For the DEQW instruction, when the Queue is empty, the server process is removed from the processor and the ASA of the server process is placed on the Queue's Wait List. This operation is described by the WAIT_ON_QUEUE algorithm described in Appendix A. The Switching Queues (described below), which hold ASAs of processes ready to execute, are then searched for the next process to execute. For the ENQ operation to a Queue with a non-zero Wait List Count, a server process is moved from the Wait List to a Switching Queue. This operation is described by the ENQSWQ algorithm described in Appendix A.

H. Switching Queues

Switching Queues hold the state information for processes ready for execution. Switching Queue entries are ASAs in the Queue Banks. While Switching Queues have the same structure as generic queues, implicit enqueue and dequeue functions to the Switching Queues are defined. Following WAIT_ON_QUEUE, the Switching Queues are searched for the next process to execute. This operation is described by the DEQSWQ algorithm described in Appendix A. For the ENQ operation to a Queue with a non-zero Wait List Count, a server process is moved from the Wait List to a Switching Queue.

I. The Inactive Queue Bank Descriptor List

The Inactive Queue Bank Descriptor (QBD) List is a linked list of inactive QBDs. The Inactive QBD List is used by the hardware whenever a Queue Bank is dequeued from a Queue. When an entry is dequeued, a QBD is removed from the Inactive QBD List and the dequeued Queue Bank is mapped into the QBD. When an entry is enqueued, the QBD which addresses the Queue Bank is returned to the Inactive QBD List. The Queue Bank is then in the virtual address space of the dequeuing process. The Inactive QBD List is initialized by Exec software. All entries placed on the Inactive QBD List by the Exec software must have the Inactive bit clear and Upper Limits must be less than Lower Limits (i.e., the QBD must have collapsed limits); results are otherwise architecturally undefined. The Exec has the responsibility to supply each process with a list of Inactive QBDs. When the Exec gets an Inactive QBD List Empty Interrupt, it will allocate 64 Inactive QBDs for the process and chain them into the Inactive QBD List. This interrupt is generated when a process has tried to dequeue a Queue Entry, but does not have an Inactive QBD available. At this time, a check is made to be sure the program has not exceeded its maximum number of allowable QBDs. If it has, the process taking the interrupt is returned a contingency value, and no QBDs are allocated.

J. Queue Addressing and Protection

Queue Banks are static in absolute space and receive no special architectural treatment concerning residency in real space (i.e., a Queue Bank may or may not be resident whether or not it is currently enqueued). Queue Banks are mapped into and out of virtual space as they are manipulated by the queuing instructions. When a Queue Entry is dequeued from a Queue, the Queue Entry is mapped into the virtual space of the Queue server process. When a Queue Bank is enqueued to a queue, it becomes a Queue Entry and is removed from the virtual space of the client process, protecting the message in the Queue Entry's Text Area from corruption after enqueuing by the client process.

Access to queuing structures is controlled in three ways: access to enqueue to a Queue, access to dequeue from a Queue, and access to enqueue a particular Queue Entry. To minimize additional architectural state information, General Access Permission (GAP)/Special Access Permission (SAP) E, R, and W bits are used to control queuing access. The GAP and SAP values are used by the computer system to provide Lock and Key protection for requested accesses to memory. The GAP/SAP bits are interpreted as queuing controls only by the queuing instructions. Otherwise, when the Queue Bank is based, the GAP/SAP bits act as normal execute, read and write controls. A Queue Bank can be in one of three states. The first state is when the Queue Bank is used by queuing instructions as a Queue Header. The second state is when the Queue Bank is used by queuing instructions as a Queue Entry. The third state is when the Queue Bank is used as a normal data Bank, accessed with standard, non-queuing instructions. Queue Bank GAP/SAP bits are mapped as follows. If a Queue Header E bit is set, then ENQ/ENQF use of that Queue Bank as a Queue Header is permitted (i.e., enqueuing to that bank is enabled), and execution of code within that bank is permitted. If a Queue Header R bit is set, then DEQ/DEQW use of that Queue Bank as a Queue Header is permitted (i.e., dequeuing from that bank is enabled), and read references to data within that Queue Bank are permitted. If a Queue Header W bit is set, then ENQ/ENQF use of that Queue Bank as a Queue Entry is permitted (i.e., enqueuing of that bank is enabled), and write references to data within that bank are allowed. For ENQ/ENQF instructions, two "enqueue" access checks are made. The Queue Header E bit determines whether the process is allowed to enqueue to the Queue described by the Queue Header. The Queue Entry W bit determines if the process is allowed to enqueue this particular Queue Bank, thereby making it a Queue Entry.

Figure 5:
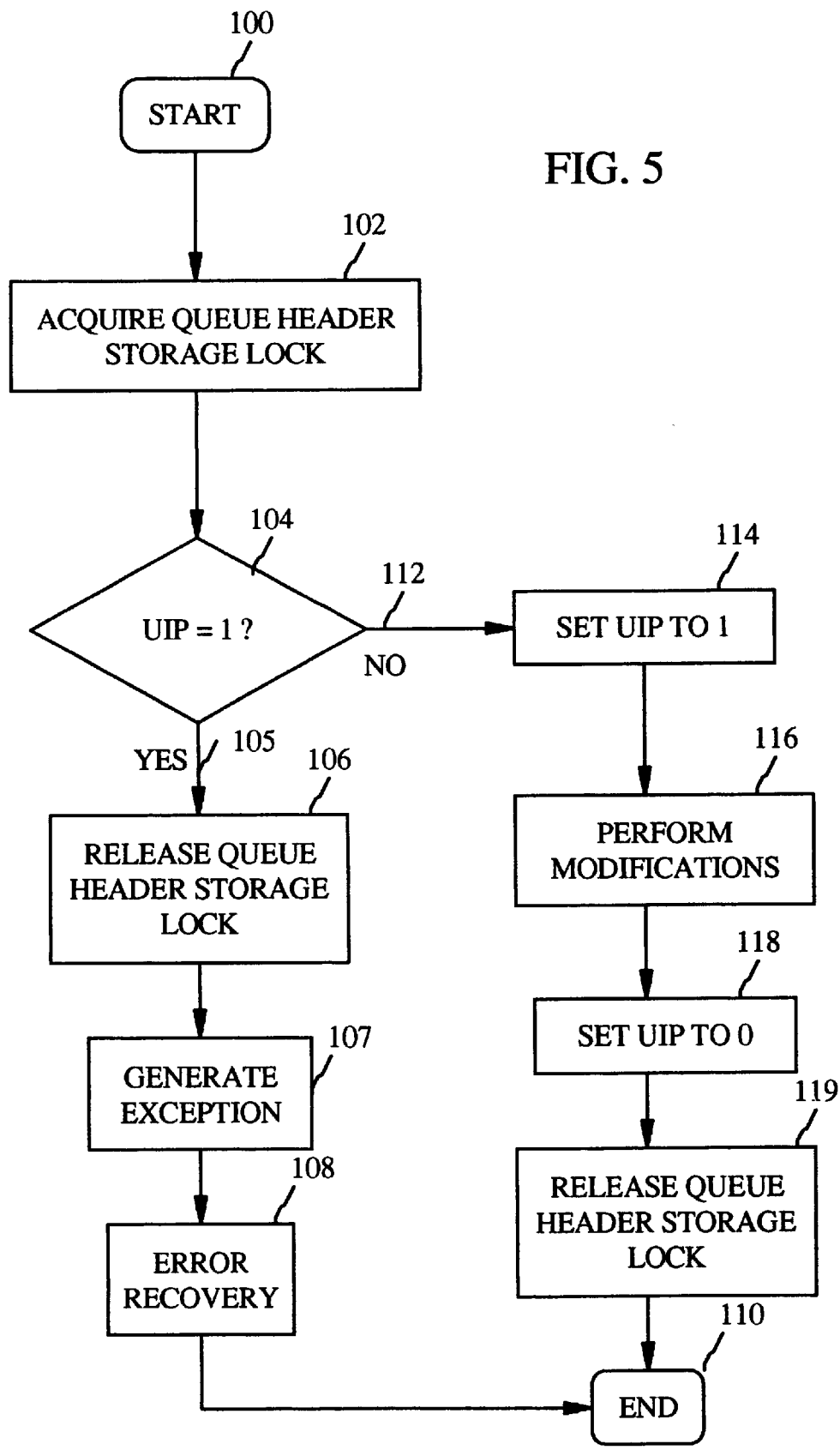
FIG. 5 is a flowchart of the steps for protecting the Queue modification process.

To ensure queue integrity, the queue manipulation portion of queuing instructions is performed with the Queue Header under storage lock. Functions are provided for Queue Header locking and unlocking to allow for Exec software manipulation of Queues. Exec software is free to change the contents of any Queue Bank Control Area field while the Control Area is locked. Hardware performs all Control Area accesses while the Control Area is locked. QBDs are not locked by either the queuing instructions or existing bank manipulation instructions. An Update In Progress (UIP) bit is included in the Queue Header Control Area to recover from a hardware fault when a Queue Header is locked. Both queuing instructions and Exec software utilize the following steps in accessing a Queue Header's Control Area. FIG. 5 is a flowchart of the steps for protecting the Queue modification process. After Start step 100, the requesting process must acquire the Queue Header storage lock at Step 102. At Test Step 104, if the Update In Progress bit is one, then another process is already attempting to modify the Queue Header. The Queue may be corrupted at this point. To avoid corrupting the Queue due to this process having acquired the storage lock despite the fact the UIP bit is still one, the Yes path 105 is taken to Step 106, where the Queue Header storage lock is released. Next, an exception is generated at Step 107, and error recovery for this error is performed at Step 108. Processing then ends at End step 110. The requesting process may try again at a later point in time. If the Update In Progress bit is zero at Test Step 104, then the Queue Header is available for modification. The No path 112 is taken and the requesting process sets the UIP to one at Step 114, to block other processes from attempting to modify the same Queue Header while the requesting process is accessing it. The requesting process performs all necessary modifications to the Queue Header in Step 116. When all changes have been made, the requesting process sets the UIP to zero (Step 118) and then releases the Queue Header storage lock at Step 1119. Processing ends at End step 110.

K. Queue Instrumentation

Two types of Queue instrumentation are provided. The first type, for performance analysis, monitoring, and fine-tuning of functional systems, is a set of Basic Queue Statistics (BQS) for a Queue. The BQS consists of a Cumulative Count, which is a count of all entries placed on the Queue, and a Cumulative Time, which is the total time that all entries have spent on the Queue. Cumulative Count is maintained in a one-word Queue Header Control Area field called CUMCOUNT. The Cumulative Count is calculated by hardware incrementing CUMCOUNT by one for each enqueue operation. Cumulative Time is maintained in the two-word Queue Header Control Area field called CUMTIME. Cumulative Time is calculated using the system Dayclock (which in the preferred embodiment has a granularity of 1 microsecond, and is right-justified). On enqueue operations, hardware writes the current Dayclock value to the two-word Queue Entry Control Area field called ENQTIME. On dequeue operations, ENQTIME is fetched from the Control Area of the Queue Entry being dequeued and subtracted from the current Dayclock value. The result is then added to CUMTIME in the Queue Header Control Area. The BQS provide information on total Queue activity and the average time messages spend on the Queue. These statistics are calculated when a BQS bit is set in the Queue Header.

Basic Queue Statistics are maintained on the following enqueue operations: an enqueue (ENQ) instruction, when an entry is enqueued; an enqueue to front (ENQF) instruction, when an entry is enqueued; and implicit enqueuing to a Switching Queue. Basic Queuing Statistics are maintained on the following dequeue operations: a dequeue DEQ) instruction, when an entry is dequeued; and a dequeue or wait (DEQW) instruction, when an entry is dequeued.

The second type of Queue instrumentation is for Queue monitoring. Queue Monitor reporting can be enabled on any combination of three events: whenever a particular Queue is accessed; whenever a particular message (Queue Entry) is accessed; and whenever a particular process executes a queuing instruction. The Queue Monitor condition is reported via a terminal addressing exception interrupt on any combination of the following three levels: on a Queue basis, it is enabled by the Queue Header Monitor (QHM) bit in the Queue Header Control Area; on a message basis, it is enabled by the Queue Entry Monitor (QEM) bit in the Queue Entry Control Area; on a process basis, it is enabled by a Designator Bit (DB) 0 in a Process-level Queue Monitor. Queue Monitor conditions are only reported as a result of the execution of explicit queuing instructions.

II. Operating System Support for the Queuing Architecture

A. Types of Queues

There are four types of Queues: Available Queues, a System Return Queue, Activity Local Queues, and Shared Level Queues.

Available Queues are used by a program to initially acquire Queue Banks. Available Queues are created via a Create Queue Header (CREATE$QH Exec) service call and programs dequeue their Queue Banks from them. As part of the Queuing Architecture security mechanisms, Available Queues are maintained on a domain basis. Queue Banks dequeued from an Available Queue have a full 262,144-word Text Area visible to the user process. Programs are not permitted to enqueue their used Queue Banks directly back to an Available Queue. As part of the Queuing Architecture (QA) security mechanism, programs must enqueue their used Queue Banks to the System Return Queue (described below) so that the Exec software can route each Queue Bank back to its home (or original) Available Queue. Recirculation of Available Queue Entries is described in Section F below. The CREATE$QH parameters allow the caller to specify the initial number of available Queue Entries to place on the Available Queue, as well as the maximum number allowed. When an Available Queue is found to be empty (or close to empty), the Modify Queue Header (MODIFY$QH) Exec service call can be used to increase the number of available Queue Banks (not to exceed the maximum as defined by the CREATE$QH Exec call). Alternatively, a Dequeue or Wait (DEQW) instruction can be executed to wait on the Available Queue until the Exec returns Queue Banks to the Available Queue.

There is one System Return Queue (SRQ) to which unneeded Queue Banks are enqueued. The Exec is responsible for routing Queue Banks returned to the SRQ back to their home Available Queue with a fully expanded Text Area. The SRQ is utilized to force the recycling of Queue Banks back to the owning process, without requiring that the Text Area in each Queue Entry be cleared. Thus, a previously used Queue Bank containing residual data may be returned to an Available Queue without violating security rules. Special consideration must be taken when processes or programs with Queue Banks terminate. All Queue Banks in the addressing environment of the process or program must be put on the System Return Queue. Additionally, all Queue Banks enqueued to a Queue Header in the addressing environment of the process or program must be released. For Queue Headers other than the Available Queue Header, this is done by enqueuing the Queue Header to the System Return Queue.

Process Local Queues are those where the Queue Header is described by an Process Local Queue Bank Descriptor (QBD). Process Local Queues can be created by using an off-queue Queue Bank as a Queue Header. The number of entries that can be enqueued to a Process Local Queue is limited by a maximum count. This value is determined when the Process Local Queue Bank's home Available Queue is created by a CREATE$QH service. Also, the MODIFY$QH service can be used to directly modify the maximum count of an off-queue Queue Bank owned by the program. Process Local Queues are useful for building sub-queues. A sub-queue is a queue that is added as a whole to another queue or removed as a whole from another queue. A Queue Bank is selected as the Queue Header for the sub-queue (this could be a Queue Bank used only as a Queue Header or the Queue Bank which holds the first part of a segmented message). Subsequent message segments are enqueued to the sub-queue until the sub-queue is complete, at which point the sub-queue is enqueued to the server process. The entire sub-queue can be enqueued to the server process's queue by specifying the sub-queue's Queue Header as the Queue Entry to be enqueued.

Shared Level Queues are those Queues where the Queue Header is described by an application-level Queue Bank Descriptor (QBD). These Queues may be shared between processes of a program or between programs. Shared Level Queues are initialized via the CREATE$QH Exec service.

B. Alias Queue Bank Descriptors

Figure 6:
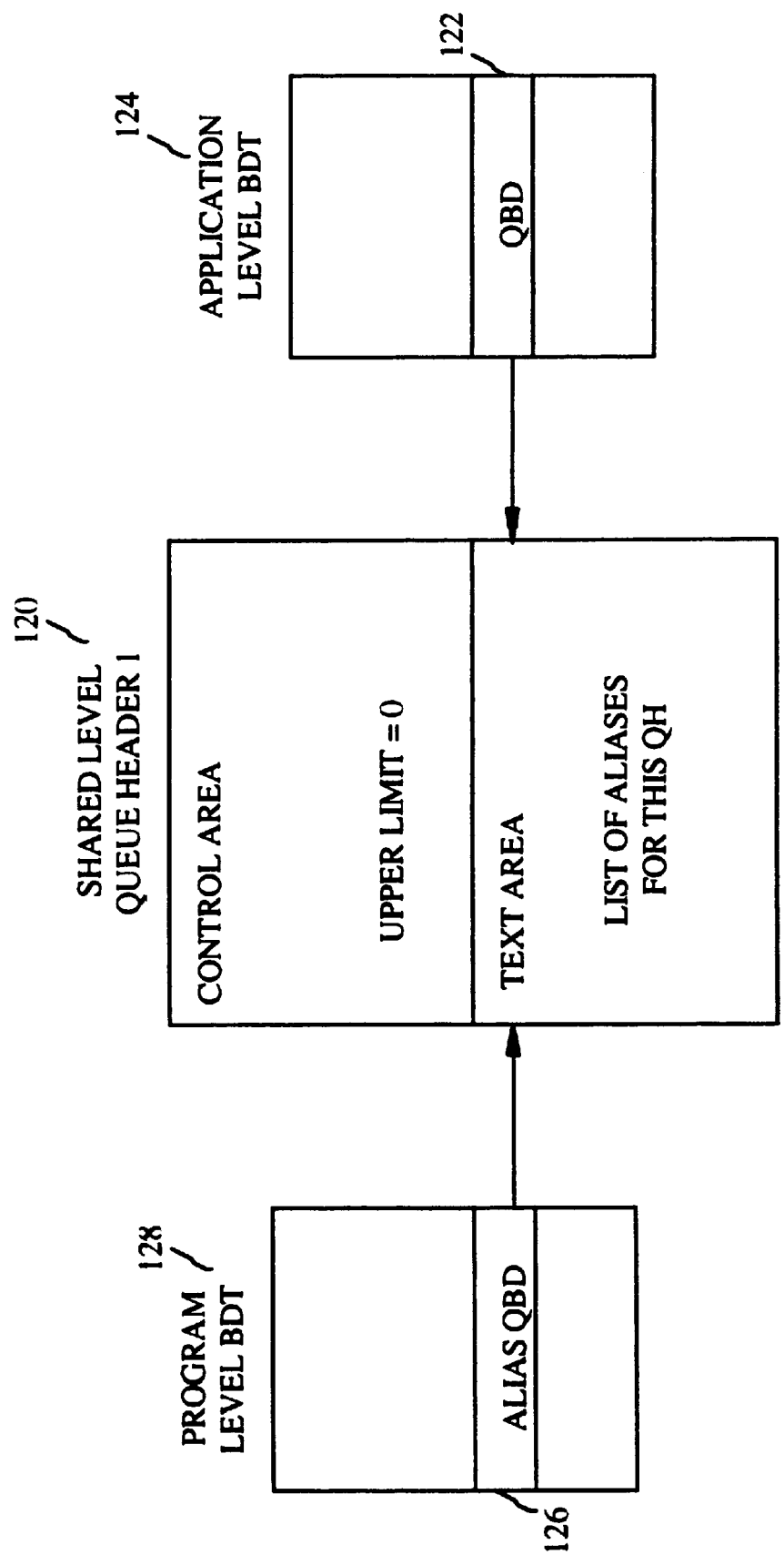
FIG. 6 is a diagram of an example of a shared level Queue Header with an Alias.

Alias Queue Bank Descriptors are alternate Bank Descriptors for a Shared Level Queue that are created in the same, or a different addressing environment as the Queue Header. Alias QBDs allow the Queue Header creator to selectively grant enqueue/dequeue access to other programs without enabling general access to the Queue or requiring a program transition (context switch). Thus, Alias QBDs allow more than one QBD to point to the same Queue Header at the same time. This allows the Queue Header to be in more than one program's virtual space at the same time, without relying on the GAP access of a shared level Queue Header to control access to the Queue. Alias QBDs are created by the Create Alias Queue Bank Descriptor (CREATE$AQH) Exec service. FIG. 6 is a diagram of an example of a shared level Queue Header with an Alias. Program A creates Queue Header 1 120 by a call to the CREATE$QH Exec service. Queue Header 1 120 is visible to Program A (i.e., is in Program A's virtual space). A QBD 122 in the Application Level Bank Descriptor Table (BDT) 124 points to the Text Area of the Queue Header. The Upper Limit field for the Text Area of the Queue Header is set to zero. Program B creates an Alias QBD 126 by a call to the CREATE$AQH Exec service. This Alias QBD is stored in a Program Level BDT 128 and points to Queue Header 1 120 also. Program A and Program B now have visibility into the same Queue at the same time.

C. Queue Resource Limits

The Exec provides gross limits on the Queue structure resources available to each program. The goal is to choose reasonable values that will prevent one program from excessive hoarding by setting limits for Queue Banks that may be created by the program, the number of QBDs for the program, and aggregate maximum counts for all Queue Banks created by the program.

In order to protect against excessive Queue Bank creation, the Exec enforces a Queue Bank Creation Limit on the number of Queue Banks that may be created by a program. This value, the Queue Bank Creation Count, is the summation of all Queue Banks created by CREATE$QH requests by a program and includes all entries created for Available Queues. Queue Banks that are passed to other programs still count against their original creator. The Queue Bank Creation Count is adjusted when the program either creates or deletes a Queue Header or Available Queue (either up or down). Violations are detected by the CREATE$QH and MODIFY$QH interfaces when the Queue Bank Creation Count exceeds the Queue Bank Creation Limit In the preferred embodiment, the Queue Bank Creation Limit is set at $2**15$.

In order to limit excessive hoarding of Queue Banks by a program, the Exec enforces a Maximum QBD Limit. This limit is the total number of QBDs (including inactive QBDs) for the program. A program exceeding this limit is most likely dequeuing large numbers of Queue Entries without releasing (enqueuing) any back to the System Return Queue. Maximum QBD Limit violations are detected at the dequeue instruction execution that requires an Inactive QBD List expansion. In the preferred embodiment, the Maximum QBD Limit is set at $2**15$.

Another safeguard against excessive Queue Bank hoarding is the Queue Maxcount Limit. The Queue Maxcount Count is the summation of all Maxcounts for all Queue Banks currently created by a particular program. This value does not include the Maxcount of Available Queues, but does include the values for entries on an Available Queue. The Queue Maxcount Count is adjusted when a program creates, modifies, or deletes Queues. Violations are enforced by the CREATE$QH and MODIFY$QH interfaces when the Queue Maxcount Count exceeds the Queue Maxcount Limit. In the preferred embodiment, the Queue Maxcount Limit is set at $2**19$.

E. Queue Bank Absolute Space Allocation

Absolute space for Queue Banks is allocated from the System Queue Bank region. This region is dedicated to Queue Bank space. Queue Banks are allocated space out of the region through a standard Exec absolute space allocation service and released by a standard Exec absolute space release service.

F. Operating System Services

1. Create Queue Header

The Create Queue Header (CREATE$QH) Exec service designates a Queue Bank to be used as a Queue Header that is shared between processes. (All Queue Banks that are dequeued from a Queue are local to the dequeuing process, and cannot be shared.) The CREATE$QH call may also be used to create the Available Queue of the user process. The CREATE$QH call allows the caller to create a Queue Header at a level of the address tree specified by the caller. Queue Headers created via CREATE$QH are never enqueueable and never writable. They are not writable because of the way the GAP Write access bit maps to the privilege to enqueue a Queue Entry. On any single CREATE$QH call, a maximum of eight Queue Header descriptor packets can be defined. Any of these eight descriptor packets can define either a normal Queue Header or an Available Queue containing a specified number of Queue Entries. The Queue Headers to be created are described by the packets passed in as a parameter to the CREATE$QH call. Error or warning conditions, as well as a pointer to the created Queue Header, are returned in each packet. Queue Headers created with CREATE$QH have their Upper Limit set to 0. Thus, only the first word of the Text Area is visible. Additionally, these Queue Headers are created without the access privilege to allow enqueuing to another Queue (SAP.W= GAP.W=0), and therefore no write access to a Queue Header created by CREATE$QH is allowed. The protection attributes applied to a Queue Header depend upon the access control specified and whether or not the caller has the privilege to request the access control.

Dequeuing from a program's Available Queue is the normal way a process acquires Queue Banks. For Available Queues, the value supplied in the packet's MAXCOUNT field is the number of Queue Entries that will be allocated. A non-zero value must be specified for the number of entries to place on the Queue. Available Queues are defined with the Special Access Privilege (SAP) allowing entries only to be dequeued from this Queue. Programs needing Queue Banks will require only one Available Queue.

Figure 7:
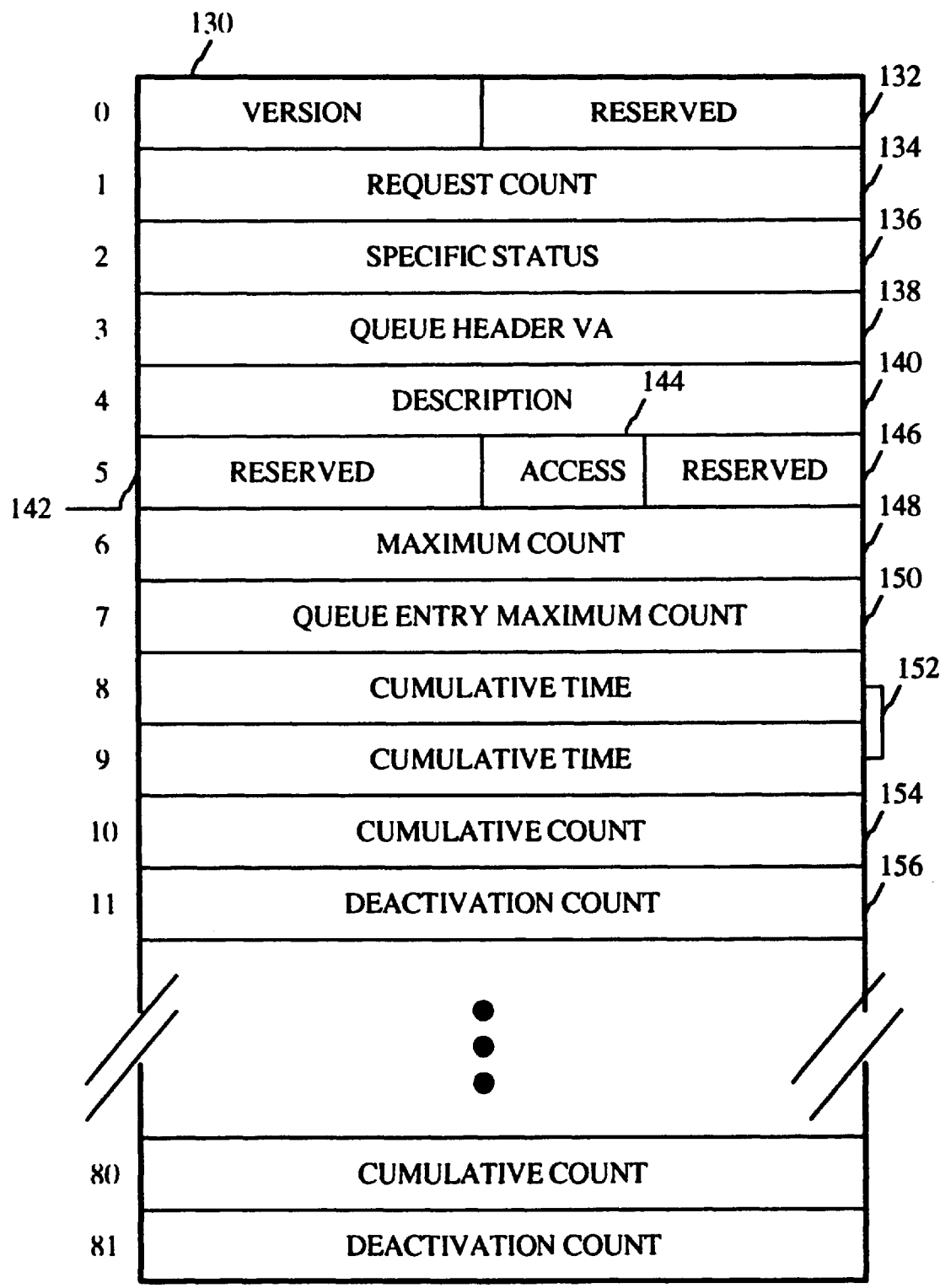
FIG. 7 is a diagram of the format of the Queue Header Packet.

The Queue Header Packet (QH_PACKET) is used by the Exec calls to Create Queue Header (CREATE$QH), Modify Queue Header (MODIFY$QH), and Inspect Queue Header (INSPECT$QH). It is used to pass the user-specified attributes required for the specific call. The Exec passes back the requested information pertinent to the call, as well as any error or warning conditions, in this packet. FIG. 7 is a diagram of the format of the Queue Header Packet. The Version field 130 in Bits 0–17 of Word 0 of the Queue Header Packet is the packet's version number. Bits 18–35 of Word 0 are Reserved 132. The Request Count field 134, in Bits 0–35 of Word 1, represents the number of Queue Header Request Packets that are passed in this Exec service call. The fields making up Words 2 through 11 of the Queue Header input packet shown in FIG. 7 comprise a Queue Header Request Packet and may be repeated up to seven additional times in the Queue Header input packet. The Specific Status field 136, in Bits 0–35 of Word 2, contains the status of this Queue Header request. The Specific Status field 136 contains the following status indicators. Bits 0–2 represent a Severity Code that is used as a return status, Bits 3–17 represent a Product Identifier, Bits 18–20 are reserved, and Bits 21–35 represent a unique Message Identifier. The Queue Header Virtual Address (VA) field 138, in Bits 0–35 of Word 3, is the VA of the target Queue Header. For a CREATE$QH call, this must be zero at call time and the VA of the created Queue Header is returned in this field. The VAs of Alias QBDs are not valid. The VA is ignored and left unchanged for INSPECT$QH and MODIFY$QH calls.

The Description field 140, in Bits 0–35 of Word 4, contains various attributes of the Queue Header as follows. Bit 0 is the Available Queue flag. When it is set, it indicates that this Queue is an Available Queue. The Exec creates an Available Queue with MAXCOUNT available Queue Entries enqueued on it. This flag is ignored for a MODIFY$QH call and returned from an INSPECT$QH call. Bit 1 is a Clear Queue Header Statistics flag. This flag is valid for INSPECT$QH and MODIFY$QH calls, else it must be zero. When this flag is set, the cumulative Queue statistics CUMULATIVE TIME, CUMULATIVE COUNT, and DEACTIVATION COUNT are cleared. This resets the values that are returned via the INSPECT$QH interface. For a MODIFY$QH call, modification of Basic Queue Statistics (BQS) must be requested for statistics to be initialized. Bit 2 is the Modify MAXCOUNT flag. This flag is valid only for MODIFY$QH calls, otherwise it must be clear. This flag is set if MAXCOUNT is to be modified. Bit 3 is the Modify BQS flag. This flag is valid only for MODIFY$QH calls, otherwise it must be clear. This flag is set if BQS collection is to be turned on or off. It also enables initialization of queue statistics. Bits 4–5 are reserved. Bits 6–11 specify the locality of the Queue. This field is valid only for CREATE$QH calls, otherwise it is ignored. This field controls the Address Tree level that the Queue Header is placed at. Only privileged processes may specify a locality more global than Program. The possible locality values are as in Table 1.

TABLE 1

| Locality | Value | Description |
| --- | --- | --- |
| System | 0 | QH placed at the level that is local to the entire system. |
| Application | 1 | QH placed at the level that is local to the application. |
| Run | 2 | QH placed at the level that is local to the run. |
| Program | 3 | QH placed at the level that is local to the program. |
| Process | 4 | QH placed at the level that is local to the process. |
| Caller | 5 | QH placed at the level of the subsystem that made the call. |
| Invalid | All others | Invalid locality. |

Bits 12–13 of the Description field 140 are the General Access bits. Only privileged callers may set these bits. These bits are ignored for MODIFY$QH calls and returned by Inspect Queue Header (INSPECT$QH) calls. The General Access bits specify the type of queuing access allowed for an executing process whose key does not match the Queue Header's lock. Bit 12 is the Enqueue Access flag. When set, it allows Queue Banks to be enqueued to this Queue Header. For non-queuing instructions, read access is allowed. Bit 13 is the Dequeue Access flag. When set, it allows Queue Banks to be dequeued from this Queue Header. For non-queuing instructions, execute access is allowed. Bits 14–23 are reserved and must be zero. Bit 24 is the Resize On Enqueue flag. It is valid only for privileged programs, otherwise it must be clear. When set, the Upper Limit of a Queue Entry may be dynamically adjusted when enqueued to this Queue Header. Programs cannot specify Resize On Enqueue for Available Queues. Resize On Enqueue and Expand On Enqueue (see below) cannot both be set at the same time. This flag is ignored for MODIFY$QH calls and returned for INSPECT$QH calls. Bit 25 is the Expand On Dequeue flag. It is valid only for privileged programs, otherwise it must be clear. When set, the Upper Limit of a Queue Entry is dynamically expanded to full text size when dequeued from this Queue Header. Programs cannot specify Expand On Dequeue for Available Queues. This flag is ignored for MODIFY$QH calls and returned for INSPECT$QH calls. Bits 26–29 are reserved and must be zero. Bits 30–31 represent the Front status. This field controls the ability to enqueue to the front of a Queue. A value of zero means normal enqueuing is allowed. A value of one signifies that queuing to the front is not allowed. A value of two means that enqueuing to the front of a Queue is forced. This field is ignored for MODIFY$QH calls and returned for INSPECT$QH calls. Bit 32 is reserved. Bit 33 is the Basic Queue Statistics flag. When set, BQS are calculated for this Queue. The flag is valid for MODIFY$QH calls when MODIFY_BQS is set and returned for INSPECT$QH calls. Bits 34–35 are reserved.

Bits 0–17 of Word 5 are Reserved 142 and must be zero. The Access field 144, in Bits 18–23 of Word 5, defines the degree to which access to the Queue Bank is to be restricted. This restriction is achieved by means of a ring value of the lock placed on the Queue Bank. Valid Access 144 values and associated ring values are shown in Table 2.

TABLE 2

| Access Value | Access Type | Ring Value |
| --- | --- | --- |
| 0 | Kernel | 1 |
| 1 | Shell | 1 |
| 2 | Trusted | 2 |
| 3 | Ordinary | 3 |
| 4 | Public | 3 |

For Available Queues, the ring value is always set to 1. The Access Control field is valid only for CREATE$QH calls, otherwise this field is ignored. Bits 24–35 of Word 5 are Reserved 146 and must be zero.

The Maximum Count field 148, in Bits 0–35 of Word 6, specifies the maximum number of Queue Entries allowed on this Queue. This must be a non-zero value. This value is input for CREATE$QH and MODIFY$QH calls, and returned on an INSPECT$QH call. For Available Queue requests, the number of available Queue Entries allocated to the Available Queue will be equal to Maximum Count 148. The cumulative number of Available Queue Entries created by a program may not exceed the Queue Bank Creation Limit. The summation of all Maximum Counts for all Queue Banks created by this program (not including Available Queues themselves, but including all the available Queue Entries on the Available Queue) must not exceed the Queue MAXCOUNT Limit. The Queue Entry Maximum Count field 150, in Bits 0–35 of Word 7, is the value placed in the MAXCOUNT field for all of the Queue Banks allocated to this Available Queue. It must be non-zero for all Available Queue requests and zero for normal Queue Header requests. This field is valid only for CREATE$QH calls, otherwise it is ignored.

The Cumulative Time field 152, in Bits 0–35 of Words 8–9, holds a count of the total time that all Queue Entries have spent on the Queue since the Cumulative Time was last cleared. Basic Queue Statistics must be enabled for this Queue Header for the Cumulative Time to be meaningful. This field is returned from an INSPECT$QH call, otherwise it is ignored. The Cumulative Count field 154, in Bits 0–35 of Word 10, holds a count of all Queue Entries which have been enqueued since the Cumulative Count was last cleared. Basic Queue Statistics must be enabled for this Queue Header for the Cumulative Count to be meaningful. This field is returned from an INSPECT$QH call, otherwise it is ignored. The Deactivation Count field 156, in Bits 0–35 of Word 11, is the cumulative count of the number of times the Queue server process has been deactivated, via a DEQW instruction, for this Queue. Basic Queue Statistics must be enabled for this Queue Header for the Cumulative Count to be meaningful. This field is returned from an INSPECT$QH call, otherwise it is ignored.

Figure 8:
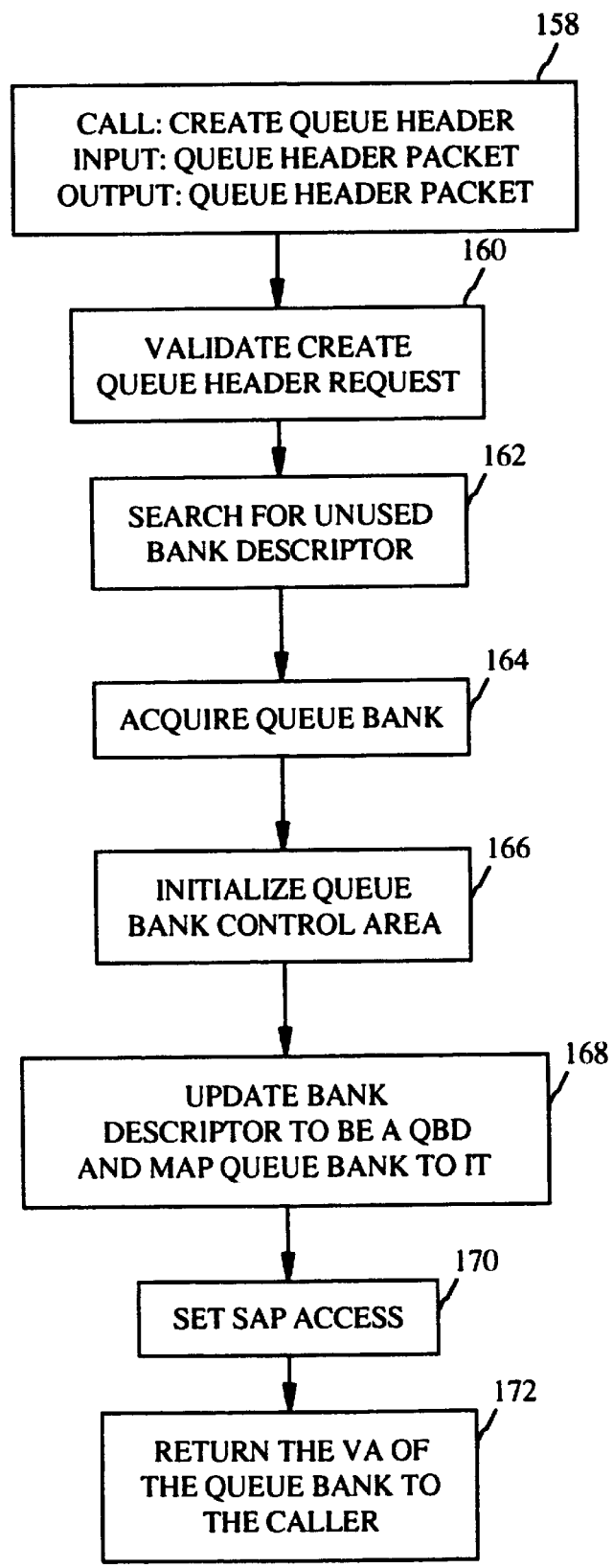
FIG. 8 is a flowchart of the processing steps for creating a Queue Header.

FIG. 8 is a flowchart of the processing steps for creating a Queue Header. The Exec service call 158 creates a Queue Header (CREATE$QH). It takes as input the Queue Header Packet, and also returns a modified Queue Header Packet. At Step 160, the Create Queue Header request is validated. The Exec verifies that the request is legal by ensuring the following requirements are met. The requested locality must be allowed for this caller. The caller must not have exceeded the Queue Bank Creation Limit. If the caller requested Resize On Enqueue or Expand On Dequeue, it must have the privilege to do so (i.e., is a trusted program). The caller cannot request both Resize On Enqueue and Expand On Dequeue. The caller must specify a non-zero MAXCOUNT. If the caller requested General Access Privilege (GAP) access, it must have the privilege to do so. The requested GAP is a subset of the Special Access Privilege (SAP). The caller has the privilege for the requested access control (ring value). The Exec, at Step 162, searches the appropriate Bank Descriptor Table (BDT) for an unused Bank Descriptor. The Queue Bank is acquired at Step 164, and the new Queue Bank's Control Area is initialized at Step 166. Next, the Bank Descriptor is updated to become a Queue Bank Descriptor (QBD) and the Queue Bank is mapped into it at Step 168. At Step 170, the SAP access is set to R if this is an Available Queue, or ER if this is not an Available Queue. Finally, at Step 172, the Virtual Address (VA) of the Queue Bank is returned to the caller.

2. Modify Queue Header

The Modify Queue Header (MODIFY$QH) Exec service call modifies various attributes of a Queue Bank. Queue Banks that can be modified include Available Queue Headers, Queue Headers created with the CREATE$QH call, and Queue Banks created as Available Queue Entries. Only the program that created the Queue Bank can modify it. Up to eight Queue Headers per call can be modified by the MODIFY$QH Exec service call. MODIFY$QH uses the Queue Header Packet (QH_PACKET), shown in FIG. 7, as an input and output parameter. The attributes of the Queue Header requested in each QH_PACKET passed in are modified. The attributes that can be modified by MODIFY$QH include Basic Queue Statistics (BQS) and MAXCOUNT. For Available Queues, the value supplied in the QH_PACKET field Maximum Count 148 is the number of Queue Entries to allocate to this Queue. Increasing or decreasing the Queue Header's MAXCOUNT will result in a corresponding increase or decrease in allocated available Queue Entries. The Exec software will decrease MAXCOUNT only up to the number of Queue Entries that are currently on the Queue. When the decrease in MAXCOUNT is greater than the number of currently linked Queue Entries, a warning status is returned to the caller to indicate that the value of MAXCOUNT was only partially decremented. For example, if the original value of MAXCOUNT is 200 and the requested value of MAXCOUNT is specified at 50, then there is a corresponding decrease of 150 allocated Queue Entries.

For normal Queue Headers, modifying MAXCOUNT to less than or equal to the current Queue count is an error. The Exec will try to facilitate multi-process programs that are requesting large increases in available Queue Entries by enqueuing Queue Entries on the Available Queue as they become available. Although the calling process will be waiting for the entire request to complete, other processes with access to the Available Queue can dequeue them as they are placed on the Queue.

Figure 9:
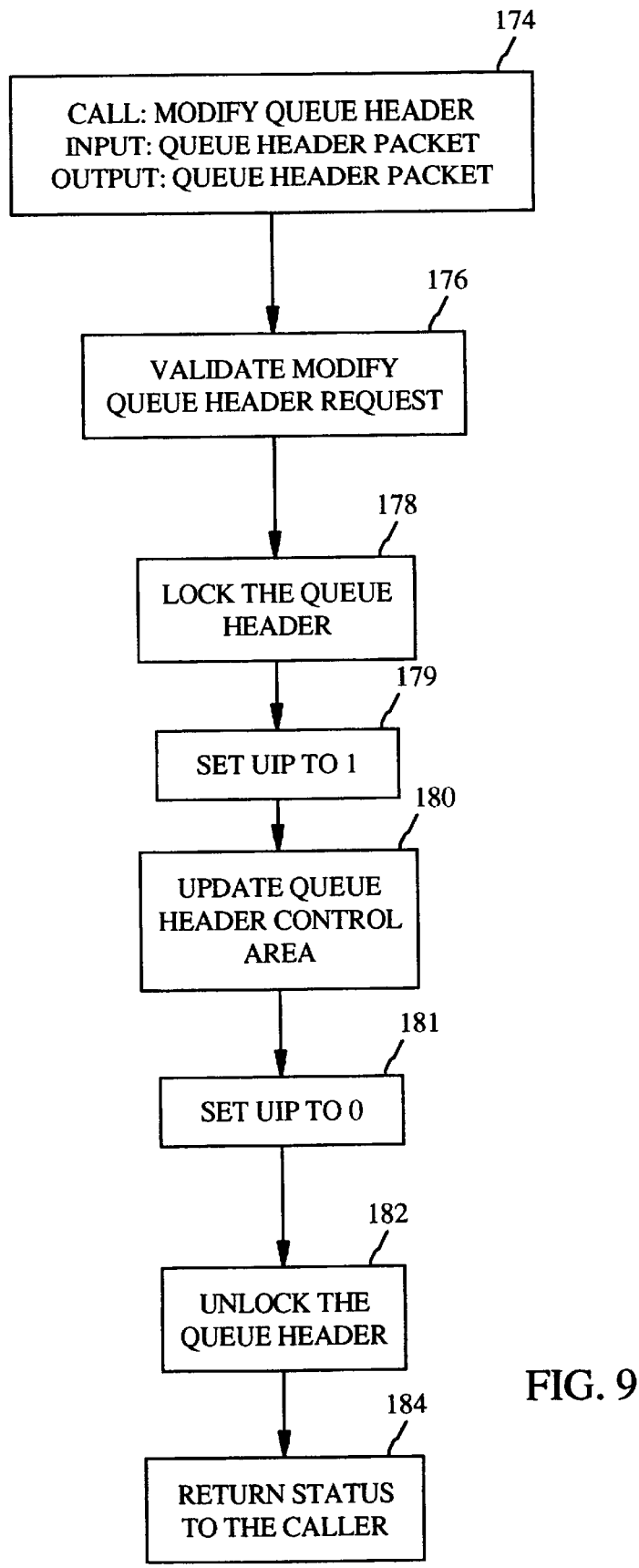
FIG. 9 is a flowchart of the processing steps for modifying a Queue Header.

FIG. 9 is a flowchart of the processing steps for modifying a Queue Header. The Modify Queue Header call (Step 174) uses the Queue Header Packet as an input parameter to get requests for changes to attributes and as an output parameter to return the status of the call. At Step 176, the Exec validates the Modify Queue Header request. The Exec verifies that the request is legal by ensuring the following requirements are met. The caller must not be calling MODIFY$QH with an Alias Bank Descriptor, and the Queue Bank to be modified must have been created by the caller. At Step 178, the Queue Header is locked to prevent any other process from attempting to access the Queue Header while a modification to it is taking place. The Update In Progress (UIP) bit is then set at Step 179. The Queue Header Control Area is updated at Step 180, and then the UIP is set to 0 at Step 181. Next, the Queue Header is unlocked at Step 182. Status is returned to the caller at Step 184 as Modify Queue Header processing ends.

3. Inspect Queue Header

The Inspect Queue Header (INSPECT$QH) service call is used to inspect the attributes of a Queue Bank, to retrieve Queue Monitor Statistics for a particular Queue, and to optionally reinitialize the statistics for the Queue to zero, if desired. Any Queue Bank may be inspected. This includes Available Queue Headers, Queue Headers created with CREATE$QH, and Queue Banks created as Available Queue Entries. The Queue Statistics are valid only for those Queues with Basic Queue Statistics enabled. The INSPECT$QH call takes the Queue Header Packet as an input parameter and also returns statistics to the caller in the Queue Header Packet. Up to eight requests in the Queue Header Packet may be passed into each INSPECT$QH call. Only Queue Banks created by the caller may be inspected.

Figure 10:
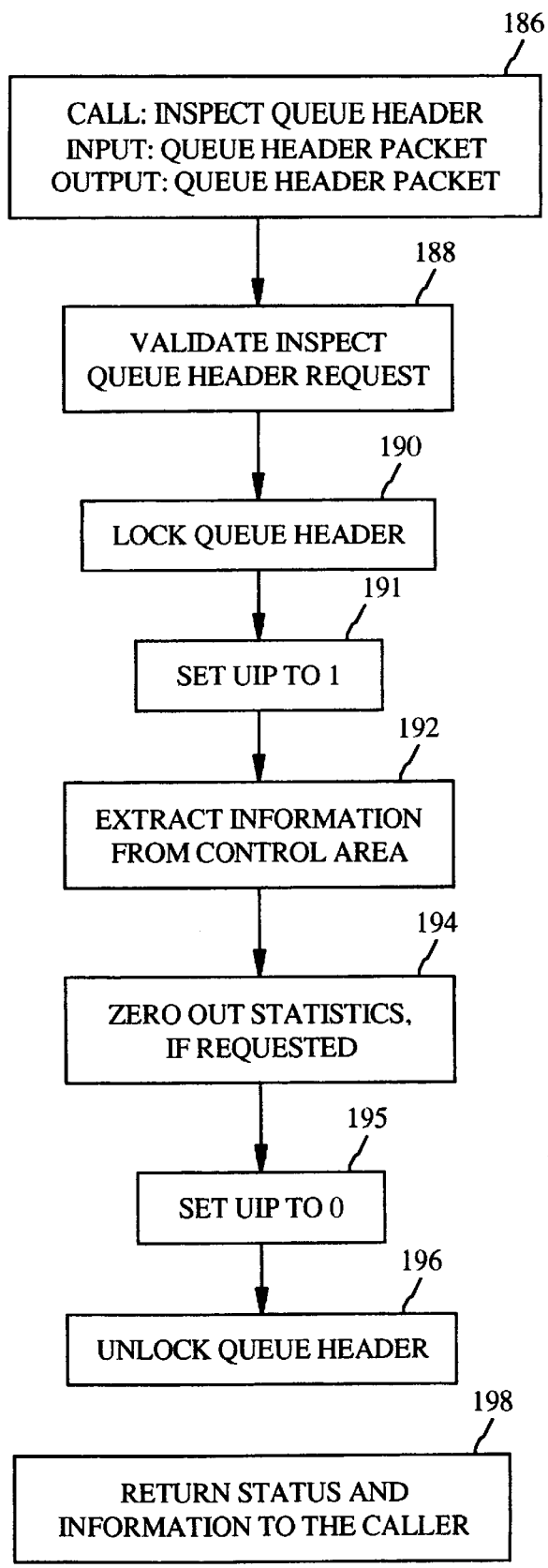
FIG. 10 is a flowchart of the processing steps for inspecting a Queue Header.

FIG. 10 is a flowchart of the processing steps for inspecting a Queue Header. The Inspect Queue Header call (Step 186) uses the Queue Header Packet as an input parameter to get requests to inspect attributes and as an output parameter to return the status and information from the call. At Step 188, the Exec validates the Inspect Queue Header request. At Step 190, the Queue Header is locked to prevent any other process from attempting to access the Queue Header while the inspection of it is taking place. The Update In Progress (UIP) bit is set at Step 191. The requested information is extracted from the Queue Header Control Area at Step 192, and the Queue statistics are zeroed out, if requested by the caller at Step 194. The UIP bit is then set to 0 at Step 195. At Step 196, the Queue Header is unlocked. Status and the extracted information are returned to the caller at Step 198 as Inspect Queue Header processing ends.

4. Delete Queue Header

The Delete Queue Header (DELETE$QH) service call deletes Queue Headers. Queue Banks that may be deleted with DELETE$QH are the Available Queue Headers and Queue Headers created with CREATE$QH. Queue Banks that were created as Available Queue Entries but are currently off-queue may not be deleted with DELETE$QH. They must be returned to the System Return Queue. Up to eight Queue Headers, created by CREATE$QH, can be deleted per call. The DELETE$QH call takes a Delete Queue Header Packet (DELETE_QH_PACKET) as an input parameter and returns the same as an output parameter. The Queue Headers described in each DELETE_QH_PACKET are removed from the caller's addressing space and are released (along with any Queue Entries currently linked on the specified Queue Header). Also, any programs that have access to the Queue Header through the CREATE$QH call have their visibility removed. Available Queues and any currently enqueued Queue Entries on the Available Queues are also released by a call to DELETE$QH and the result status is returned to the caller. Any off-queue Entries belonging to the deleted Available Queue will not be affected until they are returned to the System Return Queue. At that time, the off-queue Entries of the deleted Available Queues will be released.

Figure 11:
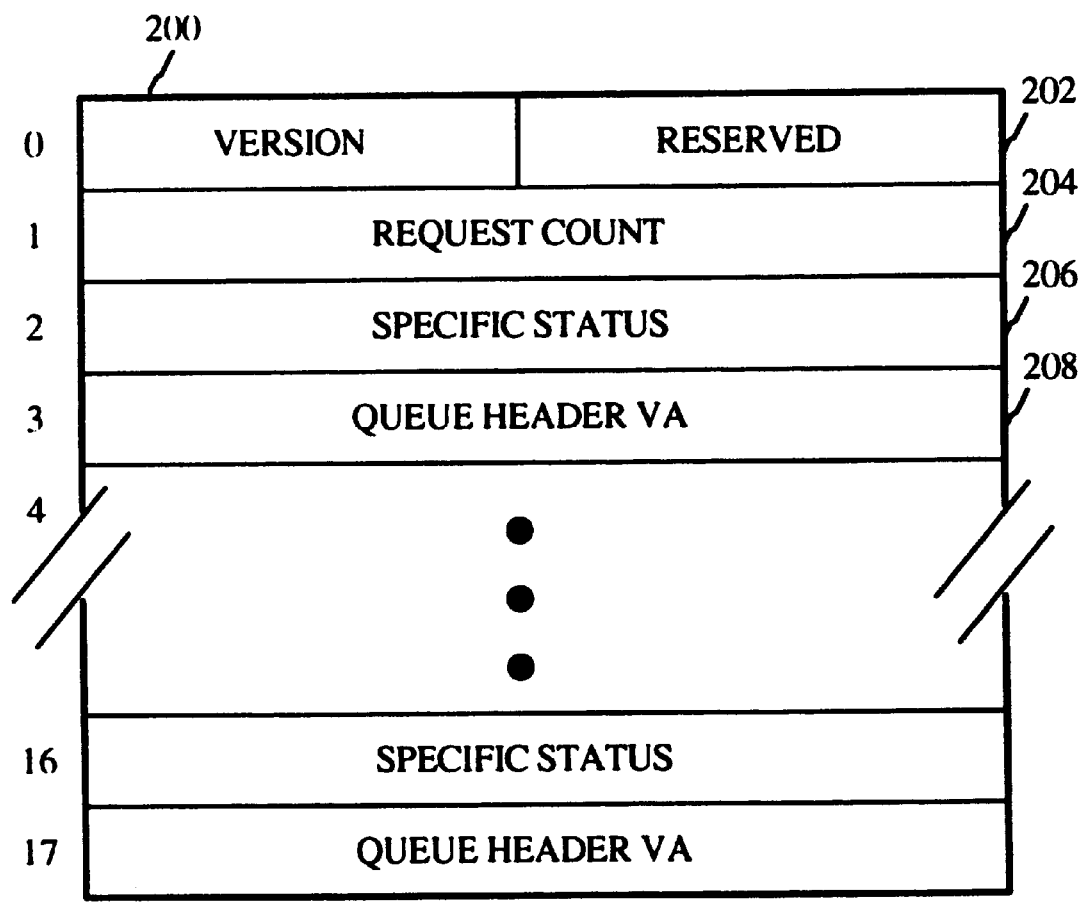
FIG. 11 is a diagram of the format of the Delete Queue Header Packet.

FIG. 11 is a diagram of the format of the Delete Queue Header Packet. The Version field 200, in Bits 0–17 of Word 0 of the Delete Queue Header Packet, is the packet's version number. Bits 18–35 of Word 0 are Reserved 202. The Request Count field 204, in Bits 0–35 of Word 1, represents the number of Delete Queue Header Request Packets that are passed in this Exec service call. The fields making up Words 2 and 3 of the Delete Queue Header Packet shown in FIG. 11 comprise a Delete Queue Header Request Packet and may be repeated up to seven additional times in the Delete Queue Header Packet. The Specific Status field 206, in Bits 0–35 of Word 2, contains the status of this Delete Queue Header request. The Specific Status field 206 contains the following status indicators. Bits 0–2 represent a Severity Code that is used as a return status, Bits 3–17 represent a Product Identifier, Bits 18–20 are reserved, and Bits 21–35 represent a unique Message Identifier. The Queue Header Virtual Address (VA) field 208, in Bits 0–35 of Word 3, is the VA of the target Queue Header to be deleted.

Figure 12:
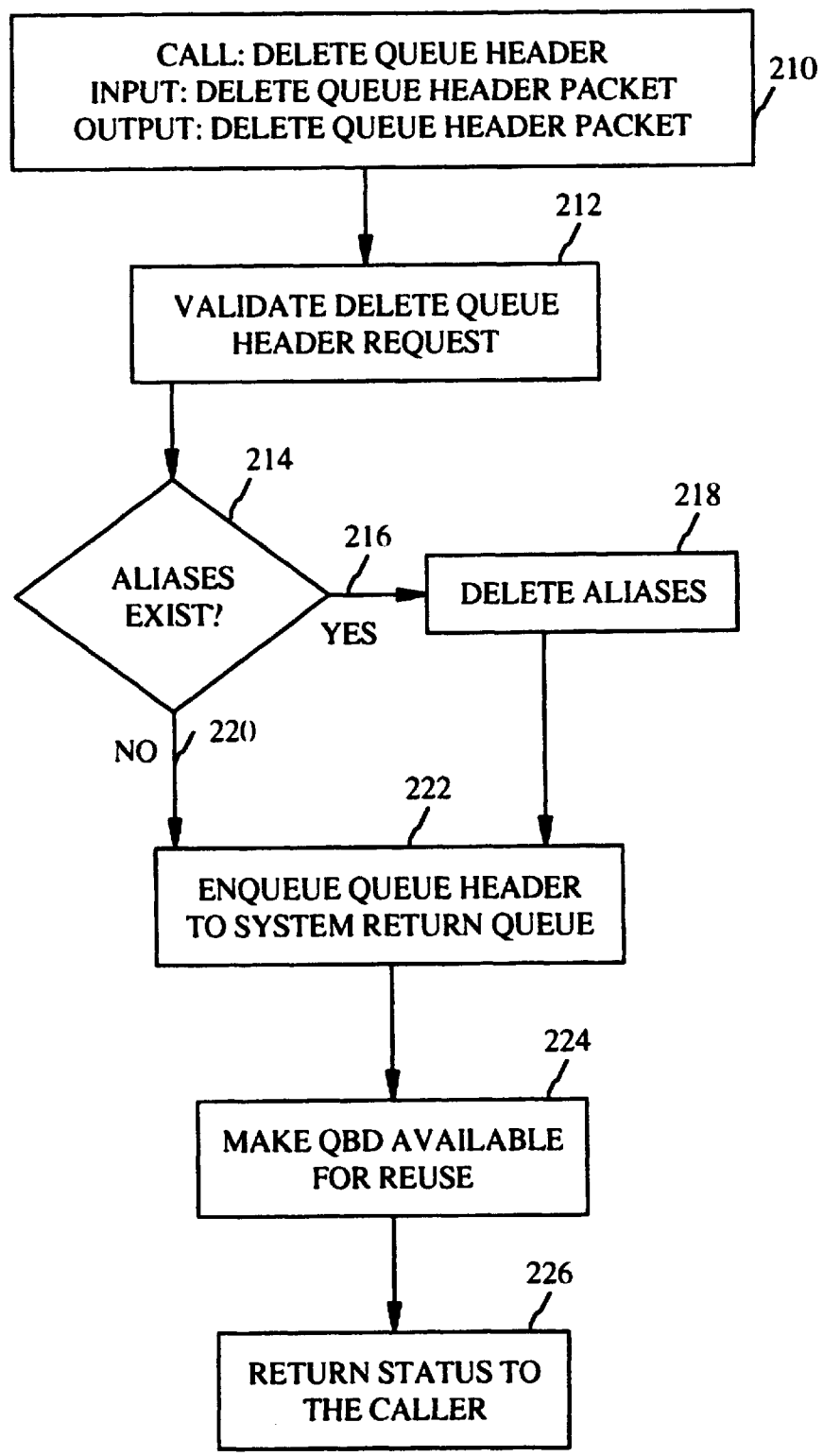
FIG. 12 is a flowchart of the processing steps for deleting a Queue Header.

FIG. 12 is a flowchart of the processing steps for deleting a Queue Header. The Delete Queue Header call (Step 210) uses the Delete Queue Header Packet as an input parameter to get requests to delete Queue Headers and as an output parameter to return the status from the call. At Step 212, the Exec validates the Delete Queue Header request. The Exec verifies that the request is legal by ensuring the following requirements are met. The caller must not be calling DELETE$QH with an Alias Bank Descriptor, and the Queue Bank to be deleted must have been created by the caller. At Test Step 214, the Exec determines if Aliases exist for the Queue Header. If any Aliases exist, Yes path 216 is taken to Step 218. At Step 218, all Aliases for this Queue Header are deleted. Processing then continues with Step 222. If no Aliases exist, No path 220 is taken to Step 222, where the selected Queue Header is enqueued to the System Return Queue. At Step 224, the Queue Bank Descriptor used to access the selected Queue Header is made available for reuse. Finally, at Step 226, a status is returned to the caller.

5. Create Alias Queue Header

The Create Alias Queue Header (CREATE$AQH) service call creates another Queue Bank Descriptor (QBD) for a Queue Header previously created by the caller using the CREATE$QH service call. The Queue Bank Descriptor of the Queue Header specified in the packet input to the call is copied to the addressing environment of the calling program's caller at the address tree level specified in the packet. This input packet is called the Create Alias Queue Header Packet (CREATE_AQH_PACKET). The Access lock of the new QBD is set to the Access lock of the program's caller and the Special Access Permission is set to the enqueue/dequeue attributes specified in the CREATE_AQH_PACKET. The new QBD is an Alias QBD of the Queue Header and its address is returned in the CREATE_AQH_PACKET. On any single CREATE$AQH call, Alias QBDs may be created for a maximum of eight Queue Headers. Different queuing attributes can be assigned to each Alias QBD created. When the status returned from the CREATE$AQH call is the failure status, no QBDs are created. A warning status indicates a QBD was not created for at least one of the Queue Headers. The reason for not creating the QBD is given by the specific status returned in each CREATE_AQH_PACKET. The Queue Headers must have been previously created by the caller using the CREATE$QH service call. Alias QBD names cannot be used to specify a Queue Header. An Alias QBD cannot be created for an Available Queue Header. Successfully created QBDs get the Access lock of the program's caller or the Access lock of the home program when CREATE$AQH is called from the home program. The ring portion of the Access lock is set to one and the General Access Permission field is set to zero. The locality cannot specify an address tree level that makes the Alias more globally shared than its corresponding Queue Header. Application level Queue Headers can have an Alias created at the application level, program level, or process level. Application level Aliases can be created only by programs executing at the application level. Program level Queue Headers can have aliases created at either program level or process level.

Figure 13:
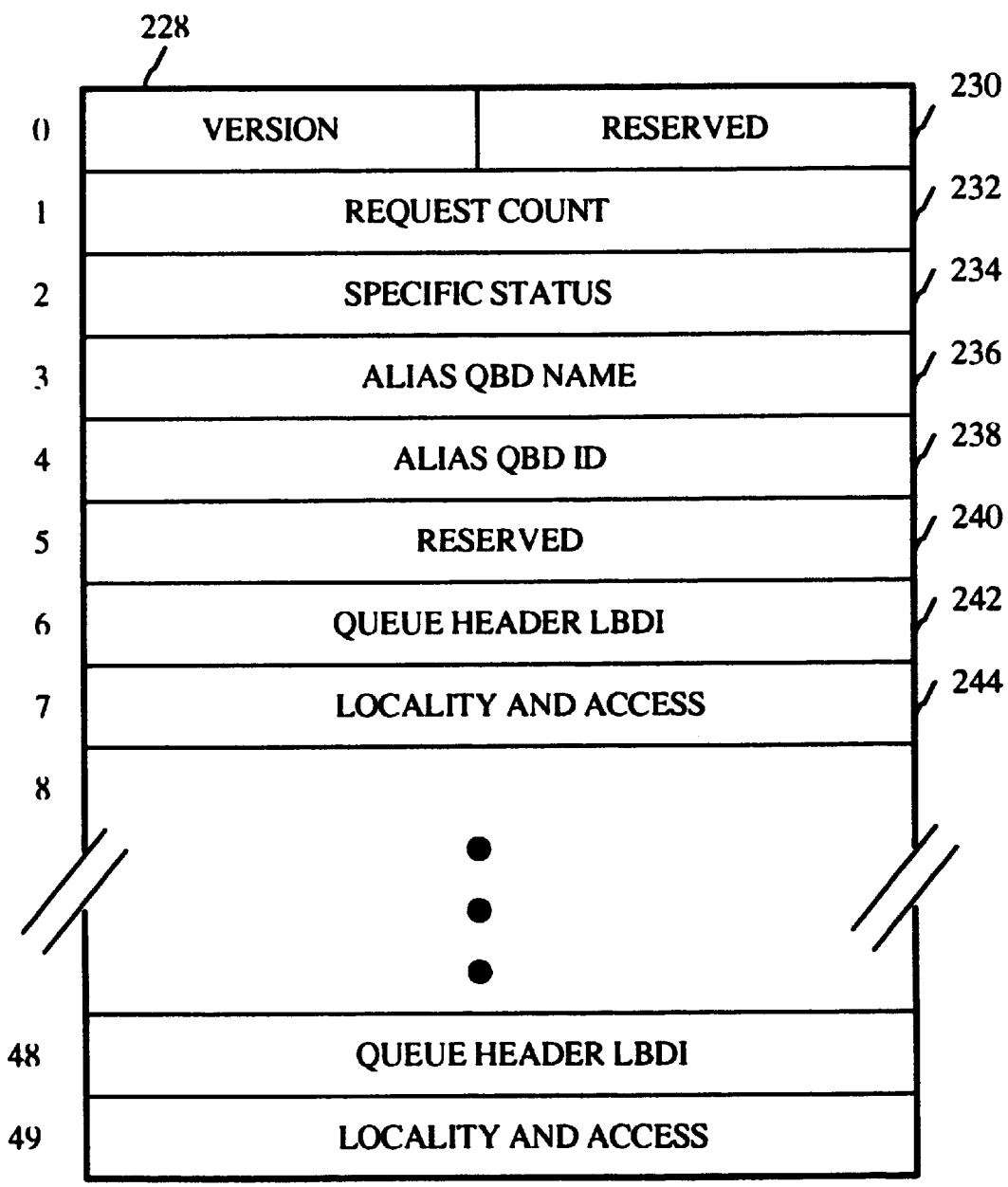
FIG. 13 is a diagram of the format of the Create Alias Queue Header Packet.

FIG. 13 is a diagram of the format of the Create Alias Queue Header Packet. The Version field 228 in Bits 0–17 of Word 0 of the Create Alias Queue Header Packet, is the packet's version number. Bits 18–35 of Word 0 are Reserved 230. The Request Count field 232, in Bits 0–35 of Word 1, represents the number of Create Alias Queue Header Request Packets that are passed in this Exec service call. The fields making up Words 2 through 7 of the Create Alias Queue Header Packet shown in FIG. 13 comprise a Create Alias Queue Header Request Packet and may be repeated up to seven additional times in the Create Alias Queue Header Packet. The Specific Status field 234, in Bits 0–35 of Word 2, contains the status of this Create Alias Queue Header request. The Specific Status field 234 contains the following status indicators. Bits 0–2 represent a Severity Code that is used as a return status, Bits 3–17 represent a Product Identifier, Bits 18–20 are reserved, and Bits 21–35 represent a unique Message Identifier. The Alias QBD Name field 236, in Bits 0–35 of Word 3, is loaded with the Level, Bank Descriptor Index (L,BDI) of the Alias QBD, created in the form of a virtual address with an offset of zero. The Alias QBD ID field 238, in Bits 0–35 of Word 4, is loaded with an identifier to allow deleting the Alias QBD from an addressing environment that does not include the Alias QBD. The Reserved field 240, in Bits 0–35 of Word 5, must be zero. The Queue Header LBDI field 242, in Bits 0–35 of Word 6, is the L,BDI of the Queue Header for which an Alias QBD is to be created. This field is in the form of a virtual address with an offset of zero.

The Locality and Access field 244, in Bits 0–35 of Word 7, hold the locality and access attributes for the Alias QBD. Bits 0–5 hold the locality value, which may be one of the values shown above in Table 1. Bit 6 holds the execute flag that indicates if execute access is allowed. For queuing instructions, this allows Queue Banks to be enqueued to this Queue Header. Bit 7 holds the read flag that indicates if read access is allowed. For queuing instructions, this allows Queue Banks to be dequeued from this Queue Header. Bits 8–35 are reserved and must be zero.

Figure 14:
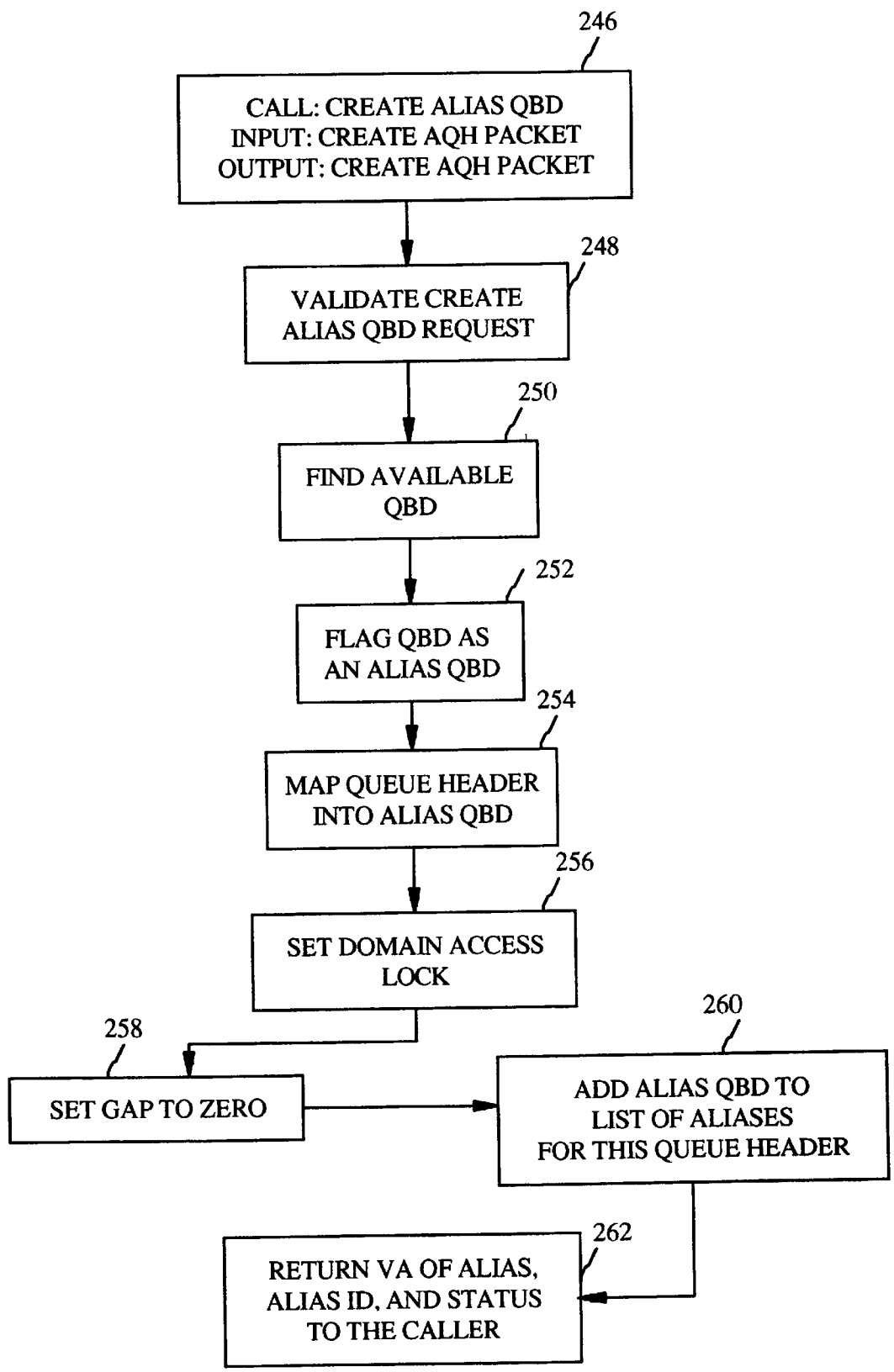
FIG. 14 is a flowchart of the processing steps for creating an Alias Queue Bank Descriptor.

FIG. 14 is a flowchart of the processing steps for creating an Alias Queue Bank Descriptor. The Create Alias Queue Bank Descriptor call (Step 246) uses the Create Alias Queue Header Packet as an input parameter to get requests to create Alias QBDs and as an output parameter to return the status and other information from the call. At Step 248, the Exec validates the Create Alias Queue Bank Descriptor request. The Exec verifies that the request is legal by ensuring the following requirements are met. The Queue Header must have been previously created by the caller with a CREATE$QH call. The requested locality cannot be more globally shared than that of the corresponding Queue Header. The requested SAP access must be a subset of the existing Queue Header's SAP. At Step 250, an available QBD is found at the requested level in the caller's addressing environment (or in the addressing environment of the home program, when CREATE$AQH is called from the home program). Next, at Step 252, the QBD located in Step 250 is flagged as an Alias QBD. The Queue Header is then mapped into the Alias QBD at Step 254. At Step 256, the domain portion of the Alias QBD's Access lock is set to the domain of the caller of the CREATE$AQH or the domain of the home program when CREATE$AQH is called from a home program. The Ring portion of the lock is set to one. At Step 258, the GAP field of the Alias QBD is set to zero. The Alias QBD is added to the list of Aliases for this Queue Header in Step 260. Note that the list of Aliases is not visible to the user, even though it is kept in the Queue Header Text Area. This is because the Upper Limit of the Queue Bank is set to zero, leaving only one word of the Text Area readable by the user. (The Upper Limit is set to zero for any Queue Header created via CREATE$QH.) The start of the Alias list is after the first word of the Text Area, so it is not visible to the user. Finally, at Step 262, the Virtual Address (VA) of the Alias, the Alias ID, and status are returned to the caller.

6. Delete Alias Queue Header

The Delete Alias Queue Header (DELETE$AQH) service call deletes Alias QBDs previously created with calls to CREATE$AQH. The QBD specified by the Alias QBD name passed into this service in the Delete Alias Queue Header Packet (DELETE_AQH_PACKET) is changed to a QBD that can be re-used. An Alias QBD can be deleted only by the program that created it. The Queue Header pointed to by the Alias QBD must always be in the caller's addressing environment.

Figure 15:
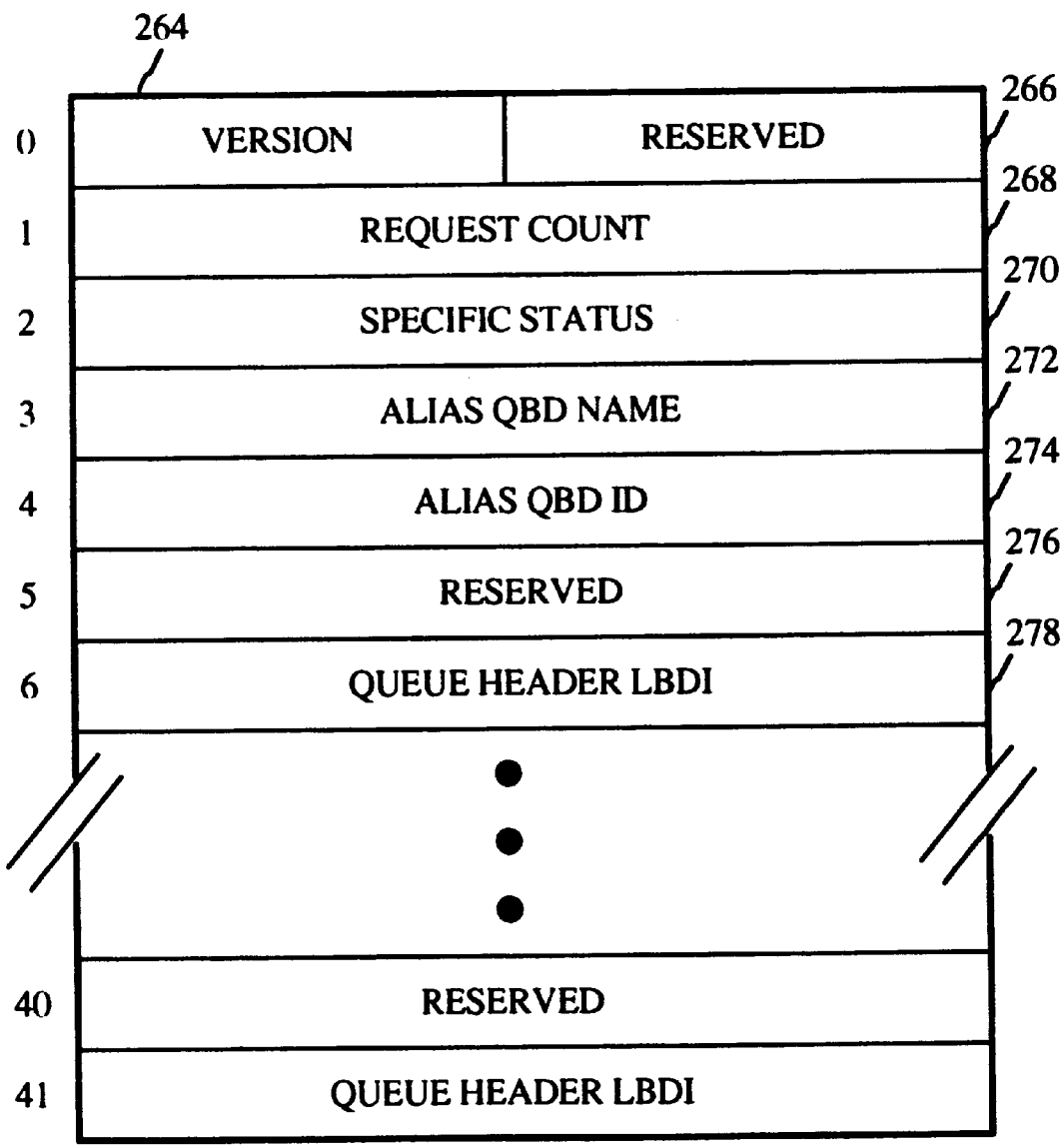
FIG. 15 is a diagram of the format of the Delete Alias Queue Bank Header Packet.

FIG. 15 is a diagram of the format of the Delete Alias Queue Bank Header Packet. The Version field 264, in Bits 0–17 of Word 0 of the Delete Alias Queue Header Packet, is the packet's version number. Bits 18–35 of Word 0 are Reserved 266. The Request Count field 268, in Bits 0–35 of Word 1, represents the number of Delete Alias Queue Header Request Packets that are passed in this Exec service call. The fields making up Words 2 through 6 of the Delete Alias Queue Header Packet shown in FIG. 15 comprise a Delete Alias Queue Header Request Packet and may be repeated up to seven additional times in the Delete Alias Queue Header Packet. The Specific Status field 270, in Bits 0–35 of Word 2, contains the status of this Delete Alias Queue Header request. The Specific Status field 270 contains the following status indicators. Bits 0–2 represent a Severity Code that is used as a return status, Bits 3–17 represent a Product Identifier, Bits 18–20 are reserved, and Bits 21–35 represent a unique Message Identifier. The Alias QBD Name field 272 is in Bits 0–35 of Word 3. If zero, the Alias QBD to delete is specified by this field and Queue Header LBDI 278. If not zero, this is the L,BDI, OFFSET of the Alias QBD to delete. The QBD must be in the address environment of the caller and Alias QBD ID 274 must be zero. The Alias QBD ID field 274, in Bits 0–35 of Word 4, is the identifier returned by the CREATE$AQH call. Together with Queue Header LBDI, this specifies the Alias QBD to delete. When this field is zero, Alias QBD Name 272 specifies the Alias QBD to delete. The Reserved field 276, in Bits 0–35 of Word 5, must be zero. The Queue Header LBDI field 278, in Bits 0–35 of Word 6, is the L,BDI of the Queue Header of the Alias QBD. Together with Alias QBD Name 272, it specifies the Alias QBD to delete.

To delete an Alias QBD, the Exec removes the Alias QBD from the selected Queue Header's Alias List and makes the Alias QBD available for re-use.

G. Recirculation of Queue Entries

Available Queues are used to initially allocate Queue Banks to a program. Queue Banks are recirculated on a program basis. A Queue Bank 'belongs' to the program it is assigned to until the Queue Bank is released or the program terminates.

Figure 16:
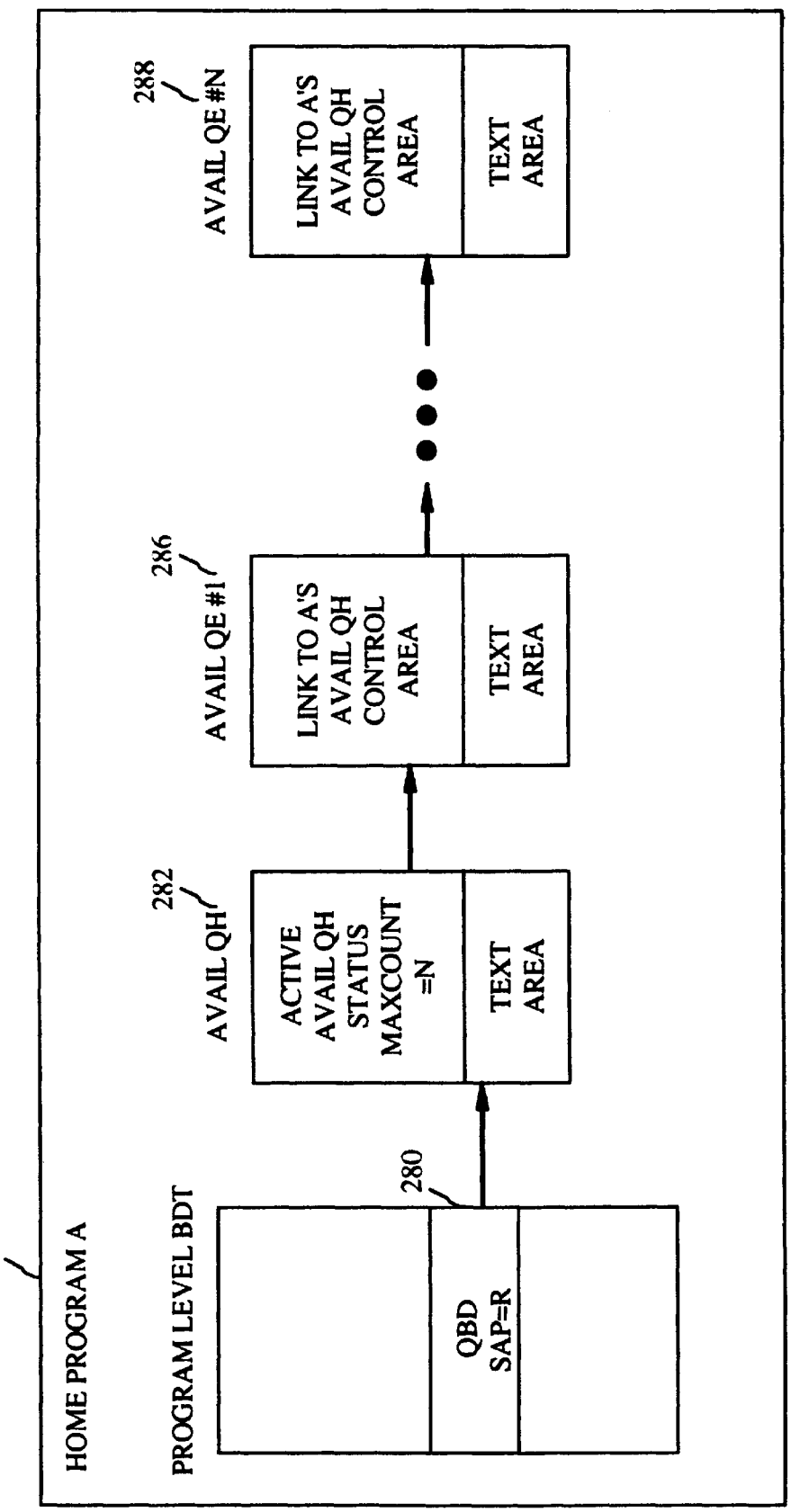
FIG. 16 is a block diagram of an example of an Available Queue.

A program calls the CREATE$QH service to create an Available Queue of N Queue Banks (where N is input by the caller). The Exec allocates a Queue Bank for the Available Queue Header with a status of "active" written into its Control Area to identify it as a currently active Available Queue. The Exec allocates absolute space for each available child Queue Entry to be enqueued on the parent Available Queue. As the child entries are placed on the parent queue, each child entry has a link to the parent Queue Header's Control Area written into its own Control Area. The parent Queue Header's MAXCOUNT value is set equal to the number of allocated child Queue Entries. FIG. 16 is a block diagram of an example of an Available Queue. The Queue Bank Descriptor (QBD) 280 points to the Available Queue Header (AVAIL QH) 282 for Home Program A 284. The Available Queue Header 282 contains various fields in its Control Area such as an Active Available Queue Header (ACTIVE AVAIL QH) flag, Status, and MAXCOUNT. The Available Queue Header 282 points to one or more available Queue Entries #1 (AVAIL QE) 286 through #N 288. Each Queue Entry has the link to the Available Queue Header's Control Area written in its own Control Area as shown.

Figure 17:
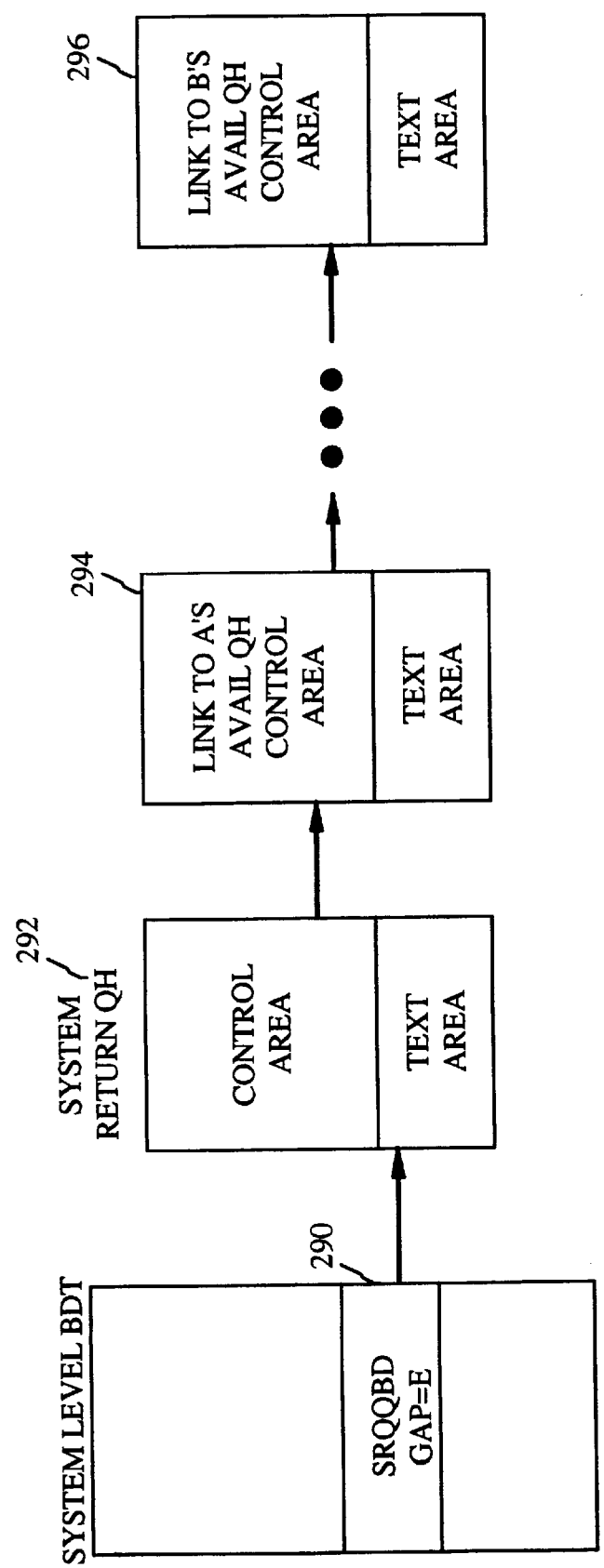
FIG. 17 is a block diagram of an example of the System Return Queue.

When a program has finished using a Queue Bank, it enqueues the Queue Bank to the System Return Queue. The program may not enqueue a Queue Bank directly to its own Available Queue. This is because the Queue Bank may not belong to this user, so the Exec software must make sure the Queue Bank is returned to the proper Available Queue. FIG. 17 is a block diagram of an example of the System Return Queue. A System Return Queue QBD (SRQQBD) 290 is maintained in a System Level Bank Descriptor Table (BDT). It points to the System Return Queue Header 292. The System Return Queue Header 292 points to a linked list of all available Queue Banks such as a Queue Bank from Program A 294 and a Queue Bank from Program B 296.

Figure 18:
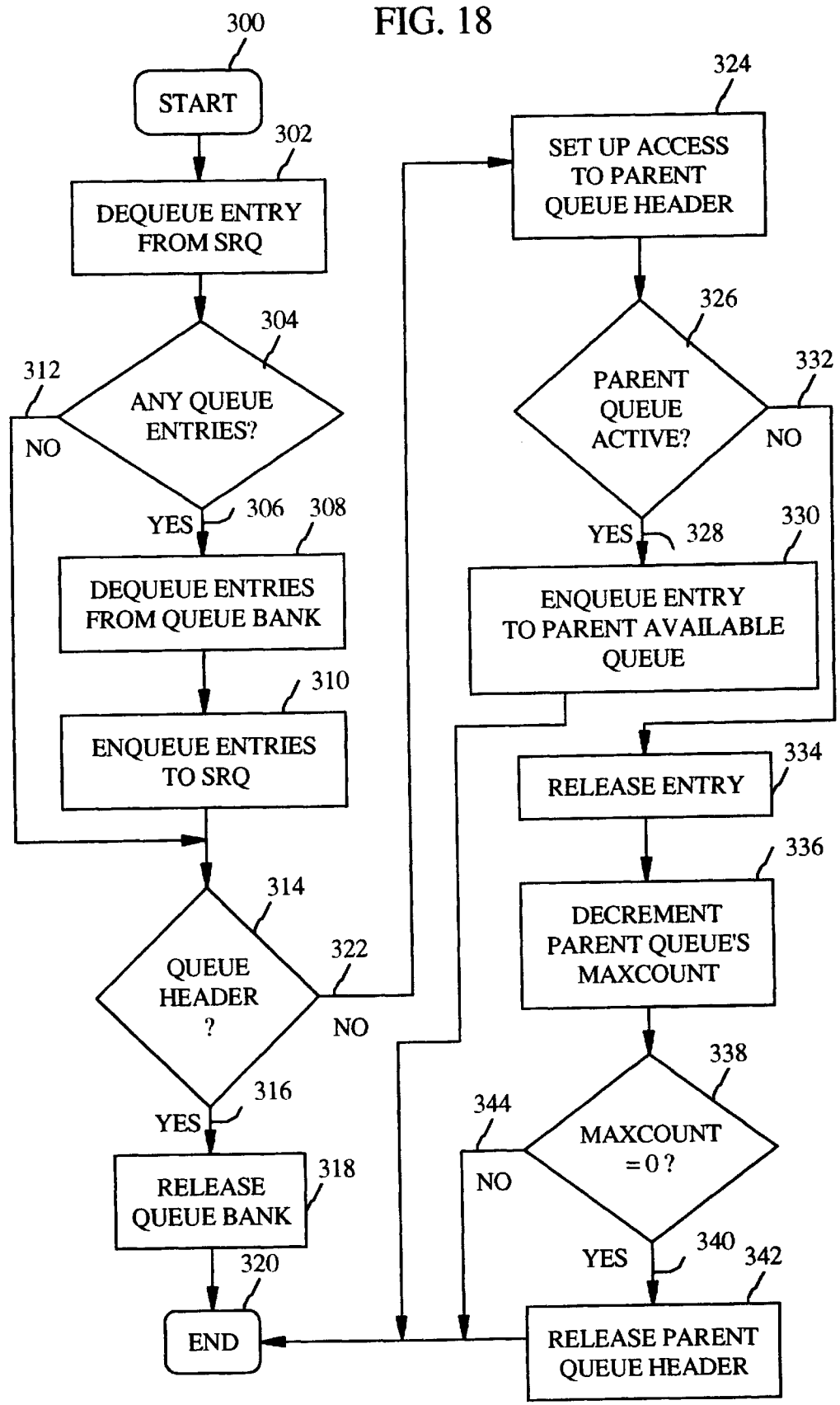
FIG. 18 is a flow chart of the processing steps for returning a Queue Bank to an Available Queue.

After a child Queue Bank has been dequeued, used, and properly returned (enqueued) to the System Return Queue, there are steps that must be taken to return the child Queue Bank to the proper parent Available Queue. FIG. 18 is a flow chart of the processing steps for returning a Queue Bank to an Available Queue. After Start Step 300, the Exec dequeues a Queue Entry from the System Return Queue (SRQ) at Step 302. If any Queue Entries are enqueued to this Queue Bank at Test Step 304 (i.e., it is a Queue Header), Yes Path 306 is taken to Step 308, where the Exec dequeues the Queue Entries from this Queue Bank. The Exec then enqueues them back to the SRQ for future handling at Step 310. If no Queue Entries are enqueued to this Queue Bank, No path 312 is taken to skip Steps 308 and 310. If this Queue Bank is a Queue Header created by CREATE$QH (Test Step 314), then Yes path 316 is taken to Step 318, where the Queue Bank is released and processing ends at End Step 320. Otherwise, No path 322 is taken to Step 324. At this step, access to the parent Queue Header of this Queue Bank is set up. If the parent Queue is still an active Available Queue (Test Step 326), then Yes path 328 is taken to Step 330. At this step, the entry is enqueued to the parent Available Queue. Processing then ends at End Step 320. If the parent Queue is not active, but "being deleted," then No path 332 is taken to Step 334. At this step, the Queue Entry is released, and at Step 336, the parent Queue's MAXCOUNT field is decremented to indicate that a Queue Entry has been removed. If this causes MAXCOUNT to become zero (Test Step 338), then Yes path 340 is taken to Step 342. At this step, all of the child entries for this Available Queue must have been released, so the parent Queue Header is also released. If MAXCOUNT was not zero, then No path 344 is taken to End Step 320.

Figure 19:
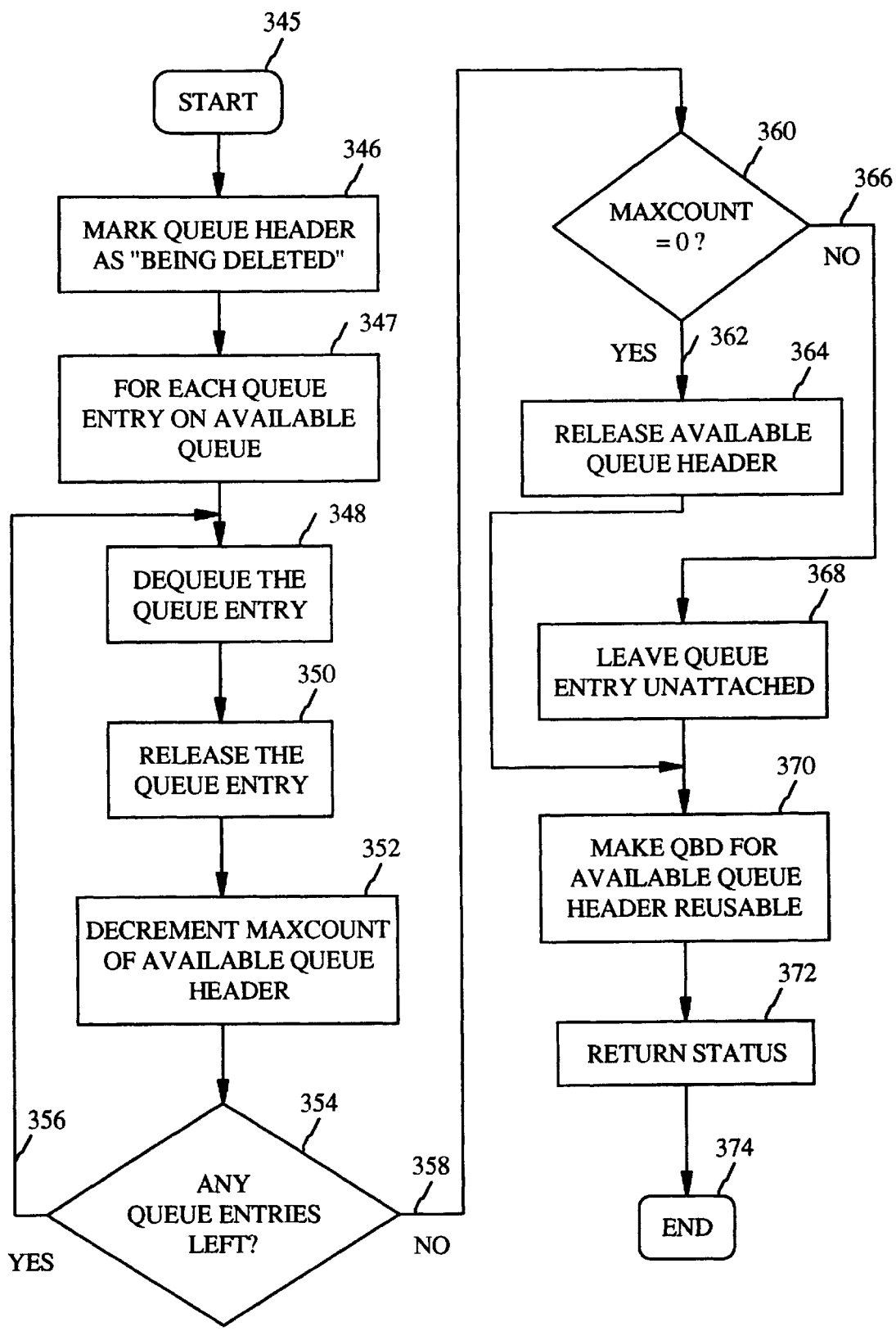
FIG. 19 is a flow diagram of the processing steps for deleting an Available Queue.

When the Available Queue is no longer needed, it can be deleted. This is done at the user's request with a DELETE$QH call, by the Exec at such time as the Bank Descriptor Table containing the Available Queue Header is being released, or by the Exec when a shared-level program with an Available Queue is terminated. FIG. 19 is a flow diagram of the processing steps for deleting an Available Queue. After Start Step 345, the Exec marks the status in the Queue Header's Control Area to "being deleted" at Step 346. For each Queue Entry on the Available Queue (Step 347), the Exec dequeues the Queue Entry from the Available Queue at Step 348, releases the Queue Entry at Step 350, and decrements the MAXCOUNT of the Available Queue Header at Step 352. If there are any unprocessed Queue Entries at Test Step 354, Yes path 356 is taken and processing continues at Step 348. Otherwise, No path 358 is taken to Test Step 360, where a check is made to determine if MAXCOUNT is now zero. If it is, Yes path 362 is taken to Step 364, where the Available Queue Header is released. Otherwise, No path 366 is taken to Step 368. At this step, the Queue Entry is left unattached for the System Return Queue processing described above in FIG. 18. For each path from Test Step 360, processing now continues at Step 370. At this step, the Queue Bank Descriptor (QBD) pointing to the Available Queue Header is made reusable. Status is then returned at Step 372, and processing ends at End Step 374.

III. Hardware Support for the Queuing Architecture

A. Queue Bank Definition

Figure 20:
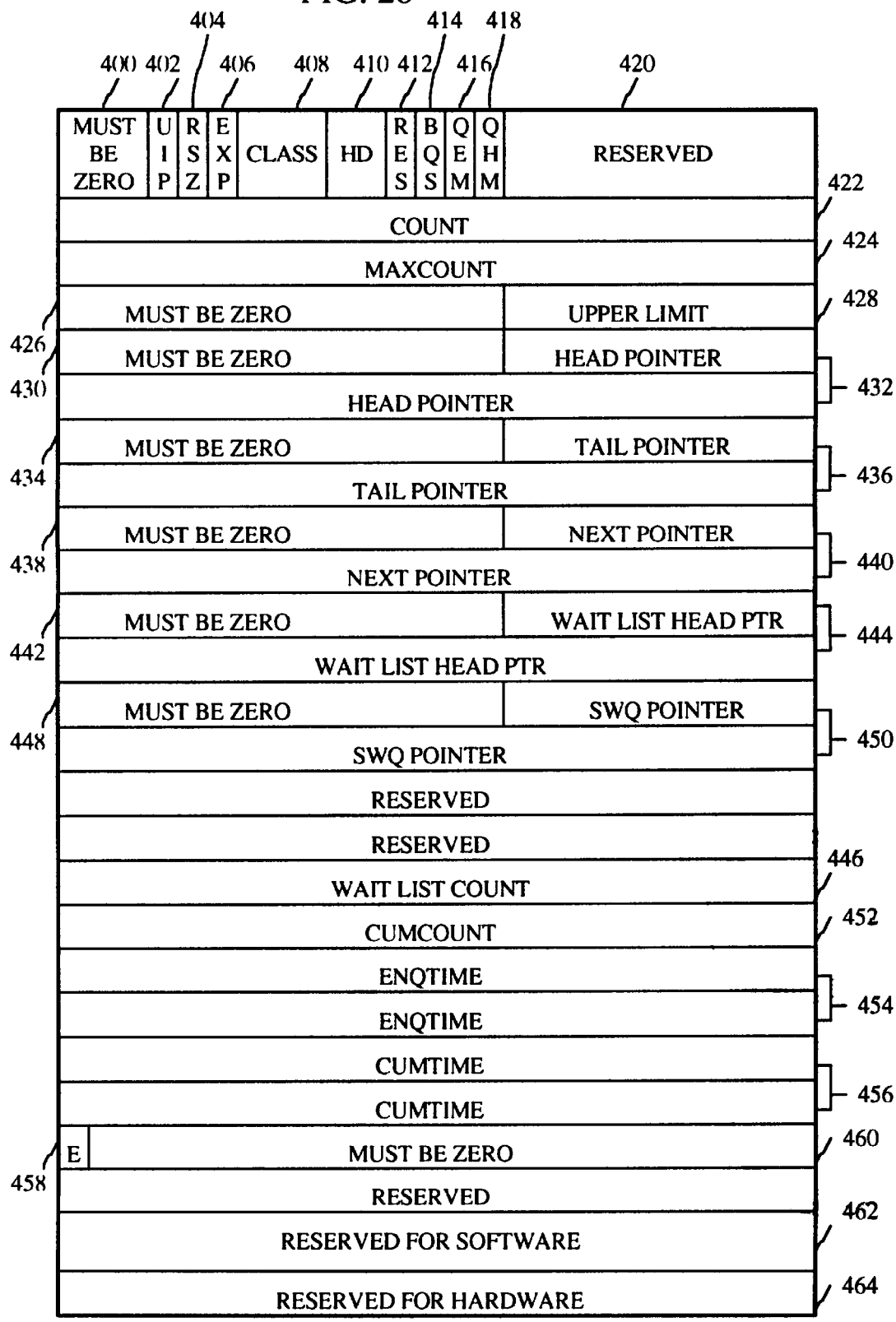
FIG. 20 is a diagram of the format of the Control Area of a Queue Bank.

FIG. 20 is a diagram of the format of the Control Area of a Queue Bank for the preferred embodiment of the present invention. Variations on the field definition of this data structure are contemplated and may be made for other computer systems supporting the present invention. The Must Be Zero field 400, in Bits 0–4 of Word 0, must be set to zero. The Update In Progress (UIP) field 402, is in Bit 5 of Word 0. The UIP 402 is used to ensure Queue Header integrity. The UIP is referenced when the Queue Bank is being used as a Queue Header. When set, it indicates that the Queue is being currently updated by one of the queuing instructions and so the Queue does not have a consistent state. When clear, the UIP indicates that the Queue has a consistent state. The Resize On ENQ (RSZ) 404 field, in Bit 6 of Word 0, when set on enqueuing an entry, Bits 18–35 of the programmer-selected general purpose register "A" are written to the enqueued Queue Entry's Control Area Upper Limit field. When the RSZ is clear on enqueuing an entry, the enqueued Queue Entry's Control Area Upper Limit field is not modified. The RSZ field 404 is ignored for all other queuing operations. The RSZ is referenced when the Queue Bank is being used as a Queue Header. The Expand On DEQ (EXP) field 406, in Bit 7 of Word 0, when set on dequeuing an entry, the octal value 777777 is written to the QBD Upper Limit field. When the EXP 406 is clear on dequeuing an entry, the Upper Limit field of the dequeued Queue Entry's Control Area is written to the QBD Upper Limit field. In either case, the dequeued Queue Entry's Control Area Upper Limit field is not modified. The EXP field 406 is ignored for all other queuing operations. The EXP field is referenced when the Queue Bank is being used as a Queue Header.

The Class field 408, in Bits 8–11 of Word 0, is used for error detection purposes. On ENQ or ENQF, if the Class field 408 of the Queue Header does not match the Class field of the Queue Entry, then an Addressing Exception error is generated. The HD field 410, in Bits 12–13 of Word 0, controls the ability to enqueue to the head of a Queue. If HD is 0, then enqueuing to the head is allowed, but not forced. The ENQ and ENQF instructions then function as their names imply. If HD is 1, then enqueuing to the head is not allowed and use of a ENQF instruction for the Queue causes an Addressing Exception error to be generated. If HD is 2, then all enqueues are forced to the head of the Queue (ENQ enqueues to head). An HD value of 3 is not used and is architecturally undefined. The HD field 410 is referenced when the Queue Bank is used as a Queue Header. The Reserved field (RES) 412, in Bit 14 of Word 0, is reserved and not used. The Basic Queue Statistics (BQS) field 414, in Bit 15 of Word 0, controls collection of queuing statistics. For Queue Headers with the BQS field set, any ENQ, ENQF, DEQ, or DEQW instruction (except if a Queue Entry is not dequeued for DEQW) or implicit enqueue to a Switching Queue results in Basic Queue Statistics being calculated. The BQS field 414 is referenced when the Queue Bank is used as a Queue Header.

The Queue Entry Monitor (QEM) field 416, in Bit 16 of Word 0, enables the Queue Entry Monitor condition. The QEM field must be zero for Queue Entries on Switching Queues. The QEM field 416 is referenced when the Queue Bank is used as a Queue Entry. The Queue Header Monitor (QHM) field 418, in Bit 17 of Word 0, enables the Queue Header Monitor condition. The QHM field must be zero for Switching Queues. The QHM field 418 is referenced when the Queue Bank is used as a Queue Header. Bits 18–35 of Word 0 are Reserved 420 and not used. The Count field 422, in Bits 0–35 of Word 1, holds the number of Queue Entries currently enqueued. A Count of zero indicates an empty queue. The Count field 422 is referenced when the Queue Bank is used as a Queue Header. The MaxCount field 424, in Bits 0–35 of Word 2, holds the maximum number of Queue Entries allowed on the queue. For an ENQ or ENQF instruction, if Count 422 is equal to or greater than MaxCount, then an Addressing Exception interrupt is generated. Results are architecturally undefined if MaxCount is zero. The MaxCount field 424 is referenced when the Queue Bank is used as a Queue Header. The Must Be Zero field 426, in Bits 0–17 of Word 3, must be set to zero. The Upper Limit field 428, in Bits 18–35 of Word 3, specifies the number of words of data in the Text Area 36. This field is controlled as described by the RSZ 404 and EXP 406 fields. An Upper Limit of zero results in a one word Text Area. The Upper Limit field 428 is referenced when the Queue Bank is used as a Queue Entry.

The Must Be Zero field 430, in Bits 0–17 of Word 4, must be set to zero. The Head Pointer field 432 is in Bits 18–35 of Word 4 and Bits 0–35 of Word 5. If Count 422 is non-zero, then Head Pointer 432 addresses the first Queue Entry in the Queue. Head Pointer 432 is the absolute address of the first Text Area word of the Queue Entry. If Count 422 is zero, then Head Pointer 432 is architecturally undefined. The Head Pointer field 432 is referenced when the Queue Bank is used as a Queue Header. The Must Be Zero field 434, in Bits 0–17 of Word 6, must be set to zero. The Tail Pointer field 436 is in Bits 18–35 of Word 6 and Bits 0–35 of Word 7. If Count 422 is non-zero, then Tail Pointer 436 addresses the last Queue Entry in the Queue. Tail Pointer 436 is the absolute address of the first Text Area word of the Queue Entry. If Count 422 is zero, Tail Pointer is architecturally undefined. The Tail Pointer field 436 is referenced when the Queue Bank is used as a Queue Header. The Must Be Zero field 438, in Bits 0–17 of Word 8, must be set to zero. The Next Pointer field 440 is in Bits 18–35 of Word 8 and Bits 0–35 of Word 9. For Queue Entries other than the tail, Next Pointer 440 addresses the next Queue Entry in the Queue. Next Pointer 440 is the absolute address of the first Text Area word of the Queue Entry. For the tail Queue Entry, Next Pointer is architecturally undefined. For Activity Save Area (ASA) Queue Entries on the Wait List (other than the tail), Next Pointer addresses the next ASA Queue Entry in the Wait List. Next Pointer 440 is the absolute address of the first Text Area word of the next ASA Queue Entry. For the tail ASA Queue Entry, Next Pointer is architecturally undefined. The Next Pointer field 440 is referenced when the Queue Bank is used as a Queue Entry.

The Must Be Zero field 442, in Bits 0–17 of Word 10, must be set to zero. The Wait List Head Pointer field 444 is in Bits 18–35 of Word 10 and Bits 0–35 of Word 11. When the Wait List Count 446 is non-zero, the Wait List Head Pointer 444 addresses the first ASA on the Wait List. The Wait List Head Pointer is the absolute address of the first Text Area word of the ASA's Queue Bank. When the Wait List Count 446 is zero, the Wait List Head Pointer is architecturally undefined. The Wait List Head Pointer field 444 is referenced when the Queue Bank is used as a Queue Header. The Must Be Zero field 448, in Bits 0–17 of Word 12, must be set to zero. The Switching Queue (SWQ) Pointer field 450 is in Bits 18–35 of Word 12 and Bits 0–35 of Word 13. The Switching Queue Pointer 450 addresses the Switching Queue onto which ASA Queue Banks removed from the Wait List are placed. The SWQ Pointer 450 is the absolute address of the first Text Area word of the SWQ Queue Header. The SWQ Pointer 450 is referenced when the Queue Bank is used as a Queue Header. Bits 0–35 of Words 14 and 15 are reserved. The Wait List Count field 446 is in Bits 0–35 of Word 16. The Wait List Count is the number of server process ASAs on the Wait List. A value of zero indicates that the Wait List is empty. The Wait List Count is referenced when the Queue Bank is used as a Queue Header.

The Cumulative Count (CUMCOUNT) field 452 is in Bits 0–35 of Word 17. The CUMCOUNT is the count of all entries that have been enqueued since CUMCOUNT was last cleared by the Exec software. The CUMCOUNT is referenced when the Queue Bank is used as a Queue Header. The Enqueue Time (ENQTIME) field 454 is in Bits 0–35 of Words 18 and 19. The ENQTIME is written with the contents of the system Dayclock as a result of the execution of an ENQ or ENQF instruction. It is used to calculate the Cumulative Time. The ENQTIME 454 is referenced when the Queue Bank is used as a Queue Entry. The Cumulative Time (CUMTIME) field 456 is in Bits 0–35 of Words 20 and 21. The CUMTIME is a count of the total time that all entries have spent on the Queue since CUMTIME was last cleared by the Exec software. The CUMTIME is referenced when the Queue Bank is used as a Queue Header. The Event field 458 is in Bit 0 of Word 22. The Event bit indicates that an event is enqueued to the Queue. The Event field 458 is referenced when the Queue Bank is used as a Queue Header. The Must Be Zero field 460, in Bits 1–35 of Word 22, must be set to zero. Bits 0–35 of Word 23 are reserved. Bits 0–35 of Words 24 through 247 are reserved for software use. Bits 0–35 of Words 248 through 255 are reserved for hardware use.

B. Queue Bank Descriptor Definition

Figure 21:
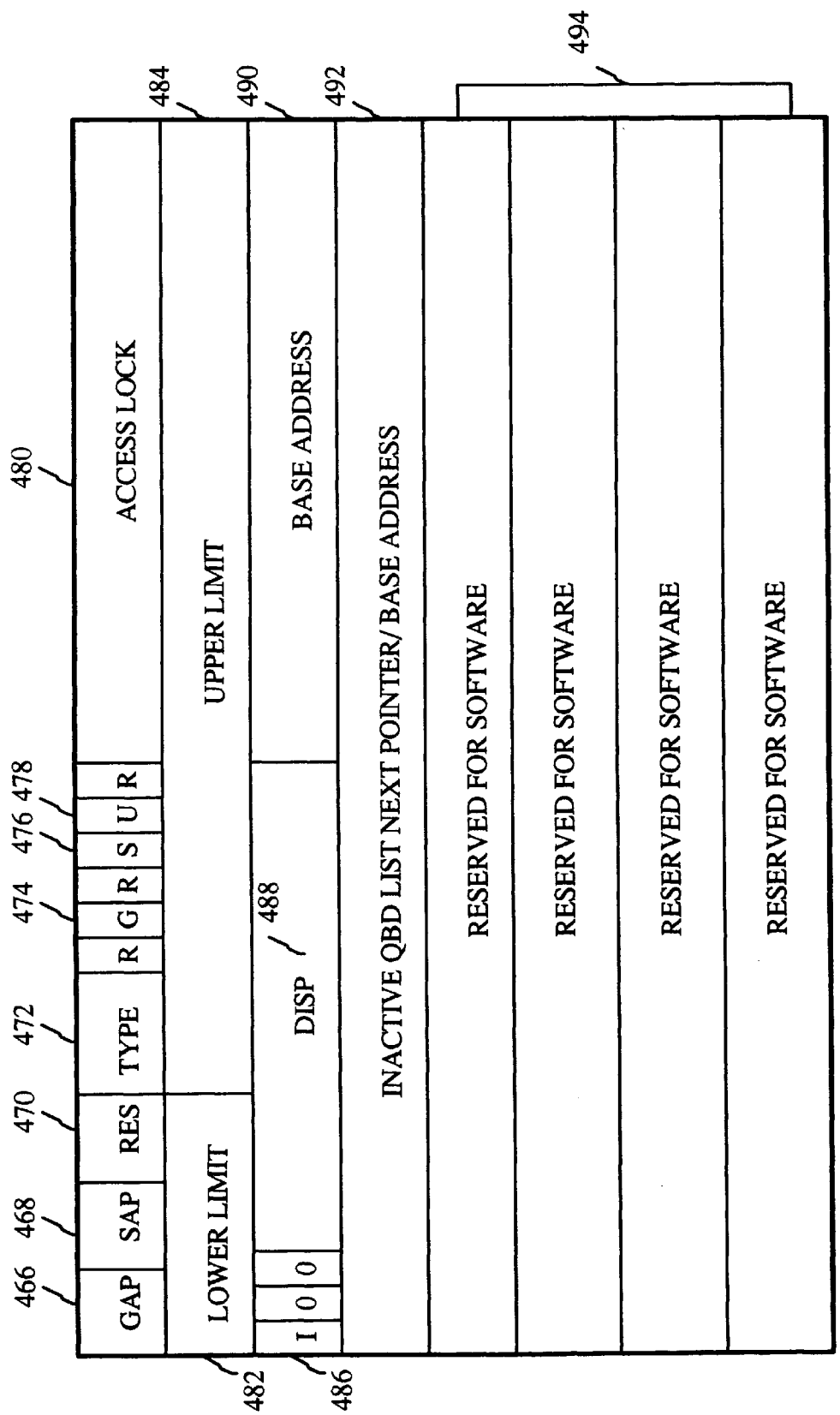
FIG. 21 is a diagram of the format of a Queue Bank Descriptor.

The Queue Bank Descriptor describes and provides access to a Queue Bank. FIG. 21 is a diagram of the format of a Queue Bank Descriptor for the preferred embodiment of the present invention. The General Access Permission (GAP) field 466, in Bits 0–2 of Word 0, contain the Execute enable (Bit 0), Read enable (Bit 1), and Write enable (Bit 2) flags. This field is used as part of the access checking mechanism. A set bit allows and a clear bit denies access to the Queue Bank. The Special Access Permission (SAP) field 468, in Bits 3–5 of Word (), contain the Execute enable (Bit 3), Read enable (Bit 4), and Write enable (Bit 5) flags. This field is also used as part of the access checking mechanism. A set bit allows and a clear bit denies access to the Queue Bank. Bits 6–7 are Reserved (RES) 470. The Type field 472, in Bits 8–11 of Word 0, indicates the type of Bank. For Queue Banks, this field is set to four. Bits 12, 14, and 17 are reserved. The General Fault (G) field 474, in Bit 13 of Word 0, when set indicates an Address Exception interrupt occurs if this QBD is accessed by a Base Register manipulation instruction. The Size (S) field 476, in Bit 15 of Word 0, must be zero for a QBD. The Upper Limit Suppression Control Bit (U) field 478, in Bit 16 of Word 0, must be zero for a QBD. The Access Lock field 480, in Bits 18–35 of Word 0, is used as part of the access checking mechanism. Bits 18–19 hold a Ring value and Bits 20–35 hold a Domain value.

The Lower Limit field 482, is in Bits 0–8 of Word 1. When a QBD is set active by a Dequeue or Dequeue Or Wait instruction (i.e., a Queue Entry is mapped to the QBD), the Lower Limit 482 is set to zero. When a QBD is set inactive by an Enqueue or Enqueue to Front instruction (i.e., a Queue Entry is removed from the QBD), the Lower Limit 482 is written with any value larger than the Upper Limit 484. The Upper Limit field 484 is in Bits 9–35 of Word 1. When a QBD is set active by a Dequeue or a Dequeue Or Wait instruction (i.e., a Queue Bank is mapped to the QBD), and the Resize On DEQ field 404 in the Queue Header's Control Area is clear, then the Upper Limit is set to the Upper Limit field 428 in the Queue Header's Control Area. When a QBD is set active by a Dequeue or a Dequeue Or Wait instruction and the Resize On DEQ field 404 is set, the Upper Limit is set to 777777 octal. When a QBD is set inactive by an Enqueue or Enqueue To Front instruction (i.e., a Queue Bank is removed from the QBD), the Upper Limit field 484 is set to any value smaller than the Lower Limit 482. The Inactive (I) field 486, in Bit 0 of Word 2, is cleared when a Queue Bank is mapped into the QBD during Dequeue or Dequeue Or Wait instruction processing or if initialized by the Exec software. The Inactive field is set when a Queue Bank is removed from the QBD as part of Enqueue or Enqueue To Front instruction processing or if initialized by the Exec software. Thus, all Inactive QBDs have their Inactive field 486 set. The Displacement (DISP) field 488, in Bits 3–17 of Word 2, is not used for QBDs and must be zero. The Base Address field 490, in Bits 18–35 of Word 2, is the most significant 18 bits of the Base Address of the Queue Bank. The contents of this field are architecturally undefined for Inactive QBDs. The Inactive QBD List Next Pointer/Base Address field 492, in Bits 0–35 of Word 3, points to the next entry in the Inactive QBD List when the QBD is Inactive (i.e., the Inactive field 486 is set). For the last entry in the List, this field is zero. If the QBD is Active (the Inactive field 486 is clear), this field stores the least significant 36 bits of the Base Address. It is concatenated with the Base Address 490. Bits 0–35 of Words 47 are Reserved for Software 494.

C. The Enqueue (ENQ)/Enqueue To Front (ENQF) Instructions

Figure 22:
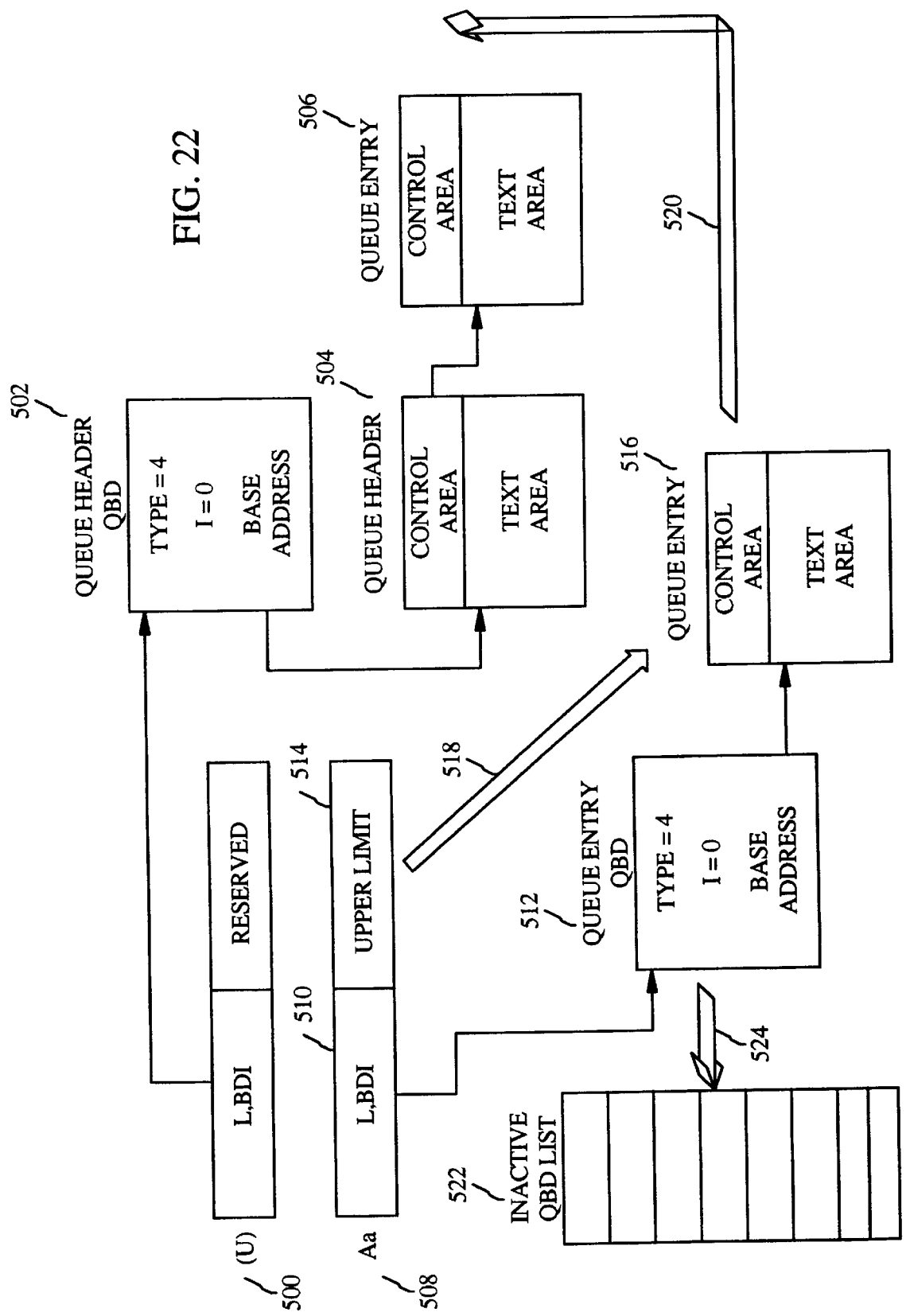
FIG. 22 is a block diagram illustrating the use of the ENQ instruction.

The ENQ/ENQF instructions are used to enqueue an entry or event FIG. 22 is a block diagram illustrating the use of the ENQ instruction. A Queue Bank Descriptor (QBD) is identified by a Level, Bank Descriptor Index (L,BDI) value. A virtual address is a 36-bit word identifying the name of the bank in which the address lies and the position of the address within the bank. The Level (L) selects one of eight Bank Descriptor Tables (BDT) (not shown) and the Bank Descriptor Index (BDI) selects one of up to 32,768 Bank Descriptors in the selected BDT. The L,BDI value of the Queue Header QBD is specified by the contents of the instruction operand address "(U)" 500. The value of (U) is formed by adding the unsigned value of the displacement field of the instruction (not shown) to the signed modifier portion of an index register (not shown) specified by the "x" field of the instruction (not shown). For ENQ and ENQF instructions, the contents of the memory location specified by Bits 0–17 of (U) point to the Queue Header QBD 502. The contents of the memory location specified by the Bits 18–35 of (U) must be zero. The Queue Header QBD 502 points to the Queue Header 504. In the example shown in FIG. 22, this Queue has only one Queue Entry 506. The Queue Header has been previously created by a CREATE$QH Exec service call and the Queue Entry has been enqueued via an earlier execution of the ENQ or ENQF instructions.

The other main operand of the ENQ/ENQF instruction is the Arithmetic Register "Aa" operand 508. In the preferred embodiment, the A Registers are capable of providing input for or accepting results from arithmetic operations. The "a" field in the ENQ/ENQF instruction (not shown) specifies which A Register is to be used for this instruction. Bits 0–17 of Aa are the L,BDI 510 of the new Queue Entry's QBD 512. However, if the L,BDI 510 of the Queue Entry is zero, then an event is being enqueued. The Count is not returned when an event is enqueued. If the L,BDI 510 is not zero, then this field points to the new Queue Entry's QBD. If Resize On ENQ 404 is enabled in the Control Area of the Queue Header 502, Bits 18–35 of Aa 508 are the new Upper Limit for the enqueued Queue Entry, otherwise this field is ignored. This Upper Limit 514 is stored in the Upper Limit field 428 of the Control Area of the Queue Entry 516. This is indicated on FIG. 22 by action Arrow 518. If the Queue Header indicates that enqueuing to the head is forced, ENQ enqueues to the head of the Queue, otherwise ENQ enqueues to the tail of the Queue. This is shown by action Arrow 520. The appropriate links in the Queue Header's Control Area are updated to reflect the addition of the Queue Entry to the Queue. The A Register Aa+1 (not shown) is written with the Queue's initial Count (i.e., the Count prior to the enqueue operation). The Queue Entry QBD 512 is returned to the Inactive QBD List 522. This is represented on FIG. 22 as action Arrow 524. If the Queue's Wait List Count 446 is non-zero, following the enqueue of the event or entry, a server process Activity Save Area (ASA) is moved from the Queue's Wait List to a Switching Queue.

Processing for the Enqueue To Front (ENQF) instruction is very similar to processing for the ENQ instruction, except the linkage of the Queue Entry 516 to the Queue takes place at the head of the Queue. In the example shown in FIG. 22, Queue Entry 516 is linked into the Queue ahead of Queue Entry 506 and the appropriate pointers are updated in the Queue Header 504. If the Queue Header indicates that enqueuing to the head of the Queue is not allowed, ENQF generates an Addressing Exception error.

The detailed processing steps taken by the computer system hardware in the preferred embodiment for the ENQ and ENQF instructions are shown in Appendix A.

D. The Dequeue (DEQ)/Dequeue Or Wait (DEQW) Instructions

Figure 23:
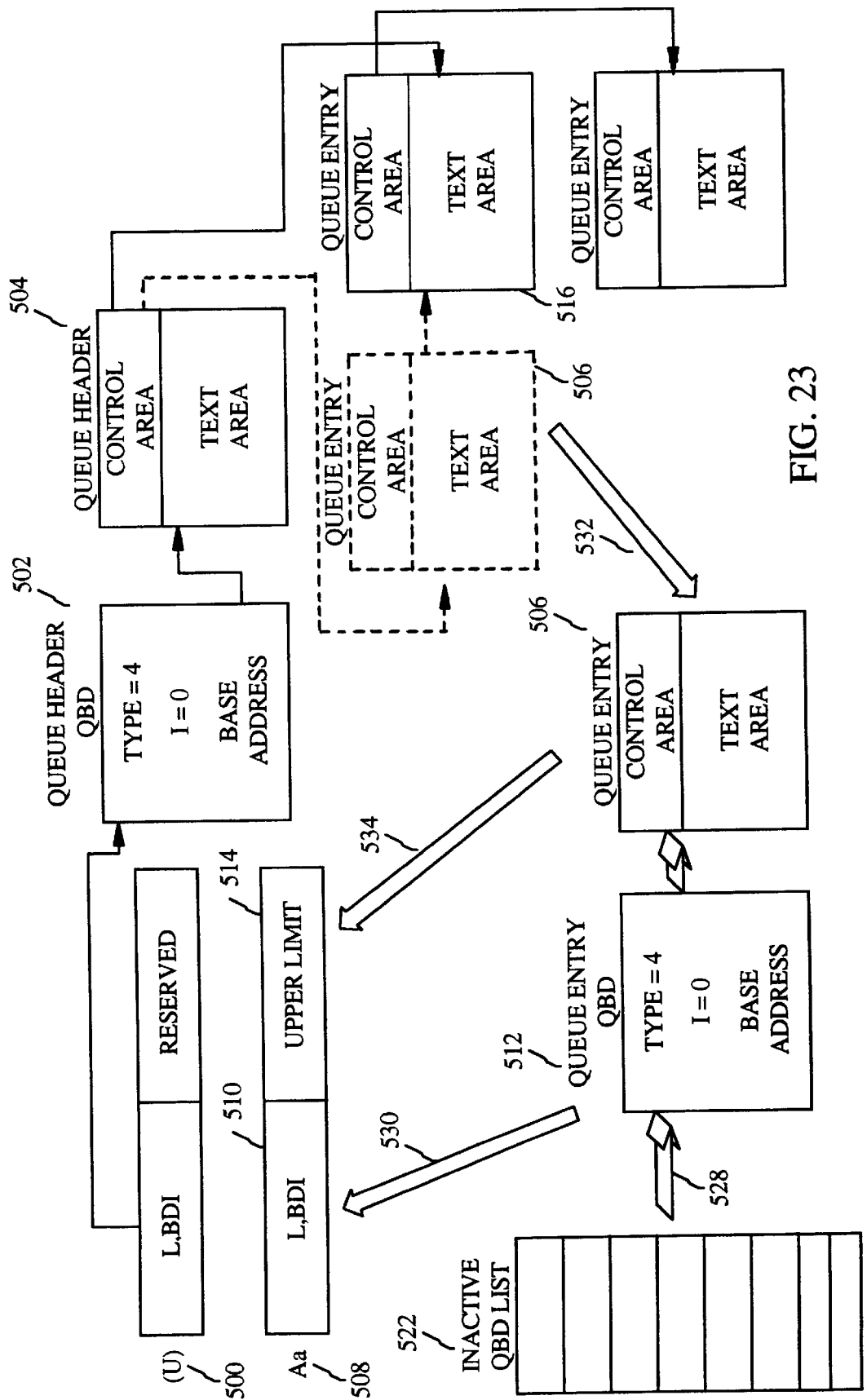
FIG. 23 is a block diagram illustrating the use of the DEQ instruction.

The DEQ instruction is used to dequeue the entry, if any, at the head of a Queue. FIG. 23 is a block diagram illustrating the use of the DEQ instruction. The QBD of the Queue Header is again identified by the L,BDI in (U) Bits 0–17 500. If the Queue's initial Count is non-zero, then the Queue Entry 506 at the head of the Queue is to be dequeued. An Inactive QBD is acquired by removing one from the Inactive QBD List 522. This is represented as action Arrow 528 in FIG. 23. The Queue Entry QBD's L,BDI is written into Bits 0–17 of Aa 508. This is represented by action Arrow 530. The newly acquired Inactive QBD becomes the Queue Entry QBD 512 and the entry's Queue Bank (Queue Entry 506) is mapped to the Queue Entry QBD 512 and the Queue Entry 506 is removed from the Queue. This is represented as action Arrow 532. The appropriate pointers in the Control Area of the Queue Header 504 are updated to reflect the change in the Queue structure. The dequeued entry's Upper Limit (prior to expansion if Expand On DEQ 406 is enabled in the Queue Header 502) is written to the Upper Limit field 514 of the Aa register 508. This is represented on FIG. 23 by action Arrow 534. The Aa+1 register (not shown) is written with the Queue's initial Count (i.e., the count prior to the dequeue operation). If the Queue's initial Count is zero, then the Aa+1 register is written to zero to indicate that no entry was dequeued. The DEQ instruction does not dequeue events.

The Dequeue Or Wait (DEQW) instruction is used to dequeue an entry, dequeue an event, or deactivate the executing process to wait for an entry or event to be placed on the Queue. Processing of the DEQW instruction is similar to the processing of the DEQ instruction. If the Queue's initial Count is non-zero, processing is as described above for the DEQ instruction. If the Queue's Count is zero (meaning no entries are on the Queue) and there is an event enqueued to the Queue, then the event is dequeued and the Aa+1 register is written to zero, and the event is cleared in the Queue. If the Queue's Count is zero and there is no event enqueued to the Queue, then the executing process is deactivated to wait for entry or event to be placed on the Queue.

The detailed processing steps taken by the computer system hardware in the preferred embodiment for the DEQ and DEQW instructions are shown in Appendix A.

IV. High Level Language Support for the Queuing Architecture

Support for Queuing Architecture structures can be extended into high level programming languages such as 'C'. Examples of possible C implementations are shown below. The functions listed below could also be implemented in the object oriented-design C++ language, either by retaining the C functions or by implementing them as C++ classes, or in other high level languages.

A. Enqueue

Instruction Format: ENQ a,*d,*x,b
Input: Queue Header, Queue Entry, Queue Entry Upper Limit
Output: Initial Count C Function:   int enqueue(queue_header header_pointer,
                          queue_entry entry_pointer,
                          int upper _limit);

Note: The upper_limit is ignored if the Resize On ENQ flag in the Queue Header Control Area is not set.
C Library Routine:

```
              © 1994 Unisys Corporation
              ENQUEUE*
                LBU     B9,A1       .Base parameter list
                LXI,H1  A0,4,,B9    .Load Queue Bank name
                LXM,H2  A0,7,,B9    .Load upper limit
                ENQ     A0,1,,B9    .Enqueue the Queue Entry
                L       A0,A1       .Return the initial count
                RTN
```

B. Enqueue To Front

Instruction Format: ENQF a,*d,*x,b
Input: Queue Header, Queue Entry, Queue Entry Upper Limit
Output: Initial Count
C function:   int enqueue_to_front(queue_header header_pointer,
                                   queue_entry entry_pointer,
                                   int upper_limit);
Note: The upper_limit is ignored if the Resize On ENQ flag in the Queue Header Control Area is not set.
C Library Routine:

```
              © 1994 Unisys Corporation
              ENQUEUE_TO_FRONT*
                LBU     B9,A1       .Base parameter list
                LXI,H1  A0,4,,B9    .Load Queue Bank name
                LXM,H2  A0,7,,B9    .Load upper limit
                ENQF    A0,1,,B9    .Enqueue the Queue Entry
                L       A0,A1       .Return the initial count
                RTN
```

C. Enqueue Event

Instruction Format: ENQ a,*d,*x,b
Input: Queue Header
Output: None
C function:   void enqueue_event(queue_header header_pointer);
C Library Routine:

```
              © 1994 Unisys Corporation
              ENQUEUE_EVENT*
                LBU     B9,A1       .Base parameter list
                L,U     A6,0        .Set queue entry = 0
                                    .(enqueue event)
                ENQ     A6,1,,B9    .Enqueue the event
                RTN                 .Return
```

-continued

D. Dequeue

Instruction Format: DEQ a,*d,*x,b  
Input: Queue Header  
Output: Queue Entry, Queue Entry Upper Limit, Initial Count  
C function:    queue_entry dequeue(queue_header header_pointer,  
                  int*initial_count, int*upper_limit);  
Note: The initial_count will be zero and the queue_entry pointer will be null if the queue was empty.  
C Library Routine:

```
                © 1994 Unisys Corporation
                DEQUEUE*
                    LBU      B9,A1         .Base parameter list
                    SSL      A0,36         .Set the function return
                                           .to null
                    DEQ      A0,1,,B9      .Dequeue the queue entry
                    LBU      B2,7,,B9      .Base the upper limit
                                           .parameter
                    L        X2,8,,B9      .Load offset to upper limit
                    SZ       *0,X2,B2      .Clear upper limit
                    S,H2     A0,*,X2,B2    .Store upper limit
                    LXM,U    A0,0          .Remove upper limit
                    LBU      B2,4,,B9      .Base the initial count
                                           .parameter
                    L        X2,5,,B9      .Load offset to initial count
                    S        A1,*0,X2,B2   .Store the initial count
                    L,U      A1,0          .Set function return offset
                                           .to zero
                    RTN                    .Return
```

E. Dequeue Or Wait

Instruction Format:   DEQW  a,*d,*x,b  
Input: Queue Header  
Output: Queue Entry, Queue Entry Upper Limit, Initial Count  
C function:    queue_entry dequeue_or_wait(queue_header header_pointer,  
                  int *initial_count, int *upper_limit);  
Note: The initial_count will be zero and the queue_entry pointer will be null if there is an event to handle.  
C Library Routine:

```
                © 1994 Unisys Corporation
                DEQUEUE*
                    LBU      B9,A1         .Base parameter list
                    SSL      A0,36         .Set the function return
                                           .to null for event dequeue
                    DEQW     A0,1,,B9      .Dequeue the queue entry
                    LBU      B2,7,,B9      .Base the upper limit
                                           .parameter
                    L        X2,8,,B9      .Load offset to upper limit
                    SZ       *0,X2,B2      .Clear upper limit
                    S,H2     A0,*,X2,B2    .Store upper limit
                    LXM,U    A0,0          .Remove upper limit
                    LBU      B2,4,,B9      .Base the initial count
                                           .parameter
                    L        X2,5,,B9      .Load offset to initial count
                    S        A1,*0,X2,B2   .Store the initial count
                    L,U      A1,0          .Set function return offset
                                           .to zero
                    RTN                    .Return
```

F. Sample C Program Using Queuing Architecture Functions

The following fragment of a program is an example of the use of Queuing Architecture functions with the C programming language. Similar implementations in other high level languages are also possible.

```
© 1994 Unisys Corporation
#include <stdio.h>
#include <queuing.h>
int main()
{
    queue_header my_header;
    queue_entry my_entry;
    int my_limit;
    int my_count;
    my_count = enqueue(my_header, my_entry, my_limit);
    my_count = enqueue_to_front(my_header, my_entry, my_limit);
```

-continued

```
    enqueue_event(my_header);
    my_entry = dequeue(my_header, &my_count, &my_limit);
    my_entry = dequeue_or_wait(my_header, &my_count, &my_limit);
    if(my_entry == NULL)
        printf ("I must have found an event to handle\n");
    return ();
)
```

V. Using Queuing Architecture Structures

A. Initialization and Termination

Figure 24:
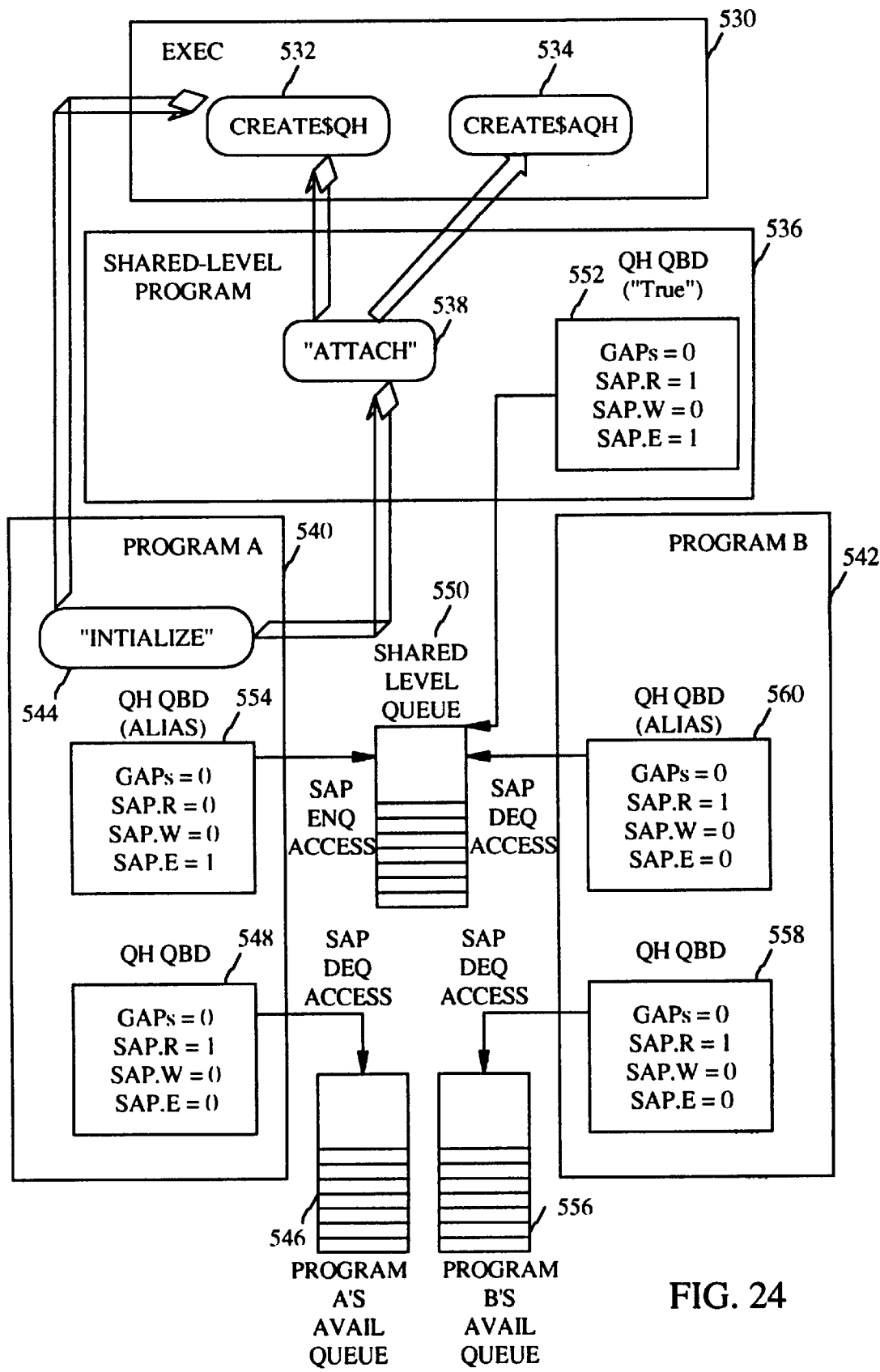
FIG. 24 is a diagram illustrating the initialization sequence for the queue structure.

FIG. 24 is a diagram illustrating the initialization sequence for the queue structure. It also shows how two programs can share a Queue. In this example, a shared-level program controls the creation of a Queue between two programs. Exec software 530 provides the CREATE$QH 532 and CREATE$AQH 534 interfaces to user-level programs. A Shared-Level Program 536 provides an "Attach" interface 538 to allow other programs, such as Program A 540 and Program B 542 to create Queue Headers (QHs) and Alias Queue Headers (AQHs). The steps described below for Program A 540 are replicated by Program B 542, except for the creation of the shared-level Queue.

Program A 540 has an "Initialize" interface 544 that calls CREATE$QH 532 in the Exec 530 to create its Available Queue 546 and stock it with Available Queue Banks. Program A's Available Queue is accessed via the Queue Header Queue Bank Descriptor (QH QBD) 548. Note that Program A has dequeue access to its Available Queue 546 because SAP.R is set in the QH QBD 548. Program A 540 calls the "Attach" interface 538 of the Shared-Level Program 536. As part of the "Attach" sequence, the "Attach" interface calls CREATE$QH 532 in the Exec 530 to build a Shared Level Queue 550. The Shared Level Queue 550 is accessed via the "true" Queue Header Queue Bank Descriptor (QH QBD) 552. Note that the Shared Level Program has enqueue (SAP.E=1) and dequeue (SAP.R=1) access to the Shared Level Queue 550 because of the SAP settings in the QH QBD 552. Also as part of the "Attach" sequence, the Shared Level Program 536 calls CREATE$AQH 534 in the Exec 530 to obtain Program A's Alias QBD 554. Program A now has enqueue access to the Shared Level Queue 550 because of the SAP.E=1 setting in the Alias QH QBD.

Similarly, Program B 542 sets up its Available Queue 556, Available QH QBD 558, and Alias QH QBD 560. The enqueue and dequeue accesses for the Shared Level Queue 550 and Program B's Available Queue 556 are set up as shown.

A highly efficient communications path is now set up between Program A and Program B. Program A 540 can enqueue a Queue Entry containing a message into the Shared Level Queue 550. Program B 542 can then dequeue the Queue Entry from the Shared Level Queue. For the communications path to be reversed (e.g., for Program B to send a message to Program A), another shared level queue would be required. For this queue, the enqueue and dequeue access would be the opposite of what is shown in FIG. 24 for the Shared Level Queue 550. Alternatively, additional Alias QH QBDs could be created, or the access permissions on the existing Alias QH QBDs could be extended.

Normal termination processing for a program using Alias QBDs is performed by the program calling the Shared Level Program's "Detach" interface (not shown) to detach from the Shared Level Program and delete the program's Alias QBDs. For example, as part of the execution within the Shared Level Program, a call to the DELETE$AQH Exec interface (not shown) is made to delete Program A's Alias QBD 554. The DELETE$QH Exec interface (not shown) is available to delete the Shared Level Queue 550, the "true" QH QBD 552, and the associated Available Queues 546, 556. Alias QBDs for Queue created by a program are also invalidated as part of program deactivation processing.

B. Queue Bank Circulation

Figure 25:
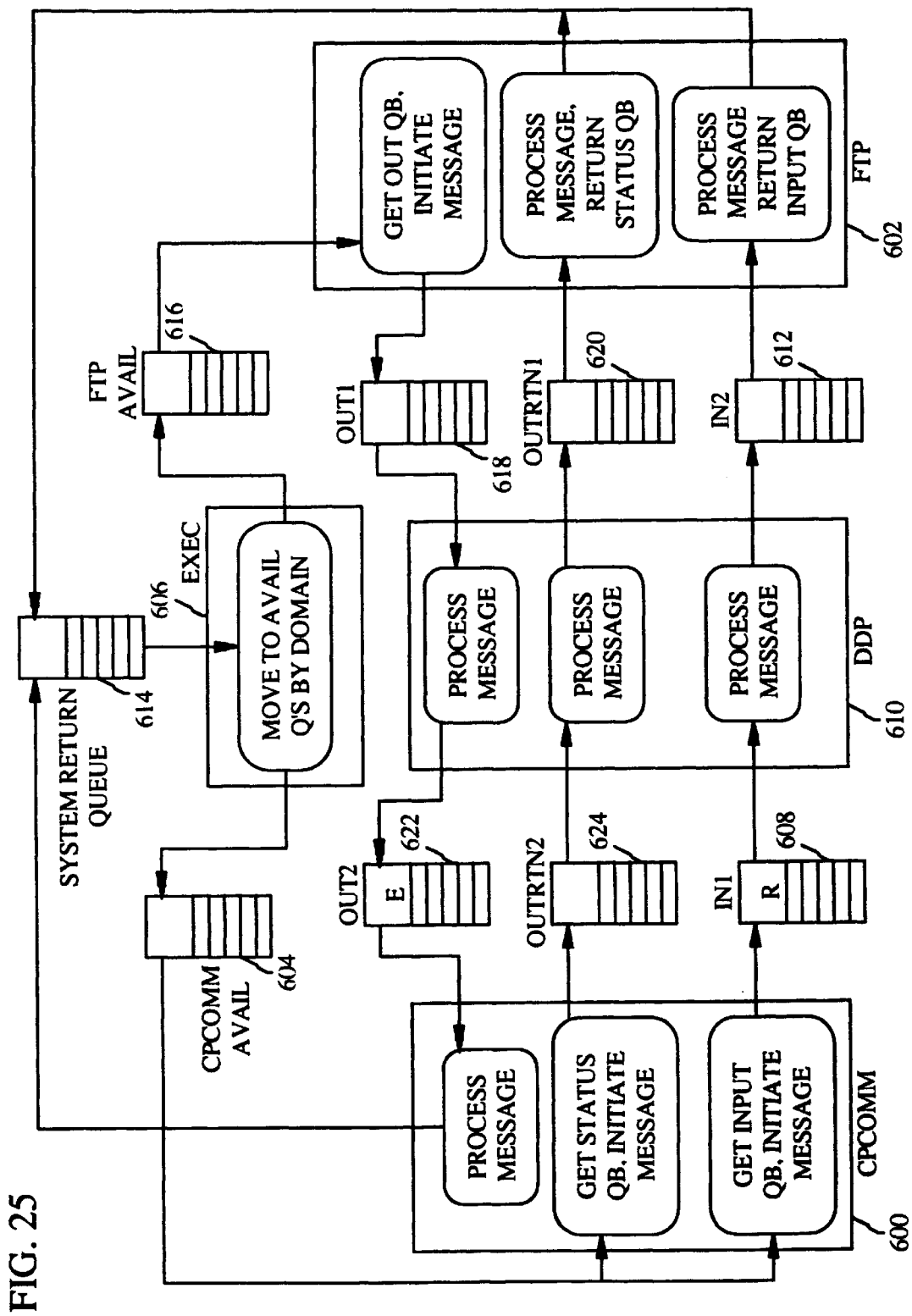
FIG. 25 is a block diagram illustrating the circulation of Queue Banks.

FIG. 25 is a block diagram illustrating the circulation of Queue Banks. This example also illustrates Queue Bank resizing. In the preferred embodiment, communications program (CPCOMM) 600 interfaces a user application program with a local or wide area network (not shown). CPCOMM is responsible for buffering data between user software and the network. It centralizes the communications task into one piece of software so application programs need not know how network I/O is performed. CPCOMM provides the protocol for the user to initiate a communications session and also provides means for sending and receiving data through the session. The network may be one of several types, such as Asynchronous Transfer Mode (ATM), Fiber Distributed Data Interface (FDDI), Ethernet, etc. CPCOMM, a member of the Trusted Computing Base (TCB), in this example, is responsible for passing messages to the File Transfer Protocol (FTP) application program 602, which is not a member of the TCB. Since CPCOMM 600 has no advance knowledge of the recipient of a message prior to the message's being written to a Queue Bank, residual data for a different domain may be in the Queue Bank. To prevent FIP 602 from accessing this residual data, CPCOMM uses Queue Bank resizing to limit FTP's visibility to the message area only.

The use of Queues to communicate between concurrently executing processes and circulation of Queue Banks proceeds as follows. CPCOMM 600 gets a Queue Bank from its Available Queue (CPCOMM AVAIL) 604. The Exec 606 had previously deposited Queue Banks into CPCOMM AVAIL after the CREATE$QH Exec service call to create the Available Queue. With the Expand On DEQ flag 406 enabled for the Available Queue, CPCOMM has access to the entire Text Area of the Queue Bank. CPCOMM 602 uses this Input Queue Bank as an I/O buffer. An I/O Processor (not shown), supplies CPCOMM with data from a network connected to the computer system. When input arrives over the network and through the I/O Processor to CPCOMM, CPCOMM enqueues the Input Queue Bank to the IN1 Queue 608. CPCOMM waits for additional input from the network or for output requests.

The Distributed Data Processing (DDP) program 610 is a program used (in this example) for FTP message routing. DDP dequeues the Input Queue Bank from the IN1 Queue 608, does any necessary processing, and then enqueues it to the IN2 Queue 612. DDP 610 then executes Dequeue Or Wait (DEQW) on the IN1 Queue 608 to wait for additional messages to transfer. FTP 602 dequeues the Input Queue Bank from the IN2 Queue 612 and processes the message. For example, the input message may be a request to transfer a file from the current computer system to an FTP client somewhere in the network. FTP returns the Input Queue Bank by enqueuing it to the System Return Queue 614. FTP then gets a Queue Bank from its Available Queue (FTP AVAIL) 616 for use as the Output Queue Bank. Note that the Input Queue Bank could not be used for the output message because its Upper Limit is set to only access the network input message. FTP then initiates a disk read of a portion of the requested file from an attached mass storage device (such as a magnetic disk (not shown)) into the Output Queue Bank. This Output Queue Bank is enqueued to the OUT1 Queue 618. FTP 602 executes a Dequeue Or Wait on the OUTRTN1 Queue 620, waiting for status from the DDP 610.

DDP 610 dequeues the Output Queue Bank from the OUT1 Queue 618, performs any necessary processing, and enqueues it to the OUT2 Queue 622. DDP executes a Dequeue Or Wait on the OUTRTN2 Queue 624, waiting for status from CPCOMM 600. CPCOMM dequeues the Output Queue Bank from the OUT2 Queue 622, adds the appropriate network protocol information, and initiates the transmission of the output message containing the file data over the network (not shown). CPCOMM dequeues a Queue Bank from its Available Queue (CPCOMM AVAIL) 604 for use as a Status Queue Bank. CPCOMM 600 writes the status of the file transfer to the Status Queue Bank's Text Area, then enqueues the Status Queue Bank to the OUTRTN2 Queue 624. The enqueue to the OUTRTN2 Queue activates DDP 610, which dequeues the Status Queue Bank from the OUTRTN2 Queue 624, performs any necessary processing, and enqueues it to the OUTRTN1 Queue 620. DDP then executes Dequeue Or Wait on the OUT1 Queue 618, waiting for additional work. The enqueue to the OUTRTN1 Queue 620 activates FTP 602, which dequeues the Status Queue Bank from the OUTRTN1 Queue 620, checks the status, and enqueues the Status Queue Bank to the System Return Queue 614. FTP may then send additional messages or execute a Dequeue Or Wait on the IN2 Queue 612, to wait for additional work. Once the required network acknowledgments pertaining to the transaction are received, CPCOMM enqueues the Output Queue Bank to the System Return Queue 614. Periodically, or when the System Return Queue 614 MAXCOUNT is exceeded, an Exec 606 process is initiated which routes Queue Banks from the System Return Queue 614 to the appropriate Available Queue.

The Queuing Architecture has many advantages over other means of message passing and process synchronization. Firstly, most processing is done at the hardware instruction level. This minimizes processor overhead by avoiding context switches between processes and takes advantage of available hardware acceleration techniques. The number of queues available and depth of the queues in the system is limited only by the virtual address space supplied by the system architecture. The size of queue entries is variable and limited only by the size of a bank or other storage allocation unit. Ownership of queue banks is passed by dynamic hardware mapping of the Queue Banks into the owner's virtual space. This ensures that a message cannot be altered once placed on a queue, without the need to copy data. Queue Banks are not required to be permanently resident in real memory space (i.e., Queue Banks can be "swapped out" of memory space transparently to non-kernel software). The present invention supports multiple programs (or processes of a single program) to enqueue or dequeue from a queue. The present invention allows for kernel software to lock out hardware access to the queue while manipulating Queue Entries or control fields. Finally, the present invention provides a wait-for-work mechanism that requires no extra complexity than that required to dequeue an entry from a queue. When a process requests the next entry from a queue, and hardware finds that the queue is empty, then hardware and operating system kernel software deactivates the process. When an entry is later placed on the queue, the process is reactivated and the entry is dequeued. No extra programming complexity to wait for work is required.

A novel system architecture for improved message passing and process synchronization has been described. The system uses enhanced features in the instruction set architecture, the operating system, and high-level languages to minimize system overhead when transferring messages containing large amounts of data. By passing ownership of Queue Banks, rather than by transferring the message data itself between processes, a significant improvement is made in the efficiency of the system for executing high volume, data-driven applications such as multimedia.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

Appendix A

The following algorithms provide the logical components of the Queuing Architecture instructions. The following conventions are used in these algorithms:

| | |
|---|---|
| QH_QBD.xxx | xxx is a field in the QBD of the Queue Header. |
| QH.xxx | xxx is a field in the Control Area of the Queue Header. |
| QE_QBD.xxx | xxx is a field in the QBD of the Queue Entry |
| QE.xxx | xxx is a field in the Control Area of the Queue Entry. |
| OLDTAIL_QE.xxx | xxx is a field in the Control Area of the tail Queue Entry (if any) prior to the current enqueue, addressed by QH.TAIL_POINTER. |
| QIAA, TEMP_HEAD_POINTER | Conceptual temporary holding registers. |
| CURRENT_TIME | Current system Dayclock value. |

A. ENQ/ENQF Algorithm

© 1994 Unisys Corporation.

Check Queue Header

1. Calculate the address of the QBD referenced by (U).L,BDI and validate as an active QBD to be used as QH_QBD. If any of the following conditions exist, generate an Addressing Exception and exit the algorithm:

a. L,BDI < 0,32.
    b. A Limits Violation is detected on the QBD reference.
    c. QH_QBD.TYPE <> 4 (QBD).
    d. QH_QBD.INACTIVE = 1.
    e. QH_QBD.ACCESS_LOCK, QH_QBD.GAP.E, QH_QBD.SAP.E do not allow enqueue access to the queue.

2. If Aa.L,BDI = 0 then go to Step 25.

Enqueue Entry

3. Calculate the address of the QBD referenced by Aa.L,BDI and validate as an active QBD to be used as QE_QBD. If any of the following conditions exist, generate an Addressing Exception and exit the algorithm:

a. 0,0 < L,BDI < 0,32.
    b. A Limits Violation is detected on the QBD reference.
    c. QE_QBD.TYPE <> 4 (QBD).
    d. QE_QBD.INACTIVE = 1.
    e. QE_QBD.ACCESS_LOCK, QE_QBD.GAP.W, QE_QBD.SAP.W do not allow access to enqueue the Queue Entry.

4. If QH_QBD and QE_QBD are the same, generate an Addressing Exception and exit algorithm.

5. If Aa.L,BDI = PROGRAM_ADDRESS_REGISTER.L,BDI (i.e., an attempt is made to enqueue the current instruction bank), generate an Addressing Exception and exit algorithm.

6. QIAA := QE_QBD.BASE_ADDRESS.

7. Storage lock QH.

8. If QH_UIP = 1, then release storage lock on QH, generate an Addressing Exception and exit, else QH.UIP := 1.

9. If any of the following conditions exist, QH.UIP := 0, release storage lock on QH, generate an Addressing Exception and exit the algorithm:

a. QH.HD = 1 (enqueue to head not allowed) AND ENQF.
   b. QH.COUNT >= QH.MAXCOUNT.
   c. QE.CLASS <> QH.CLASS.

10. Retain QH.QHM and QE.QEM for Step 33.

11. If QH.HD = 2 (forced enqueue to head), enqueue to the head. If QH.HD = 0 (enqueue to the head is allowed) AND ENQF, enqueue to the head, else enqueue to the tail.

12. If enqueuing to the head:

a. If QH.COUNT <> 0 (queue is not empty), then QE.NEXT_POINTER := QH_HEAD_POINTER, else (queue is empty) QH.TAIL_POINTER := QIAA.
    b. QH.HEAD_POINTER := QIAA.

61

13. If enqueuing to the tail:

a. If QH.COUNT <> 0 (queue is not empty), then
        OLDTAIL_QE.NEXT_POINTER := QIAA,
        else (queue is empty) QH_HEAD_POINTER := QIAA.
    b. QH.TAIL_POINTER := QIAA.

14. Aa+1 := QH.COUNT.

15. QH.COUNT := QH.COUNT + 1;

16. If QH.BQS = 1, then QH.CUMCOUNT := QH.CUMCOUNT + 1.

17. If Hardware Server Activation is not supported, retain QH.WAIT_LIST_COUNT for Step 33 and go to Step 18.

If Hardware Server Activation is supported, retain QH.WAIT_LIST_COUNT, QH.WAIT_LIST_HEAD_PTR and QH.SWQ_POINTER for Step 32 and remove server process from the Wait List:

a. QH.WAIT_LIST_HEAD_PTR := ASA
        (QH.WAIT_LIST_HEAD_PTR).NEXT_POINTER.
    b. QH.WAIT_LIST_COUNT := QH.WAIT_LIST_COUNT - 1.

18. If QH.BQS = 1, then QE.ENQTIME := CURRENT_TIME.

19. If QH.RSZ = 1, then QE.UPPER_LIMIT := Aa.UPPER_LIMIT.

20. QH.UIP := 0.

21. Release storage lock on QH.

22. Return QE_QBD to Inactive QBD List:

a. QE_QBD.INACTIVE_QBD_LIST_NEXT_POINTER :=
      Executive Register X9.
   b. Executive Register X9 := Aa.

23. Remove the enqueued Queue Entry from the enqueuer's visibility:

a. Mark QE_QBD as inactive:
      QE_QBD.I := 1.
      QE_QBD.UPPER_LIMIT < QE_QBD.LOWER_LIMIT (i.e., Upper Limit and Lower Limit are written so that the QBD has collapsed limits).
      (QE_QBD.BASE_ADDRESS in Word 2 may be written with any value; QE_QBD.DISP is ether written as zeroes or not modified).

b. For Active Base Table (ABT) entries for Registers B2-B15 where ABT.L,BDI = Aa.L,BDI, write ABT.L,BDI := 0,0, ABT.Offset architecturally undefined, and mark associated Base Register void.

c. Invalidate any QBD acceleration information for QE_QBD.

24. Go to Step 32.

ENQUEUE EVENT

25. Storage lock QH.

26. If QH.UIP = 1, then release storage lock on QH, generate an Addressing Exception and exit the algorithm. Otherwise, QH.UIP := 1.

27. Retain QH.QHM for Step 33.

28. QH.EVENT := 1.

29. If Hardware Server Activation is not supported, then retain QH.WAIT_LIST_COUNT for Step 33 and go to Step 30. If Hardware Server Activation is supported, then retain QH.WAIT_LIST_COUNT, QH.WAIT_LIST_HEAD_PTR and QH.SWQ_POINTER for Step 32 and remove the server process from the Wait List:

QH.WAIT_LIST_HEAD_PTR :=
       ASA (QH.WAIT_LIST_HEAD_PTR).NEXT_POINTER.
   QH.WAIT_LIST_COUNT := QH.WAIT_LIST_COUNT - 1.

30. QH.UIP := 0.

31. Release storage lock on QH.

SERVER ACTIVATION, MONITOR INTERRUPTS

32. If Hardware Server Activation is supported and QH.WAIT_LIST_COUNT > 0, then call the ENQSWQ algorithm.

33. Generate a Terminal Addressing Exception interrupt if either:

a. Hardware Server Activation is not supported and QH.WAIT_LIST_COUNT > 0, or,
    b. A Queue Monitor condition was detected.

34. Exit.

B. DEQ/DEQW Algorithm

© 1994 Unisys Corporation.

CHECK QUEUE HEADER

1. Calculate the address of the QBD referenced by (U).L,BDI and validate as an active QBD to be used as QH_QBD. If any of the following conditions exist, generate an Addressing Exception and exit the algorithm:

a. L,BDI < 0,32.
    b. A Limits Violation is detected on the QBD reference.
    c. QH_QBD.TYPE <> 4 (QBD).
    d. QH_QBD.INACTIVE = 1.
    e. QH_QBD.ACCESS_LOCK, QH_QBD.GAP.R, QH_QBD.SAP.R do not allow dequeue access to the queue.

2. Storage lock QH.

3. If QH.UIP = 1, then release storage lock on QH, generate an Addressing Exception and exit the algorithm. Else, QH.UIP := 1.

4. Retain QH.QHM for Step 8 or Step 20.

5. If QH.COUNT <> 0, then go to Step 9.

6. QH.COUNT is zero. If this is a DEQ instruction, then indicate empty queue:

a. Aa+1 := QH.COUNT.
    b. QH.UIP := 0.
    c. Release storage lock on QH.
    d. Go to Step 20.

65

7. QH.COUNT is zero and instruction is DEQW. If QH.EVENT = 1, then dequeue event:

a. Aa+1 := QH.COUNT.
   b. QH.EVENT := 0.
   c. QH.UIP := 0.
   d. Release storage lock on QH.
   e. Go to Step 20.

8. QH.COUNT is zero, QH.EVENT is zero, and instruction is DEQW. Add the server process to the Wait List:

a. QH.UIP := 0.
   b. Release storage lock on QH.
   c. If Hardware Server Deactivation is not supported OR Hardware Server Deactivation is supported AND a monitor condition was detected in Step 4, then generate an Addressing Exception and exit the algorithm. Else Hardware Server Deactivation is supported and a monitor condition was not detected in Step 4, go to WAIT_ON_QUEUE algorithm.

DEQUEUE ENTRY

9. If Executive Register X9.L,BDI = 0,0, then QH.UIP := 0, release storage lock on QH, generate an Addressing Exception, and exit algorithm. Otherwise, calculate the address of the QBD referenced by Executive Register X9.L,BDI for use as QE_QBD. If any of the following conditions exist, results are architecturally undefined:

a. 0,0 < Executive Register X9.L,BDI < 0,32.
   b. A Limits Violation is detected on the QBD reference.
   c. QE_QBD.TYPE <> 4.

d.  QE_QBD.I = 0.

10.  Aa+1 := QH.COUNT.

11.  Retain QE(QH.HEAD_POINTER).QEM for Step 20.

12.  Save the current Head Pointer, then modify the Head Pointer to point to the next entry on the queue:

a.  TEMP_HEAD_POINTER := QH.HEAD_POINTER.
   b.  QH.HEAD_POINTER := QE(QH.HEAD_POINTER).NEXT_POINTER.
   (This is not required if the only entry on the queue is being dequeued).

13.  Remove QE_QBD from the Inactive QBD List:

a.  Aa.L,BDI := Executive Register X9.L,BDI.
   b.  Executive Register X9 :=
       QE_QBD.INACTIVE_QBD_LIST_NEXT_POINTER.

14.  Aa.UPPER_LIMIT := QE.UPPER_LIMIT.

15.  QH.COUNT := QH.COUNT - 1.

16.  If QH.BQS = 1, then QH.CUMTIME := QH.CUMTIME + (CURRENT_TIME - QE(TEMP_HEAD_POINTER).ENQTIME).

17.  QH.UIP := 0.

18.  Release storage lock on QH.

19.  Write QE_QBD as follows:

a. QE_QBD.BASE_ADDRESS := TEMP_HEAD_POINTER.
b. If QH.EXP = 1, then QE_QBD.UPPER_LIMIT := 777777 octal. Else
    QE_QBD.UPPER_LIMIT :=
        QE(TEMP_HEAD_POINTER).UPPER_LIMIT.
c. QE_QBD.LOWER_LIMIT := 0.
d. QE_QBD.I := 0.

MONITOR INTERRUPTS

20. Generate a Terminal Addressing Exception interrupt if a Queue Monitor condition was detected.

21. Exit.

C. ENQSWQ Algorithm

The ENQSWQ algorithm moves a server process from the Wait List to a
5   Switching Queue. If Hardware Server Activation is supported, these steps are performed
by hardware. The WAIT_LIST_HEAD_POINTER and SWQ_POINTER are passed from
ENQ/ENQF processing at Step 22. If Hardware Server Activation is not supported, these
steps are performed by Exec software. The QH is passed as part of the Terminal
Addressing Exception generated at Step 33 of the ENQ/ENQF algorithm.
10  WAIT_LIST_HEAD_POINTER and SWQ_POINTER are then used as conceptual
temporary holding registers.

The SWQ_QH is the header of the Switching Queue addressed by the
SWQ_POINTER.
15
© 1994 Unisys Corporation.
1.   If Hardware Server Activation is supported, go to Step 2. Else, remove the server
process from the Wait List:

20       a.   Storage lock QH.
         b.   SWQ_POINTER := QH.SWQ_POINTER.
         c.   WAIT_LIST_HEAD_POINTER := QH.WAIT_LIST_HEAD_POINTER.
         d.   QH.WAIT_LIST_HEAD_POINTER :=
                  ASA (QH.WAIT_LIST_HEAD_POINTER).NEXT_POINTER.
25       e.   QH.WAIT_LIST_COUNT := QH.WAIT_LIST_COUNT - 1.
         f.   Release storage lock on QH.

2.   Storage lock SWQ_QH.

30  3.   If SWQ_QH.COUNT <> 0 (Queue is not empty), then
         OLDTAIL_QE.NEXT_POINTER := WAIT_LIST_HEAD_POINTER. Else (Queue is empty), SWQ_QH.HEAD_POINTER :=
WAIT_LIST_HEAD_POINTER.

4. SWQ_QH.TAIL_POINTER := WAIT_LIST_HEAD_POINTER.

5. SWQ_QH.COUNT := SWQ_QH.COUNT + 1.

6. SWQ_QH.CUMCOUNT := SWQ_QH.CUMCOUNT + 1.

7. ASA_QE.ENQTIME := CURRENT_TIME.

8. Release storage lock on SWQ_QH.

9. Return.

D. WAIT ON QUEUE Algorithm

The Wait On Queue algorithm removes a server process from the processor and adds it to the Wait List. QH is the Queue Header of the Queue on which the server process is to wait. ASA is the Activity Save Area (ASA) of the server process being deactivated, addressed by Base Register 24.BASE_ADDRESS.

© 1994 Unisys Corporation.

1. Decelerate process state into the active ASA.

2. Storage lock QH.

3. If QH.COUNT <> 0 OR QH.EVENT = 1, then go to Step 4. Else, add the server process to the Wait List:

a. ASA.WAITING_ON_Q := QH.VA.
   b. ASA.NEXT_POINTER := QH.WAIT_LIST_HEAD_POINTER.
   c. QH.WAIT_LIST_HEAD_POINTER := B24.BASE_ADDRESS.
   d. QH.WAIT_LIST_COUNT := QH.WAIT_LIST_COUNT + 1.
   e. Release the storage lock on QH. The previously active ASA has been decelerated and the processor is ready to execute another process. Go to DEQSWQ algorithm.

4. The Count of the Queue being armed is now non-zero due to an ENQ/ENQF executed on another processor during the WAIT_ON_QUEUE algorithm. The server process just decelerated is ready for execution. Go to DEQ/DEQW algorithm at Step 5.

5. Exit.

71

E. DEQSWQ Algorithm

The DEQSWQ algorithm removes a process from a Switching Queue and accelerates it into the processor.

© 1994 Unisys Corporation.

1. Search the SWQs. If an ASA is found, go to Step 2. Else, all SWQs are currently empty and there are no processes ready to execute. Perform hardware idle loop, then re-execute this Step.

2. Storage lock SWQ_QH. If SWQ_QH.COUNT = 0, then release storage lock on SWQ_QH and go to Step 1.

3. Base Register 24.BASE_ADDRESS := SWQ_QH.HEAD_POINTER.

4. SWQ_QH.HEAD_POINTER :=
    QE(SWQ_QH.HEAD_POINTER).NEXT_POINTER.

5. SWQ_QH.COUNT := SWQ_QH.COUNT - 1.

6. Release the storage lock on SWQ_QH.

7. Accelerate the ASA, using the Base Register 24.BASE_ADDRESS.

8. Execution of the new active ASA begins with an interrupt point, either mid-execution or between instructions. Any Addressing Exception conditions detected during ASA acceleration are reported at this interrupt point.

We claim:

1. In a computer system executing a plurality of processes controlled by a computer operating system, the computer system having at least one processor and a main storage unit accessible by the plurality of processes, units of data storage residing in the main storage unit called queue banks, each queue bank being capable of representing a queue header element or a queue entry element of a queue, each queue including one queue header and zero or more queue entries, a queue being the mechanism by which processes can communicate with each other and containing attributes describing its use, a queue entry being used for storing a group of data signals, a method of interprocess communication comprising the steps of:

(a) creating a queue in the main storage unit;
(b) storing a group of data signals to be transferred from a first process to a second process into a queue entry that is not currently enqueued to said queue;
(c) adding said queue entry to said queue as a result of said first process directing the processor to execute an enqueue instruction, whereby execution of said enqueue instruction configures hardware to prevent said first process from gaining further access to said queue entry; and
(d) removing said queue entry from said queue as a result of said second process directing the processor to execute a dequeue instruction, whereby execution of said dequeue instruction configures hardware to allow said second process to gain access to said queue entry.

2. The method for interprocess communication of claim 1, further including the step of:

(e) repeating steps (b)–(d) for each group of data signals to be transferred from said first process to said second process.

3. The method for interprocess communication of claim 2, further including the step of:

(f) deleting said queue when no more groups of data signals are to be transferred from said first process to said second process.

4. The method for interprocess communication of claim 2, further including the step of:

(c1) protecting said queue entry from unauthorized access by processes executing in the computer system.

5. In a computer system having a plurality of processes being controlled by a computer operating system, units of data storage called queue banks, each queue bank being capable of representing a queue header element or a queue entry element of a queue, a queue including one queue header and zero or more queue entries, a queue bank being accessed via a pointer data structure, and a queue being accessed via the pointer of its queue header, a method of interprocess communication between at least first and second processes managed by a control process, comprising the steps of:

(a) creating an available queue including a plurality of available queue entries as a result of a first create queue request by the first process, said available queue being accessed via a first pointer;
(b) creating a queue as a result of a second create queue request by the control process, said queue being accessed via a true pointer;
(c) creating a first alias pointer, said first alias pointer providing enqueue and dequeue access to said queue for the first process;
(d) creating a second alias pointer, said second alias pointer providing dequeue and enqueue access to said queue for the second process;
(e) removing a queue entry from said available queue by the first process directing the computer system to execute a dequeue instruction when a group of data signals are to be received by the first process that are to be transferred to the second process;
(f) storing said group of data signals into said queue entry as said group of data signals is received by the first process;
(g) adding said queue entry to said queue by the first process directing the computer system to execute an enqueue instruction whereby hardware is configured to prevent the first process from gaining further access to said queue entry;
(h) removing said queue entry from said queue by the second process directing the computer system to execute a dequeue instruction, whereby hardware is configured to allow the second process to gain access to said queue entry to process said group of data signals stored in said queue entry; and
(i) repeating steps (e)–(h) for each group of data signals to be transferred from the first process to the second process.

6. The method for interprocess communication of claim 5, further including the step of:

(j) deleting said first alias pointer when no more groups of data signals are to be transferred from the first process to the second process.

7. The method for interprocess communication of claim 6, further including the step of:

(k) deleting said second alias pointer when no more groups of data signals are to be transferred from the first process to the second process.

8. The method for interprocess communication of claim 7, further including the step of:

(l) deleting said queue and said true pointer by the control process when no more groups of data signals are to be transferred from the first process to the second process.

9. The method for interprocess communication of claim 5, wherein said removing step (h) includes the step of suspending the execution of said second process to wait for said queue entry to be enqueued if said queue is empty when the second process attempts to remove a queue entry from said queue, or reporting a queue status to said second process, depending on the values of a field in said dequeue instruction.

10. The method for interprocess communication of claim 5, wherein the adding step (g) enqueues said queue entry to the front of said queue.

11. The method for interprocess communication of claim 5, wherein said queue entry includes a control area data structure for storing control information which is inaccessible to the first and second processes, and a text area data structure for storing message data signals.

12. The method for interprocess communication of claim 11, wherein a validly accessible portion of said text area may be dynamically resized.

13. The method for interprocess communication of claim 5, further including the step of:

(e1) providing protection to said queue entry to prevent unauthorized access to said queue entry by processes currently active in the computer system.

14. The method for interprocess communication of claim 5, further including the step of:

providing interfaces to the computer operating system for processes to create queues, modify queues, inspect queues, delete queues, create pointers, and delete pointers.

15. The method for interprocess communication of claim 5, further including the step of:

maintaining a list of inactive pointers from which pointers are allocated when one of the processes needs a pointer and to which pointers are returned when one of the processes deletes a pointer.

16. In a computer system executing a plurality of processes controlled by a computer operating system, the computer system having at least one processor and a main storage unit accessible by the plurality of processes each of said plurality of processes having the ability to address a predetermined portion of the main storage unit, units of data storage residing in the main storage unit called queue banks, each queue bank being capable of representing a queue header element or a queue entry element of a queue, each queue including one queue header and zero or more queue entries, a queue being the mechanism by which processes can communicate with each other and containing attributes describing its use, the queue header of a queue being used for storing an event notification upon detection of an event, a method of interprocess communication comprising the steps of:

(a) creating a queue in the main storage unit;

(b) storing an event notification to be transferred from a first process to a second process into the queue header of said queue as a result of said first process directing the processor to execute an enqueue instruction, said enqueue instruction operating in hardware and microcode to prevent said first process from further addressing the queue header; and (c) reading said event notification from the queue header of said queue as a result of said second process directing the processor to execute a dequeue instruction, said dequeue instruction operating in hardware and microcode to allow said second process to address the queue header, and whereby said event notification stored in said queue entry is communicated from said first process to said second process.

17. The method for interprocess communication of claim 16, further including the step of:

(d) repeating steps (b)–(c) for each event notification to be communicated from said first process to said second process.

18. The method for interprocess communication of claim 16, further including the step of:

(e) deleting said queue when no more event notifications are to be communicated from said first process to said second process.

19. The method for interprocess communication of claim 16, further including the step of:

(a1) protecting the queue header of said queue from unauthorized access by processes executing in the computer system.

20. In a computer system having a plurality of processes being controlled by a computer operating system, units of data storage called queue banks, each queue bank being capable of representing a queue header element or a queue entry element of a queue, a queue including one queue header and zero or more queue entries, a queue bank being accessed via a pointer data structure, a queue being accessed via the pointer of its queue header, and a queue header being used for storing an event notification upon detection of an event, a method of interprocess communication between at least a first process and a second process, both first and second processes being managed by a control process, comprising the steps of:

(a) creating an available queue including a plurality of available queue entries as a result of a first create queue request by the first process, said available queue being accessed via a first pointer;

(b) creating a queue as a result of a second create queue request by the control process, said queue being accessed via a true pointer;

(c) creating a first alias pointer, said first alias pointer providing enqueue access to said queue for the first process;

(d) creating a second alias pointer, said second alias pointer providing dequeue access to said queue for the second process;

(e) storing an event notification into the queue header of said queue after an event is detected, by the first process directing the computer system to execute an enqueue instruction whereby a hardware protection mechanism denies the first process further access to the queue header;

(f) reading said event notification from the queue header of said queue by the second process directing the computer system to execute a dequeue instruction, whereby said hardware protection mechanism grants the second process access to the queue header, and whereby the second process detects said event notification; and (g) repeating steps (e)–(f) for each event notification to be communicated from the first process to the second process.

21. The method for interprocess communication of claim 20, further including the step of:

(j) deleting said first alias pointer when no more event notifications are to be communicated from the first process to the second process.

22. The method for interprocess communication of claim 21, further including the step of:

(k) deleting said second alias pointer when no more event notifications are to be communicated from the first process to the second process.

23. The method for interprocess communication of claim 22, further including the step of:

(l) deleting said queue and said true pointer by the control process when no more event notifications are to be communicated from the first process to the second process.

24. In a computer system having a plurality of concurrently executing, cooperating sequential processes being controlled by a computer operating system, units of data storage called queue banks, wherein each of the sequential processes has a predetermined address space that determines which units of data storage may be addressed by that process, each queue bank being capable of representing a queue header element or a queue entry element of a queue, a queue being a list of one queue header and zero or more queue entries, a queue bank being accessed via a queue bank descriptor data structure, and a queue being accessed via the queue bank descriptor of its queue header, the system including a system return queue for holding queue entries released by a process, a method of interprocess communication, comprising the steps of:

(a) creating an available queue bank descriptor as a result of a first create queue bank descriptor request by a first process;

(b) creating an available queue including a plurality of available queue entries as a result of a first create queue request by said first process, said available queue being accessed via said available queue bank descriptor;

(c) creating a shared queue bank descriptor as a result of a second create queue bank descriptor request by a control process;

(d) creating a shared queue as a result of a second create queue request by said control process, said shared queue being accessed via said shared queue bank descriptor;

(e) creating a first alias queue bank descriptor as a result of a third create queue bank descriptor request by said first process, said first alias queue bank descriptor providing enqueue access to said shared queue for said first process;

(f) creating a second alias queue bank descriptor as a result of a fourth create queue bank descriptor request by a second process, said second alias queue bank descriptor providing dequeue access to said shared queue for said second process;

(g) removing a queue entry from said available queue by said first process directing the computer system to execute a dequeue instruction when a group of data signals is to be received by said first process that are to be transferred to said second process;

(h) storing said group of data signals into said queue entry by said first process as said group of data signals is received;

(i) adding said queue entry to said shared queue by said first process directing the computer system to execute an enqueue instruction, said enqueue instruction operating to append said queue entry to the end of said shared queue, thereby configuring the hardware of the computer system to remove said queue entry from the address space of said first process;

(j) removing said queue entry from said shared queue by said second process directing the computer system to execute a dequeue instruction, said dequeue instruction operating to remove said queue entry from the head of said queue, thereby configuring the hardware of the computer system to place said queue entry into the address space of said second process;

(k) returning said queue entry to the system return queue after said second process has processed said group of data signals stored in said queue entry;

(l) transferring said queue entry from the system return queue to said available queue by the computer operating system; and (m) repeating steps (g)–(l) for each group of data signals to be transferred from said first process to said second process.

25. The method for interprocess communication of claim 24, further including the step of:

(n) deleting said first alias queue bank descriptor as a result of a first delete queue bank descriptor request by said first process when no more groups of data signals are to be transferred from the first process to the second process.

26. The method for interprocess communication of claim 25, further including the step of:

(o) deleting said second alias queue bank descriptor as a result of a second delete queue bank descriptor request by said second process when no more groups of data signals are to be transferred from the first process to the second process.

27. The method for interprocess communication of claim 26, further including the step of:

(p) deleting said queue as a result of a delete queue request by said control process when no more groups of data signals are to be transferred from the first process to the second process.

28. The method for interprocess communication of claim 27, further including the step of:

(q) deleting said shared queue bank descriptor as a result of a third delete queue bank descriptor request by said control process when no more groups of data signals are to be transferred from the first process to the second process.

29. The method for interprocess communication of claim 24, wherein said removing step (h) includes the step of suspending the execution of said second process to wait for said queue entry to be enqueued if said queue is empty when said second process attempts to remove a queue entry from said queue, or reporting a queue status to said second process depending on the values of a field in said dequeue instruction.

30. The method for interprocess communication of claim 24, wherein the adding step (g) enqueues said queue entry to the front of said queue.

31. The method for interprocess communication of claim 24, wherein said queue entry includes a control area data structure for storing control information which is inaccessible to the first and second processes and a text area data structure for storing message data signals.

32. The method for interprocess communication of claim 31, wherein a validly accessible portion of said text area data structure may be dynamically resized.

33. The method for interprocess communication of claim 24, further including the step of:

(h1) providing protection to said queue entry to prevent unauthorized access to said queue entry by processes currently active in the computer system.

34. The method for interprocess communication of claim 24, further including the step of:

(a1) providing interfaces to the computer operating system for processes to create queues, modify queues, inspect queues, delete queues, create queue bank descriptors and delete queue bank descriptors.

35. The method for interprocess communication of claim 24, further including the step of:

(a2) maintaining a list of inactive queue bank descriptors from which queue bank descriptors are allocated when processes create queue bank descriptors and to which queue bank descriptors are returned when processes delete queue bank descriptors.

36. In a computer system having at least first and second processes being controlled by a computer operating system, the processes and the computer operating system being executed by at least one processor, the first process receiving groups of data signals from an input/output channel coupled to the at least one processor, the computer system including an event notification for communicating the occurrence of an event from the first process to the second process, comprising:

queue means for storing and retrieving the groups of data signals received by the first process and event notifications to be communicated from the first process to the second process, said queue means including queue header means for storing and retrieving queue control information and an event notification, and queue entry means for storing and retrieving groups of data signals to be transferred from the first process to the second process; and queue control means for controlling access to said queue means by selectively providing write access to said queue means for the first process, and by selectively providing read access to said queue means for the second process.

37. A system having a plurality of concurrently executing, cooperating sequential processes being controlled by a computer operating system, the system including at least one instruction processor for executing instructions, the at least one instruction processor being coupled to a main storage unit, units of data storage residing in the main storage unit called queue banks, each queue bank being capable of representing a queue header element or a queue entry element of a queue, each queue including one queue header and zero or more queue entries, each queue bank being accessible via a data structure residing in the main storage unit called a queue bank descriptor, each queue being accessible via the queue bank descriptor of its queue header, a queue header including an event notification, a queue being the mechanism by which processes can communicate with each other and containing attributes describing its use, comprising:

queue creation means for creating a queue in response to a create queue request from a first process;

enqueue instruction processing means for executing an enqueue instruction to add a queue entry to the tail of said queue in response to an enqueue request from said first process, said enqueue request transferring control of said queue entry from said first process to said queue by configuring the hardware of the system so that said first process can no longer access said queue entry, said queue entry storing a group of data signals to be transferred from said first process to a second process;

dequeue instruction processing means for executing a dequeue instruction to remove said queue entry from said queue in response to a dequeue request from said second process, said dequeue request transferring control of said queue entry from said queue to said second process by configuring the hardware of the system so that said second process acquires access to said queue entry, thereby providing access to said group of data signals stored in said queue entry to said second process; and queue deletion means for deleting said queue in response to a delete queue request from said first process.

38. The system of claim 37, further including queue bank descriptor creation means for creating a first queue bank descriptor to access said queue in response to a first create queue bank descriptor request from said first process, and for creating a second queue bank descriptor to access said queue in response to a second create queue bank descriptor request from said second process.

39. The system of claim 38, further including queue bank descriptor deletion means for deleting said first queue bank descriptor in response to a first delete queue bank descriptor request from said first process, and for deleting said second queue bank descriptor in response to a second delete queue bank descriptor request from said second process.

40. The system of claim 37, further including queue modification means for modifying the attributes of said queue.

41. The system of claim 37, further including queue inspection means for inspecting the attributes of said queue and returning the attributes to a requesting process.

42. The system of claim 37, further including enqueue to front instruction processing means for executing an enqueue to front instruction to add a queue entry to the front of said queue in response to an enqueue to front request from said first process, said queue entry storing a group of data signals to be transferred from said first process to said second process.

43. The system of claim 42, further including enqueue event instruction processing means for executing an enqueue event instruction to modify said queue header of said queue in response to an enqueue event request from said first process, said queue header storing an event notification to be communicated from said first process to said second process.

44. The system of claim 43, further including dequeue or wait instruction processing means for executing dequeue or wait instructions to remove said queue entry from said queue in response to dequeue or wait requests from one or more of the processes if said queue has at least one queue entry enqueued, thereby providing access to said group of data signals stored in said queue entry to a selected one of the processes, and for executing said dequeue or wait instructions to suspend the execution of the processes making dequeue or wait requests to wait for a queue entry to be enqueued to said queue if said queue has no queue entries enqueued.

45. The system of claim 39, further including means for maintaining a list of inactive queue bank descriptors from which said queue bank descriptor creation means allocates queue bank descriptors, and to which said queue bank descriptor deletion means deallocates queue bank descriptors.

46. The system of claim 37, further including means for collecting queue statistics in real-time, thereby enabling the computer operating system to dynamically modify the usage of queue banks by the processes active in the computer system.

47. The system of claim 46, whereby said collecting queue statistics means includes means for determining the cumulative number of queue entries enqueued to said queue, means for determining the cumulative time said queue entries were enqueued to said queue, and means for determining the cumulative time processes spent waiting for queue entries to be enqueued to said queue.

48. The system of claim 44, further including programmable means for selectively monitoring and reporting access to said queue to a designated process controlled by the computer operating system whenever said queue is accessed, whenever a specified queue entry on said queue is accessed, or whenever a specified process executes one of said instructions, thereby providing statistics relating to the usage of said queue to the computer operating system.

* * * * *